Nov. 21, 1961 E. F. KLEINSCHMIDT ET AL 3,009,988

COMMUNICATIONS EQUIPMENT

Filed Nov. 16, 1955 37 Sheets-Sheet 1

INVENTORS
Edward E. Kleinschmidt
John W. Ehrlich
Edward E. Podwojski
BY Strauch, Nolan + Neale
ATTORNEYS INVENTORS
Edward F. Kleinschmidt
John W. Ehrlich
Edward E. Podwojski
BY Strauch, Nolan & Neale
ATTORNEYS Nov. 21, 1961 E. F. KLEINSCHMIDT ET AL 3,009,988

COMMUNICATIONS EQUIPMENT

Filed Nov. 16, 1955

37 Sheets-Sheet 3

INVENTORS
EDWARD F. KLEINSCHMIDT
JOHN W. EHRLICH
EDWARD E. PODWOJSKI

BY Strauch, Nolan & Neale

ATTORNEYS

Nov. 21, 1961 E. F. KLEINSCHMIDT ET AL 3,009,988

COMMUNICATIONS EQUIPMENT

Filed Nov. 16, 1955 37 Sheets-Sheet 4

INVENTORS
Edward E. Kleinschmidt
John W. Ehrlich
Edward E. Podwojski

BY Strauch, Nolan & Neale

ATTORNEYS

INVENTORS
Edward F. Kleinschmidt
John W. Ehrlich
Edward E. Podwojski
BY Strauch, Nolan & Neale
ATTORNEYS INVENTORS
EDWARD F. KLEINSCHMIDT
JOHN W. EHRLICH
EDWARD E. PODWOJSKI
BY Strauch, Nolan & Neale
ATTORNEYS INVENTORS
EDWARD F. KLEINSCHMIDT
JOHN W. EHRLICH
EDWARD E. PODWOJSKI
BY Strauch, Nolan & Neale
ATTORNEYS INVENTORS
Edward E. Kleinschmidt
John W. Ehrlich
Edward E. Podwojski
BY Strauch, Nolan & Neale
ATTORNEYS INVENTORS
EDWARD F. KLEINSCHMIDT
JOHN W. EHRLICH
EDWARD E. PODWOJSKI
BY Strauch, Nolan & Neale
ATTORNEYS Nov. 21, 1961 E. F. KLEINSCHMIDT ET AL 3,009,988

COMMUNICATIONS EQUIPMENT

Filed Nov. 16, 1955

37 Sheets-Sheet 10

INVENTORS
EDWARD E. KLEINSCHMIDT
JOHN W. EHRLICH
EDWARD E. PODWOJSKI

BY Strauch, Nolan & Neale

ATTORNEYS

Nov. 21, 1961 E. F. KLEINSCHMIDT ET AL 3,009,988

COMMUNICATIONS EQUIPMENT

Filed Nov. 16, 1955 37 Sheets-Sheet 11

INVENTORS
Edward E. Kleinschmidt
John W. Gehrlich
Edward G. Podwojski

BY Strauch, Nolan & Neale
ATTORNEYS

INVENTORS
EDWARD E. KLEINSCHMIDT
JOHN W. GARLICH
EDWARD E. PODWOJSKI

BY Strauch, Nolan & Neale

ATTORNEYS

INVENTORS
Edward E. Kleinschmidt
John W. Ehrlich
Edward E. Podwojski
BY Strauch, Nolan & Neale
ATTORNEYS Nov. 21, 1961 E. F. KLEINSCHMIDT ET AL 3,009,988

COMMUNICATIONS EQUIPMENT

Filed Nov. 16, 1955

37 Sheets-Sheet 14

INVENTORS
Edward E. Kleinschmidt
John W. Ehrlich
Edward E. Podwojski

BY Strauch, Nolan & Neale

ATTORNEYS

Nov. 21, 1961 E. F. KLEINSCHMIDT ET AL 3,009,988

COMMUNICATIONS EQUIPMENT

Filed Nov. 16, 1955 37 Sheets-Sheet 15

INVENTORS
Edward F. Kleinschmidt
John W. Ehrlich
Edward E. Podwojski

BY Strauch, Nolan & Neale

ATTORNEYS

Nov. 21, 1961 E. F. KLEINSCHMIDT ET AL 3,009,988

COMMUNICATIONS EQUIPMENT

Filed Nov. 16, 1955 37 Sheets-Sheet 16

INVENTORS
Edward F. Kleinschmidt
John W. Ehrlich
Edward E. Podwojski

BY Strauch, Nolan & Neale

ATTORNEYS

Nov. 21, 1961 E. F. KLEINSCHMIDT ET AL 3,009,988

COMMUNICATIONS EQUIPMENT

Filed Nov. 16, 1955 37 Sheets-Sheet 17

INVENTORS
Edward E. Kleinschmidt
John W. Ehrlich
Edward G. Podwojski

Strauch, Nolan & Neale
ATTORNEYS

Nov. 21, 1961 E. F. KLEINSCHMIDT ET AL 3,009,988

COMMUNICATIONS EQUIPMENT

Filed Nov. 16, 1955

37 Sheets-Sheet 18

INVENTORS
Edward E. Kleinschmidt
John W. Ehrlich
Edward G. Podwojski

Strauch, Nolan & Neale
ATTORNEYS

INVENTORS
EDWARD E. KLEINSCHMIDT
JOHN W. EHRLICH
EDWARD G. PODWOJSKI
BY
Strauch, Nolan & Neale
ATTORNEYS Nov. 21, 1961 E. F. KLEINSCHMIDT ET AL 3,009,988

COMMUNICATIONS EQUIPMENT

Filed Nov. 16, 1955 37 Sheets-Sheet 20

INVENTORS
Edward E. Kleinschmidt
John W. Gehrlich
Edward G. Podwojski
BY Strauch, Nolan & Neale
ATTORNEYS INVENTORS
EDWARD F. KLEINSCHMIDT
JOHN W. EHRLICH
EDWARD E. PODWOJSKI
BY Strauch, Nolan + Neale
ATTORNEYS Nov. 21, 1961 E. F. KLEINSCHMIDT ET AL 3,009,988

COMMUNICATIONS EQUIPMENT

Filed Nov. 16, 1955 37 Sheets-Sheet 22

INVENTORS
EDWARD F. KLEINSCHMIDT
JOHN W. EHRLICH
EDWARD G. PODWOJSKI

BY Strauch, Nolan & Neale

ATTORNEYS

INVENTORS
EDWARD F. KLEINSCHMIDT
JOHN W. EHRLICH
EDWARD E. PODWOJSKI
BY Strauch, Nolan & Neale
ATTORNEYS Nov. 21, 1961 E. F. KLEINSCHMIDT ET AL 3,009,988

COMMUNICATIONS EQUIPMENT

Filed Nov. 16, 1955 37 Sheets-Sheet 24

INVENTORS
EDWARD F. KLEINSCHMIDT
JOHN W. EHRLICH
EDWARD E. PODWOJSKI

BY Strauch, Nolan & Neale
ATTORNEYS

Nov. 21, 1961 E. F. KLEINSCHMIDT ET AL 3,009,988

COMMUNICATIONS EQUIPMENT

Filed Nov. 16, 1955 37 Sheets-Sheet 25

INVENTORS
Edward F. Kleinschmidt
John W. Ehrlich
Edward E. Podwojski

BY

Staunch, Nolan & Neale
ATTORNEYS

Nov. 21, 1961 E. F. KLEINSCHMIDT ET AL 3,009,988

COMMUNICATIONS EQUIPMENT

Filed Nov. 16, 1955 37 Sheets-Sheet 26

INVENTORS
EDWARD F. KLEINSCHMIDT
JOHN W. EHRLICH
EDWARD E. PODWOJSKI

BY

Strauch, Nolan & Neale
ATTORNEYS

Nov. 21, 1961 E. F. KLEINSCHMIDT ET AL 3,009,988

COMMUNICATIONS EQUIPMENT

Filed Nov. 16, 1955 37 Sheets-Sheet 27

INVENTORS
EDWARD F. KLEINSCHMIDT
JOHN W. EHRLICH
EDWARD E. PODWOJSKI
BY Strauch, Nolan & Neale
ATTORNEYS INVENTORS
EDWARD F. KLEINSCHMIDT
JOHN W. EHRLICH
EDWARD E. PODWOJSKI
BY Strauch, Nolan & Neale
ATTORNEYS INVENTORS
EDWARD F. KLEINSCHMIDT
JOHN W. EHRLICH
EDWARD E. PODWOJSKI
BY
Strauch, Nolan & Neale
ATTORNEYS INVENTORS
EDWARD F. KLEINSCHMIDT
JOHN W. EHRLICH
EDWARD E. PODWOJSKI
BY Strauch, Nolan & Neale
ATTORNEYS INVENTORS
EDWARD F. KLEINSCHMIDT
JOHN W. EHRLICH
EDWARD E. PODWOJSKI
BY
Strauch, Nolan & Neale
ATTORNEYS INVENTORS
EDWARD F. KLEINSCHMIDT
JOHN W. EHRLICH
EDWARD E. PODWOJSKI
BY
Strauch, Nolan & Neale
ATTORNEYS

INVENTORS
EDWARD F. KLEINSCHMIDT
JOHN W. EHRLICH
EDWARD E. PODWOJSKI

BY Strauch, Nolan & Neale
ATTORNEYS

INVENTORS
EDWARD F. KLEINSCHMIDT
JOHN W. EHRLICH
EDWARD E. PODWOJSKI
BY Strauch, Nolan & Neale
ATTORNEYS INVENTORS
EDWARD F. KLEINSCHMIDT
JOHN W. EHRLICH
EDWARD E. PODWOJSKI
BY Strauch, Nolan & Neale
ATTORNEYS Nov. 21, 1961 E. F. KLEINSCHMIDT ET AL 3,009,988

COMMUNICATIONS EQUIPMENT

Filed Nov. 16, 1955 37 Sheets-Sheet 36

INVENTORS
EDWARD F. KLEINSCHMIDT
JOHN W. EHRLICH
EDWARD E. PODWOJSKI

BY Strauch, Nolan & Neale

ATTORNEYS

INVENTORS
EDWARD F. KLEINSCHMIDT
JOHN W. EHRLICH
EDWARD E. PODWOJSKI
BY Strauch, Nolan & Neale
ATTORNEYS

United States Patent Office 3,009,988
Patented Nov. 21, 1961

3,009,988
COMMUNICATIONS EQUIPMENT

Edward F. Kleinschmidt, Wilmette, John W. Ehrlich, Glenview, and Edward E. Podwojski, Arlington Heights, Ill., assignors to Smith-Corona Marchant Inc., a corporation of New York Filed Nov. 16, 1955, Ser. No. 547,265
28 Claims. (Cl. 178—2)

The present invention relates to improvements in message communication equipment of the type that is operative to produce a legible record of messages transmitted and recorded and particularly to improvements in such equipment rendering it lighter in weight, more compact in construction, and otherwise adapted for use in aircraft.

Heretofore communication equipment of this type has been generally unsuitable for use in aircraft due to its overall weight and bulk and due to its structural arrangement by which the units, such as the keyboard and printing units, which of necessity must be located in positions accessible to the operator, were themselves large and bulky and inseparably associated with other bulky components of the overall equipment constant access to which was not needed by the operator resulting in crowding of the operator's compartment unnecessarily and in certain types of aircraft rendering the equipment unusable due to lack of the requisite space requirements in the operator's compartment. For these reasons, use of equipment of this type has been largely confined to large shipboard and ground installations.

The advantages of equipment of this type in providing a constant monitor of a selected radio communication channel without operator attendance and of providing an accurate record of all messages transmitted and received have heretofore been largely denied to aircraft communications.

In addition to the foregoing difficulties with the prior equipment of this type, there are additional functional limitations which render it unsuitable for aircraft use, particularly for military and naval aircraft. Since, operationally, it becomes necessary to communicate on occasions with but a single aircraft and on other occasions with all aircraft of a particular group, it is necessary, for most efficient use of the communication equipment, that receiving equipment be capable of distinguishing between message signals of which it is an intended recipient and all other signals and to record only the former.

With the foregoing general considerations in mind, the principal objects of the present invention as related to the overall equipment are:

(1) To provide legible record producing communication equipment peculiarly adapted for use in aircraft and similar relatively small vehicle installations in conjunction with radio transmitting and receiving equipment for message communication purposes.

(2) To provide communication equipment embodying a keyboard unit, a data storage device, and a legible record producing device adapted for use in conjunction with radio transmitting and receiving equipment and selectively operative to store a message under keyboard control for future transmission, to transmit a message either under keyboard control or under control of the storage unit, or to receive a message, and operative to produce a legible record of all messages transmitted, received or stored.

(3) To provide airborne communication equipment embodying a keyboard unit, a legible record producing unit, and a data storage device adapted for use in conjunction with radio transmitting and receiving equipment for the selective receipt, transmission or storage for future transmission of messages and for producing a legible record of all such messages in which the keyboard and record producing device are separate compact lightweight units separate from and electrically connected to a third unit embodying the storage device and the circuitry for selectively controlling the dissemination of such messages.

(4) To provide communication equipment operative to monitor all signals received on a selected broadcast channel and only upon receipt of a predetermined sequence of identification signals to produce a printed record of the message received following the receipt of such identification signal.

(5) To provide communication equipment operative to monitor all signals received on a selected broadcast channel and selectively operative to produce a printed record of all messages received on such channel, or to produce a printed copy of only those messages received on such channel which are preceded by predetermined sequence of identification signals.

(6) To provide communication equipment adapted to analyze successive unit data indicative of time sequential signal groups and produce for each of such signal groups a group of simultaneous signals indicative of the same unit data as the analyzed time sequential signal group for controlling the operation of a printing unit.

(7) To provide communication equipment embodying a compact magnetic data storage device operative to intermittently advance a magnetic record through a recording station and selectively operative to record or sense a group of signals extending transversely of the path of movement of such magnetic record.

(8) To provide communication equipment which is operative under keyboard control to produce upon a magnetic record tape in a longitudinal succession of transversely arranged unit data indicative signal groups a record of a message and which is operative selectively to subsequently produce, under control of such record tape, a succession of time sequential signal groups indicative of the units of recorded data.

(9) To provide communication equipment embodying a type wheel form of page printer, and a control arrangement therefor operative in response to the successive alternative application of simultaneous signals to a channel of each of a plurality of pairs of channels and constituting a succession of coded signal groups of a message to successively position said type wheel in accordance with the significance of the coded signal group to record a message.

An electro-mechanical printer is included as a component of the present invention in functional cooperation with a matrix segment of the control circuit, to receive, convert and legibly record coded signals received by the transmitter-receiver unit or initiated from the unit keyboard. The particular type of legible recording apparatus used is known in the printing telegraph field as a type wheel page printer.

Prior art devices for receiving conventional coded signals, of the type wheel page printer form, are normally composed of a type wheel; relatively complex mechanism for moving the type wheel into a selected character printing or space position; an inking device for the type wheel, which may be a movable ribbon; and a carrier for the page upon which the message is to be printed. Major portions of such prior art operating mechanisms, e.g., the type wheel, inking device or ribbon, and positioning mechanisms have been located for movement in front of the page upon which the message is to be printed with the disadvantageous result that the copy cannot be completely read as it is printed. Furthermore such heretofore known printing telegraph devices have been of a relatively complex nature with a multiplicity of mechanical parts which necessarily require repeated adjustments and servicing and whose additive weight results in a heavy unit. Furthermore the inking device must be constantly attended to assure clean sharp representation of the figures of the message and ink consistency varied with temperature changes, frequently encountered in aircraft.

The printer in the present invention provides, with its control matrix, a new and novel telegraph receiver of the page printing type wherein the only portion of the operating mechanism located in front of the page upon which the message is to be printed is a printing hammer, although the mechanism can be modified to be used with an ink ribbon if so desired, e.g. the ribbon can be carried by the hammer mechanism. The preferred embodiment utilizes commercially available special black surfaced paper, the black surface being treated with a light colored material. When the hammer strikes the surface material and forces the paper against the selected character of the type wheel located immediately behind the paper in line with the hammer, the portion of the treated material over the raised letter on the type wheel is broken, leaving a visual substantially black manifestation of the raised character. This manner of visual character recording is unaffected by temperature variations.

The novel printing apparatus per se of the invention comprises a type wheel, which is letter spaced across the page by a cable wound on a spacing drum. The cable, attached through a bearing collar on the type wheel, is selectively shiftable by positive incremental rotation of the cable drum, which enables successive spacing of the type wheel. The positive rotation of the spacing drum winds and stores power in a clock type spring inside the drum, which is utilized for the type wheel return movement. A narrow printing hammer is mounted for spacing in front of the page in synchronism with the spacing of the type wheel. Through a novel system of pulleys the spacing cable is utilized to laterally shift the print hammer, as well as the type wheel, in direct synchronization with the type wheel. When a selected character is to be printed the hammer which is positioned and normally held in a forwardly spaced relation away from the page is impelled toward the type wheel to compress the page therebetween and inscribe the selected character on the front of the page.

All operating mechanisms for actuating and controlling the action of print hammer and type wheel are mounted on the sides, in the back or at the bottom of the printed page so as not to obstruct a view of the page when the message is being printed. The print hammer, although located directly in front of the page has a normal position, which because of the design of the printer, mounting arrangement of the hammer and rapidity of motion of the hammer, never appears to be in a position obstructing any part of the line of printed matter which therefore will always be completely visible.

The type wheel character selection is accomplished through a novel extremely lightweight controlled stop mechanism coordinated with the shaft upon which the type wheel is fixed. This includes a toothed stop wheel, rotatable with the type wheel shaft, having a plurality of stop positions determined by the engagement of a solenoid controlled pawl with individual stop wheel teeth. The stop mechanism uses two such solenoid controlled pawls so positioned around the periphery of the stop wheel that one pawl will engage and stop the stop wheel at a position intermediate the positions at which the other pawl engages and stops the stop wheel. Thus the number of angular selections of type wheel rotation can be controlled by energization of one of the two solenoids at selected rotational positions of the type wheel shaft. Energization of the solenoids at precise positions of shaft rotation is accomplished through printed commutator circuits disposed adjacent each end of the type wheel shaft, each commutator circuit controlling one solenoid and, through its associated pawl, one-half of the characters on the type wheel. Through a receiving matrix in the control circuit, one or the other of the commutators will control its respective solenoid for each code combination fed into the circuit. Use of the electrical selecting mechanism rather than a mechanical permutating code member selecting mechanism contributes in a large manner to the light weight of this printer.

One important aspect of the printer is in the use of a matched toothed wheel on the type wheel shaft coordinated with the toothed stop wheel and used to positively pivot the stop pawls into a stop position ahead of a tooth on the stop wheel. If the solenoid for that pawl is not then energized, the pawl is spring biased away from its stop position before the stop tooth engages the pawl. This procedure repeats for each tooth of the stop wheel and occurs for each pawl. Thus the pawls are positively positioned by type wheel shaft rotation and when a stop solenoid is energized, it does not have to actuate the pawl but merely holds it in its stop position, eliminating the mechanical delay of inertia that would be present in a pawl actuating solenoid.

The roll of page material is located on the rear side of the printer unit and feeds down behind, under and up in front of the type wheel shaft and type wheel and up over a feed roller. Through a new power mechanism which includes a novel positive action clutch driving a function shaft which in turn, through a friction clutch, drives the type wheel shaft, the apparatus can initiate line return or line feed movements at any spaced position of the type wheel, and the line return function may be so controlled to simultaneously initiate a line feed function or initiate only a line return function.

The invention in the printer per se has been divided from this application and constitutes the subject matter of a copending application Serial No. 127,037, filed July 26, 1961.

A further component of this complete set, the keyboard, is in general form similar to a standard teletypewriter keyboard but is modified in several of its mechanisms, as will be described. The keyboard may be used selectively to control the transmission of messages or to control the storage of message signals for future transmission, a printed record being made of the message in either event. Although, if necessary, the keyboard can be arranged to accommodate a larger number of character representations, the preferred and disclosed embodiment is arranged for transmission of signals indicative of the twenty-six characters of the alphabet, plus line return, line feed, letters and space.

Signal devices are included as components of the keyboard unit to enable the operator to visually determine several limit conditions of the complete set, i.e., the approach of the end condition of the magnetic tape in the tape recorder and the approach of the end of line position on the page printer. These signal devices are lamps which when illuminated indicate the above two conditions. Although the page printer of this set will automatically initiate line return and line feed, the operator, using proper sending technique, should send a line return and line feed signal at the end of each line, hence the need for an indicator to inform the operator when such position is being approached. In a conventional manner this transmitter utilizes five notched code bars actuated by the transmitter keys. Depending on the character key depressed, the five code bars are moved into a predetermined permutation, each bar moving either to the right or left side. Each code bar is associated with a pair of contacts and, when moved to the right, the bar will cause its set of contacts to close, conversely when moving to the left the bar will cause the contacts to be opened. Closed contacts represent mark impulses and open contacts represent space impulses. Thus each key will operate the code bars to provide a particular combination of five signals represented by the condition of the five code bar switches. The keyboard prepares the contacts for a simultaneous five unit signal combination that is fed through five separate line circuits to the main control unit circuit.

Immediately behind or parallel with the five code bars is a universal bar that always shifts in one direction whenever a key or the space bar is depressed and enables a code bar locking wedge to be biased into locking cooperation with the five code bars and the universal bar. Movement of the locking wedge into locking position prevents a resetting of the code bars and closes a sixth set of contacts. This action occurs each time a key is depressed, except as hereinafter described for repeat blocking. Due to a built-in mechanical time delay, the code bar contacts are completely set before the universal bar contact circuit is energized through actuation of the sixth set of contacts by the locking wedge. This enables the five unit code combination to be completely integrated into the control circuit before the control circuit electronic matrix is operated to transmit the code signal. The universal bar wedge actuated contacts initiate the control circuit operation to transmit the code signal in the manner desired and determined by the operator. Such control circuit operation, subsequent to code transmission, actuates a code bar locking wedge solenoid to release the locking wedge and enable the next key to be depressed which reshifts the code bars and universal bar to repeat the transmitting operation.

Incorporated on the universal bar is a novel repeat blocking device that cooperates with the locking wedge to prevent the wedge from relocking if any key is held in a depressed position which positively retains the universal bar in its shifted position. If the locking wedge cannot move to locking position its contacts cannot be closed and the control circuit will be inoperative for the combination of signal impulses represented by the code bar contacts. Release of the depressed key will permit the universal bar to shift back to its normal position and the repeat blocking device becomes inoperative.

Repeat blocking is inoperative upon space bar operation because the space bar has its own transmitter operating contacts in a circuit parallel to those of the wedge actuated contacts. If the space bar is depressed and held down the transmitter will repeat the combination of signals representing a space until the space bar is released.

The invention in the keyboard per se has been divided from this application and constitutes the subject matter of a copending application Serial No. 127,036, filed July 26, 1961.

Also included as part of the airborne teletypewriter apparatus is a novel recorder unit in which messages to be transmitted may be stored and then transmitted at a subsequent time. The recorder unit according to the invention is adapted to be located at a remote position in the aircraft to conserve space around the operator and is completely unattended at all times. In view of the intended operational environmental conditions, the recorder unit according to the present invention is provided with a minimum number of parts, has minimum weight and is ruggedly constructed to be capable of operation even when subjected to large acceleration forces.

The invention in the recorder (or storage unit) per se has been divided from this application and constitutes the subject matter of a copending application Serial No. 126,916, filed July 26, 1961.

These and other objects of the present invention will become more fully apparent by reference to the appended claims and as the following detailed disclosure proceeds with reference to the accompanying drawings wherein:

Figure 7A:
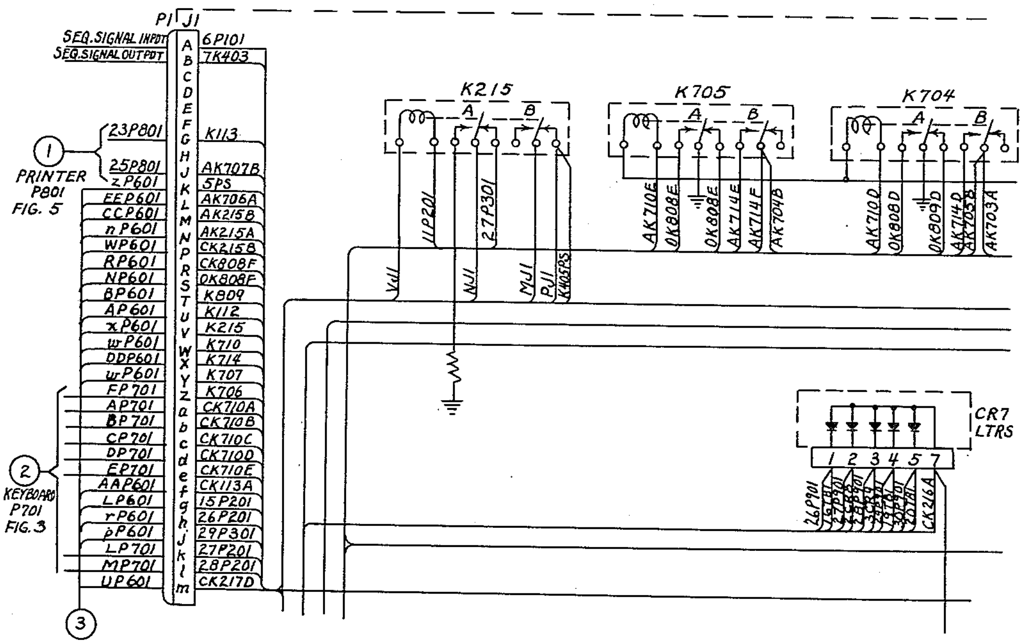
Figure 7:
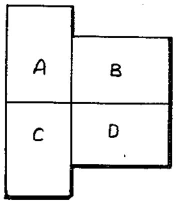
Figure 8:
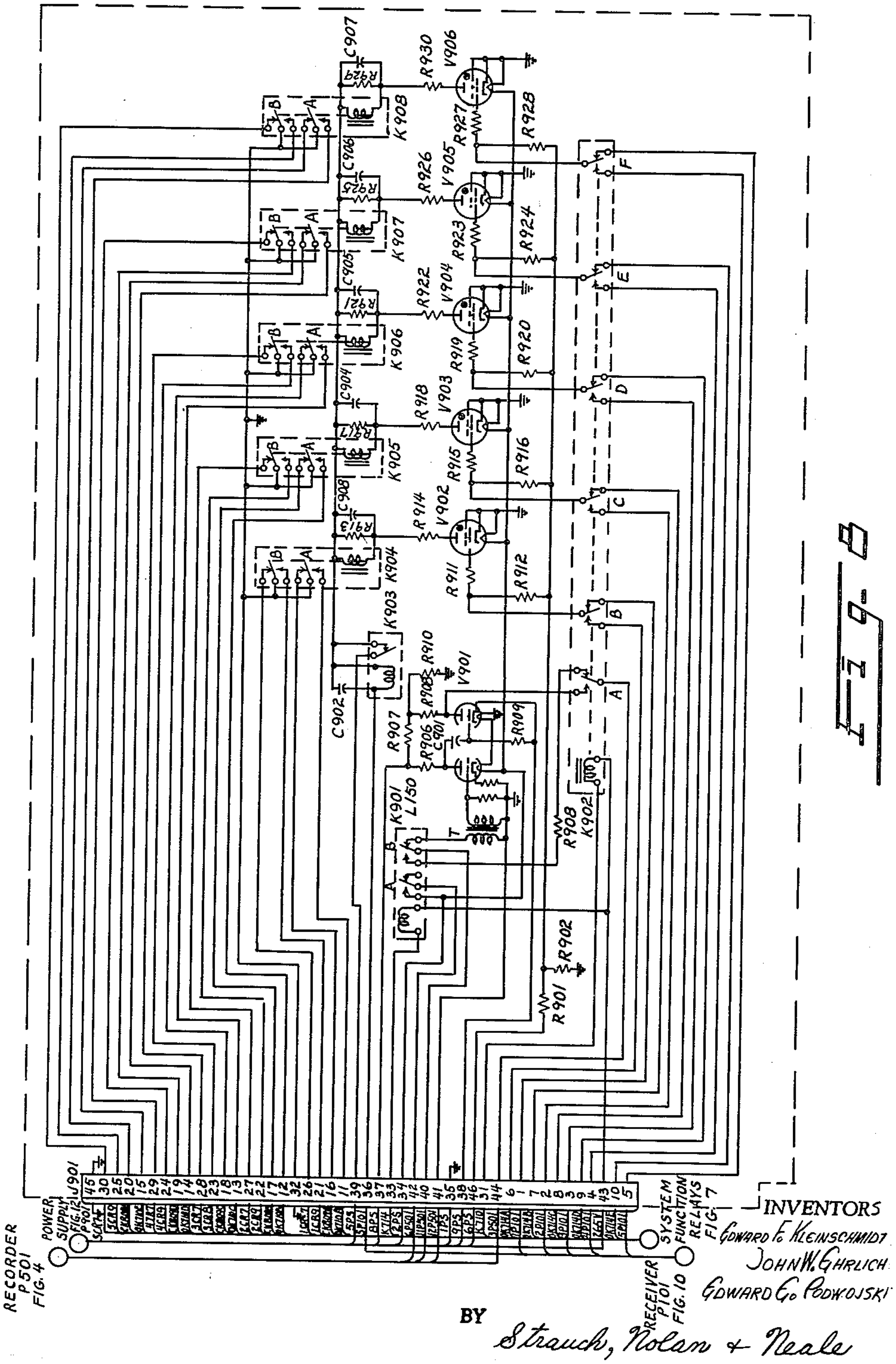
Figure 9:
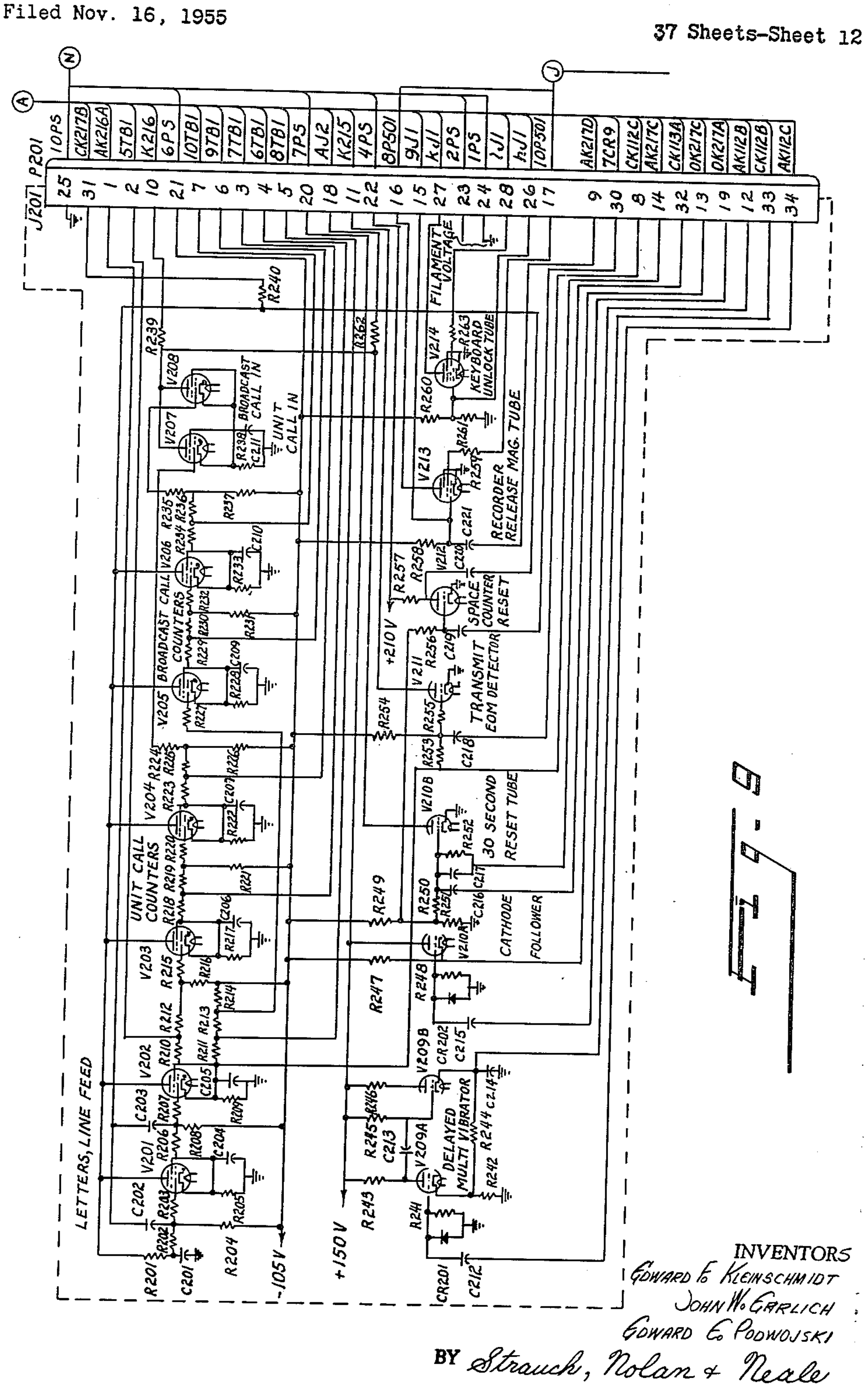
Figure 10:
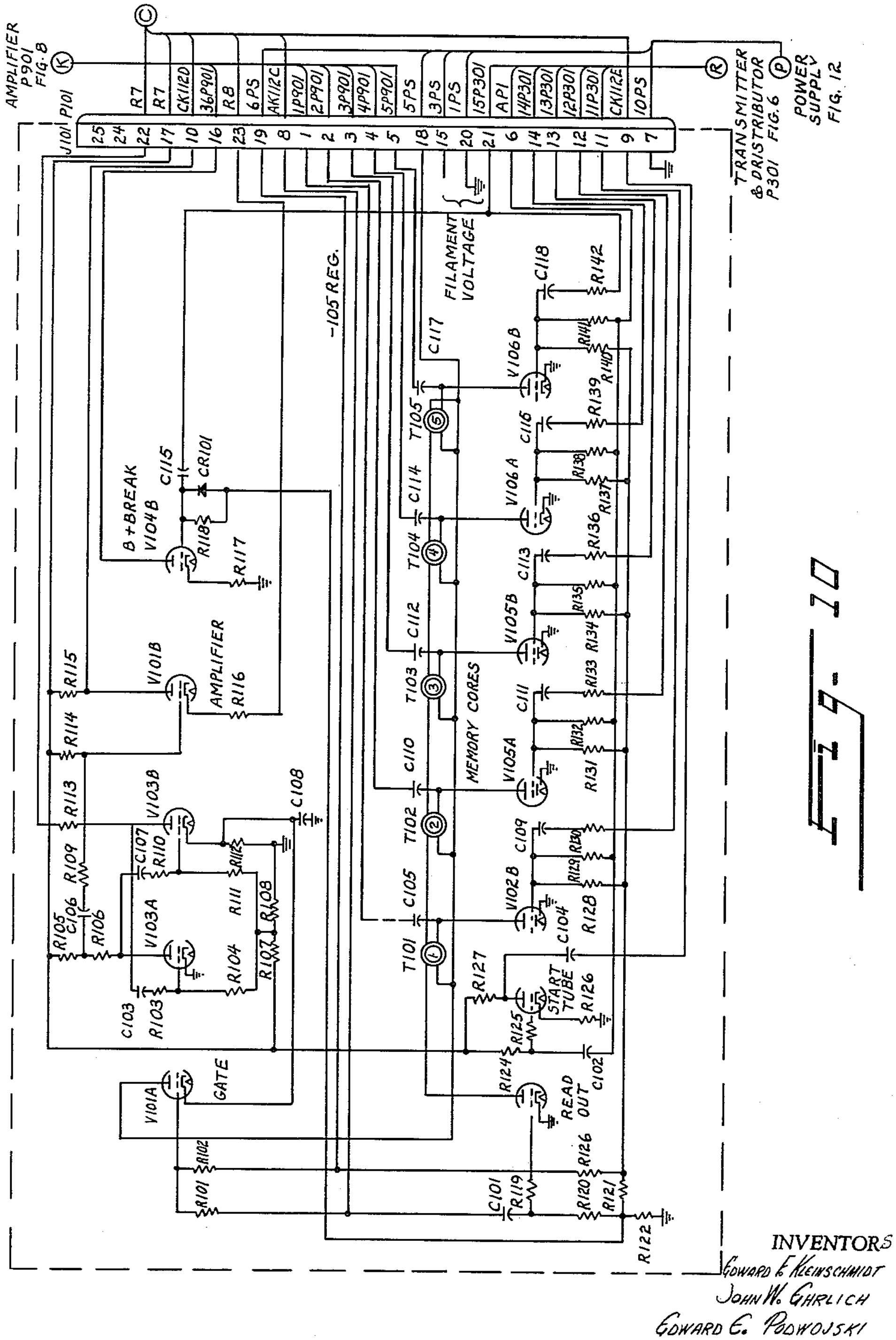
Figure 11:
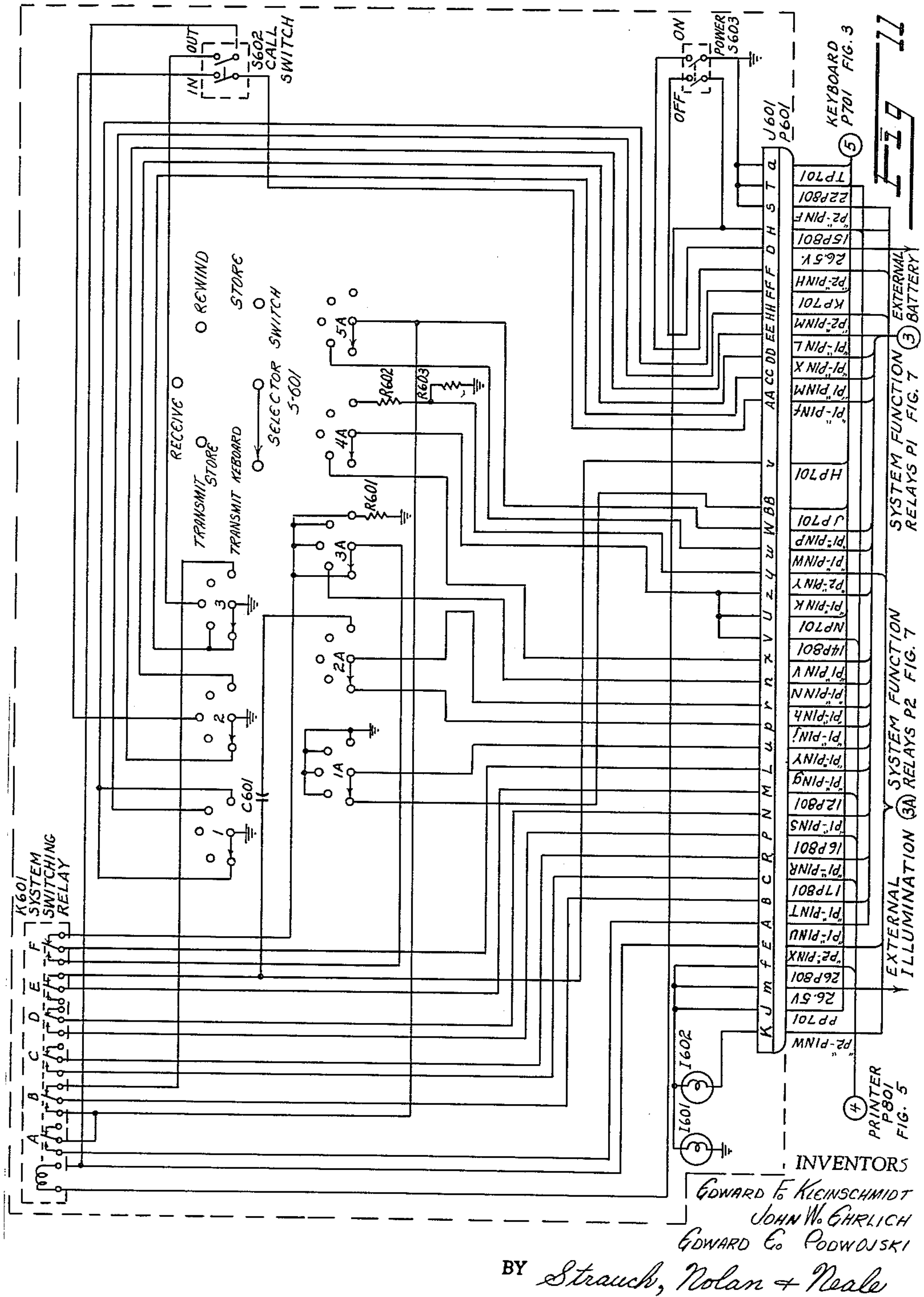
Figure 12:
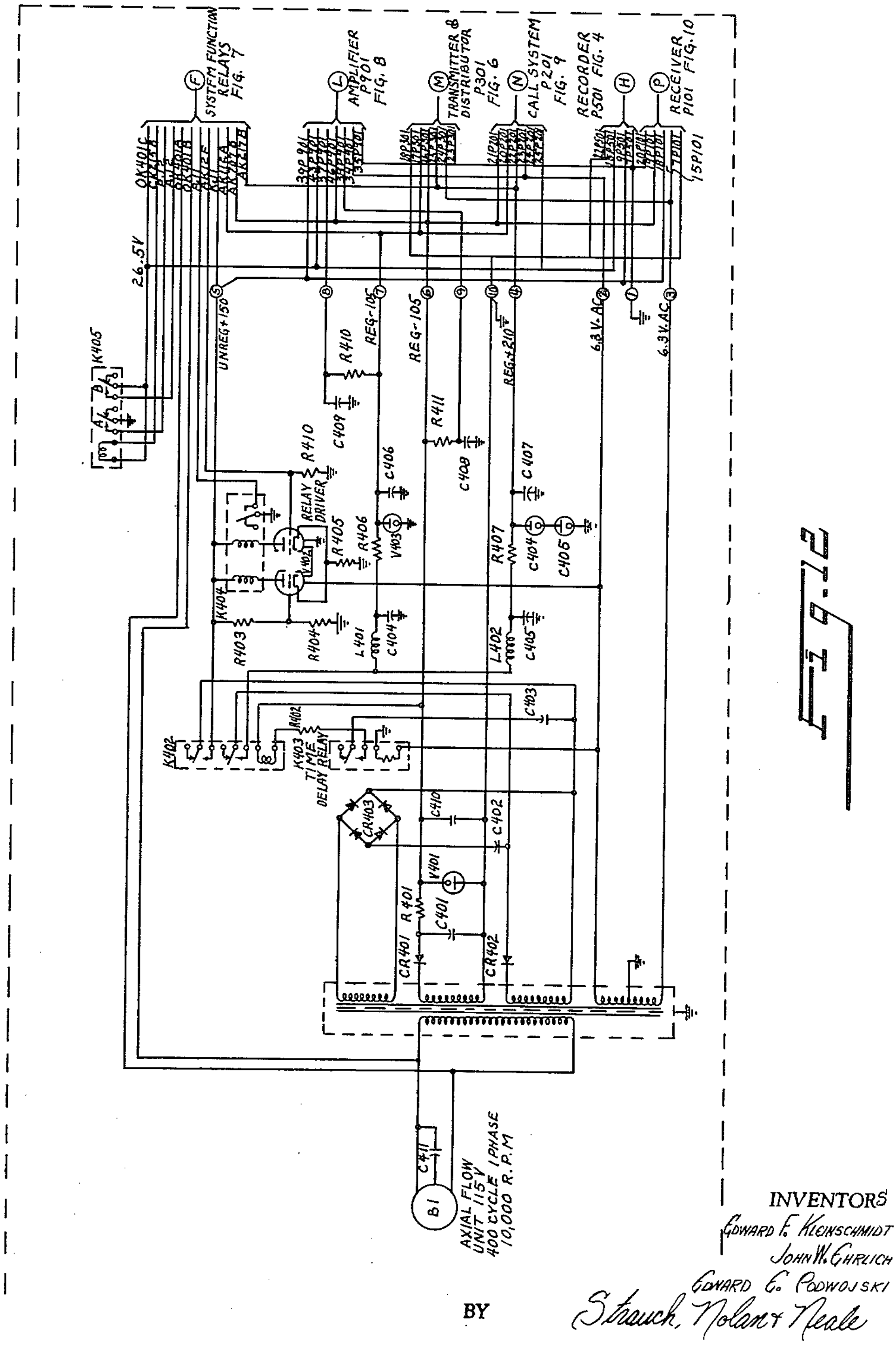
Figure 13:
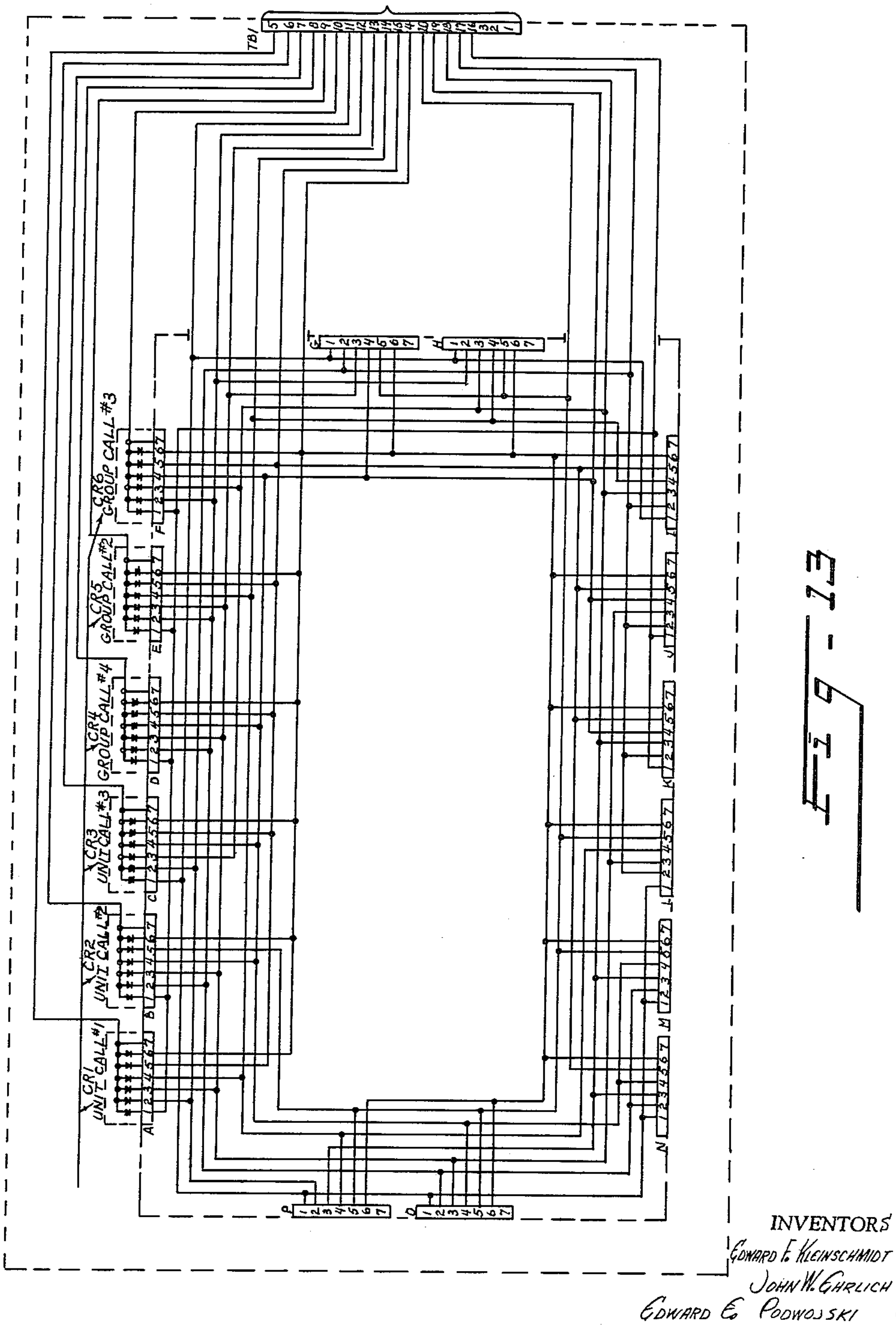
Figure 20:
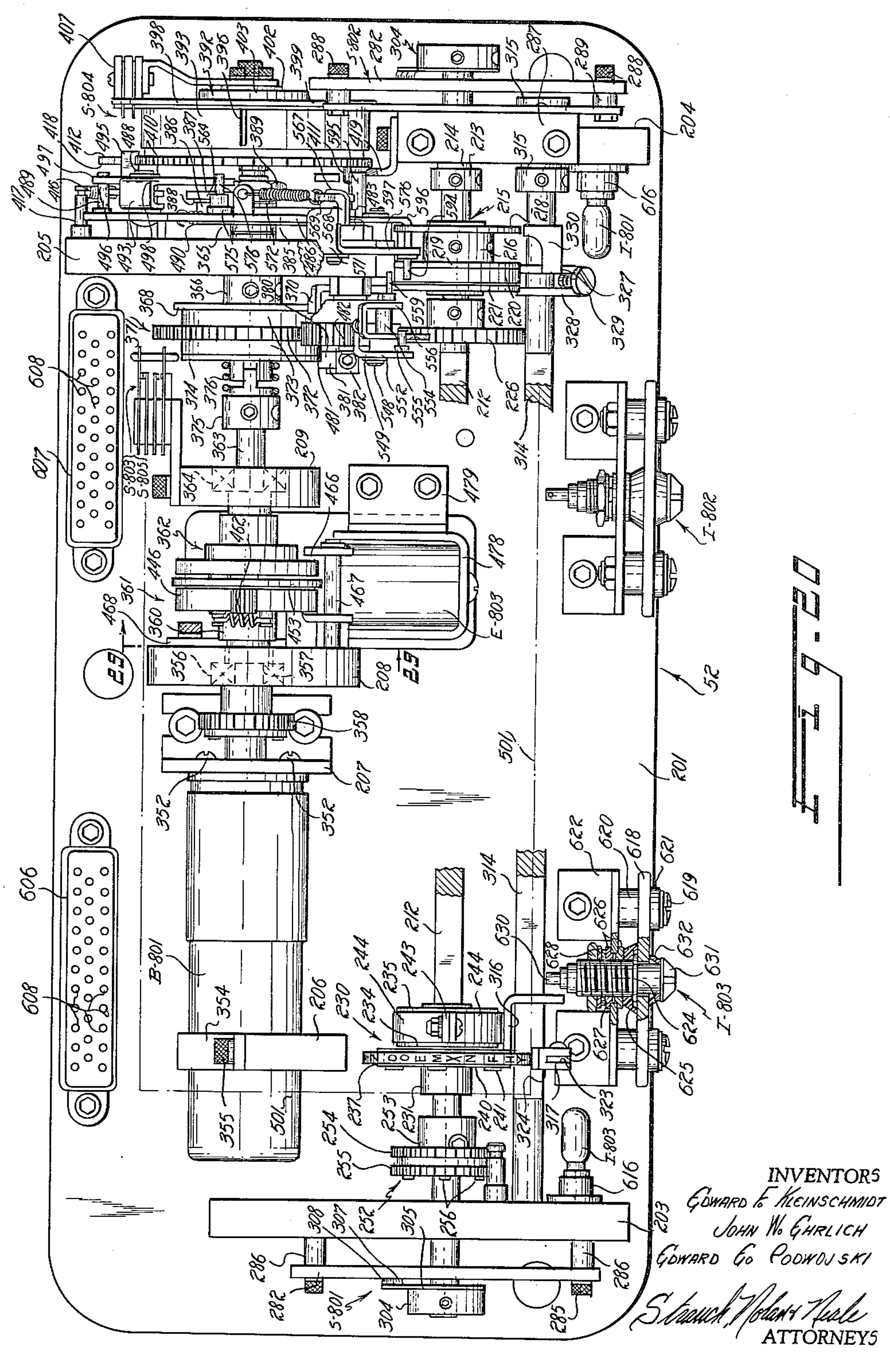
Figure 21:
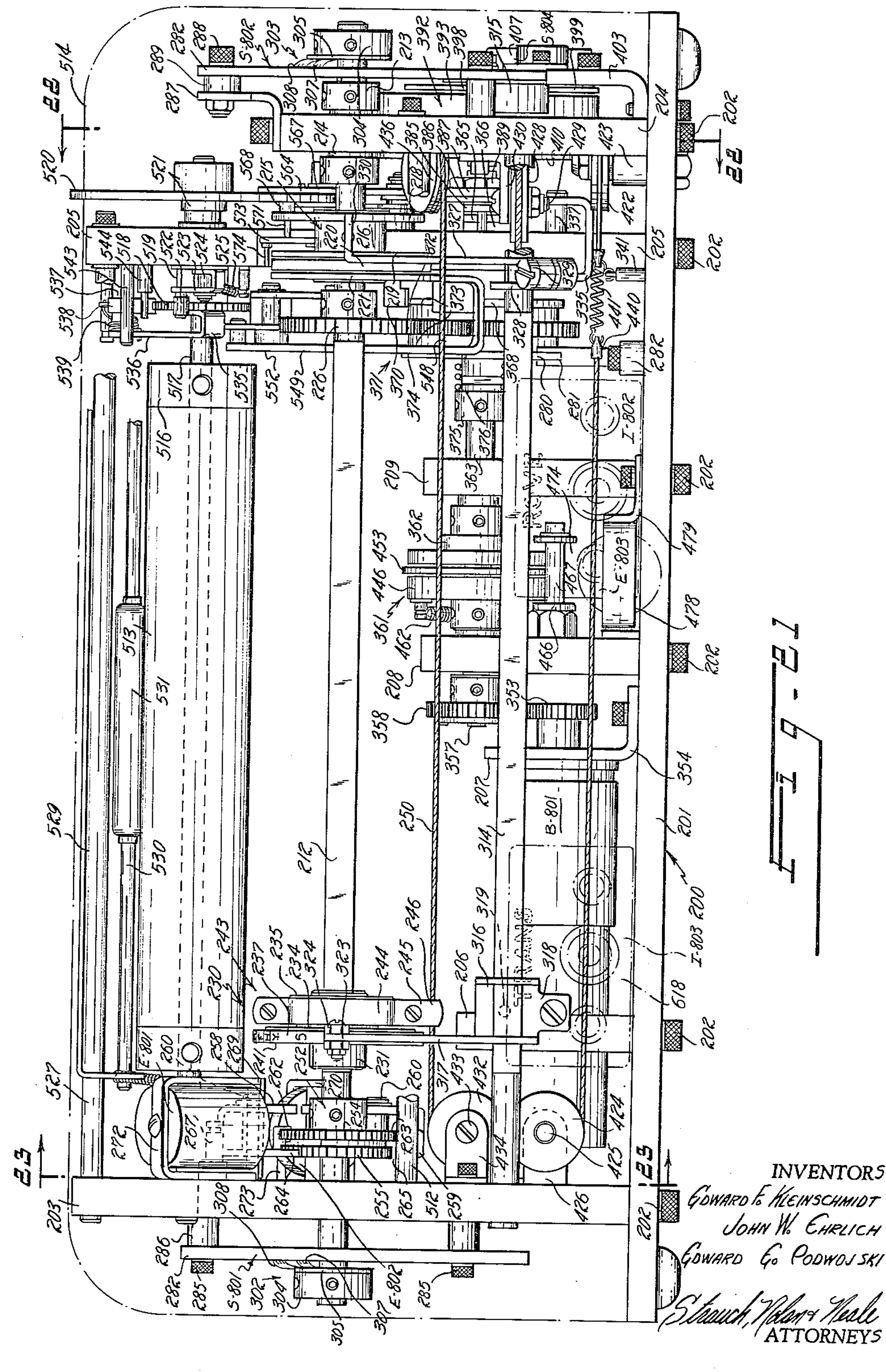
Figure 22:
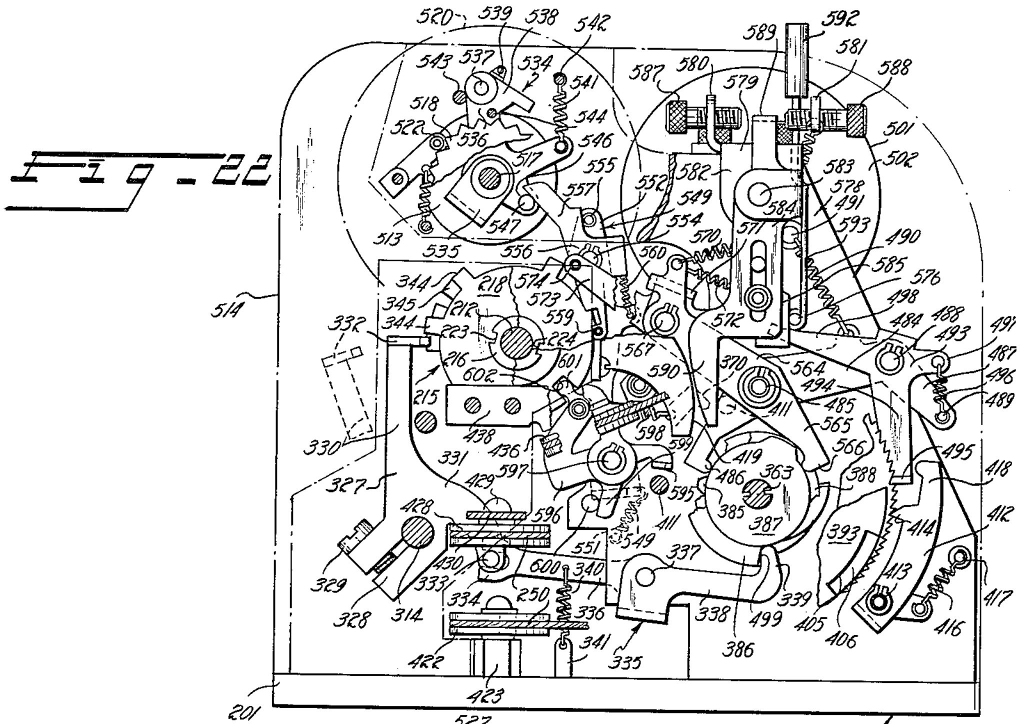
Figure 23:
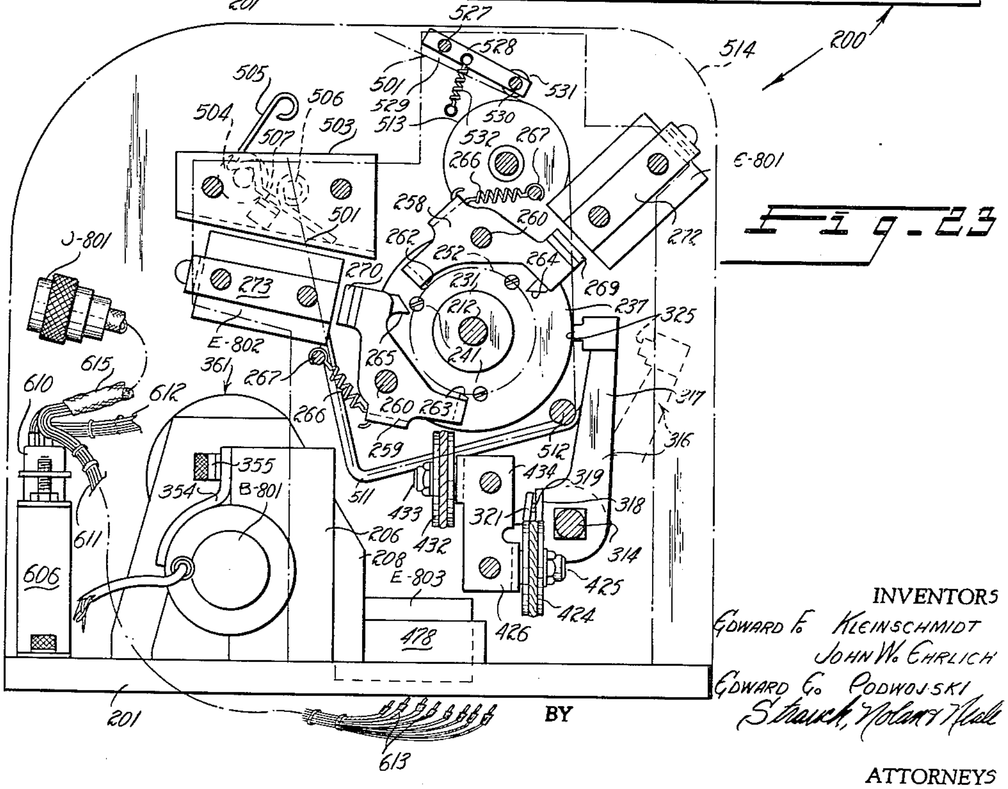
Figure 25:
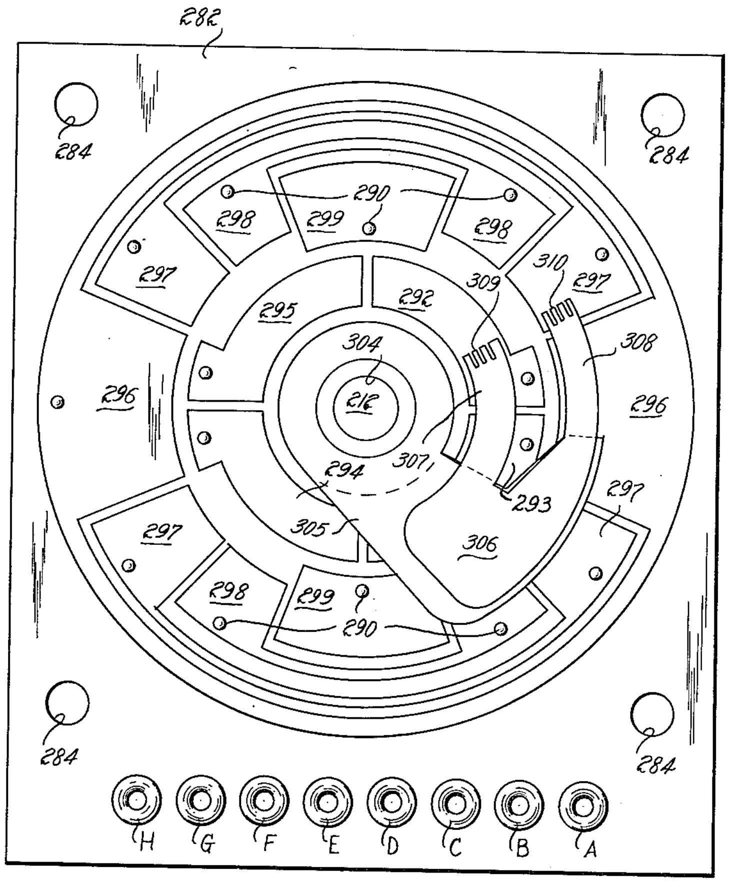
Figure 26:
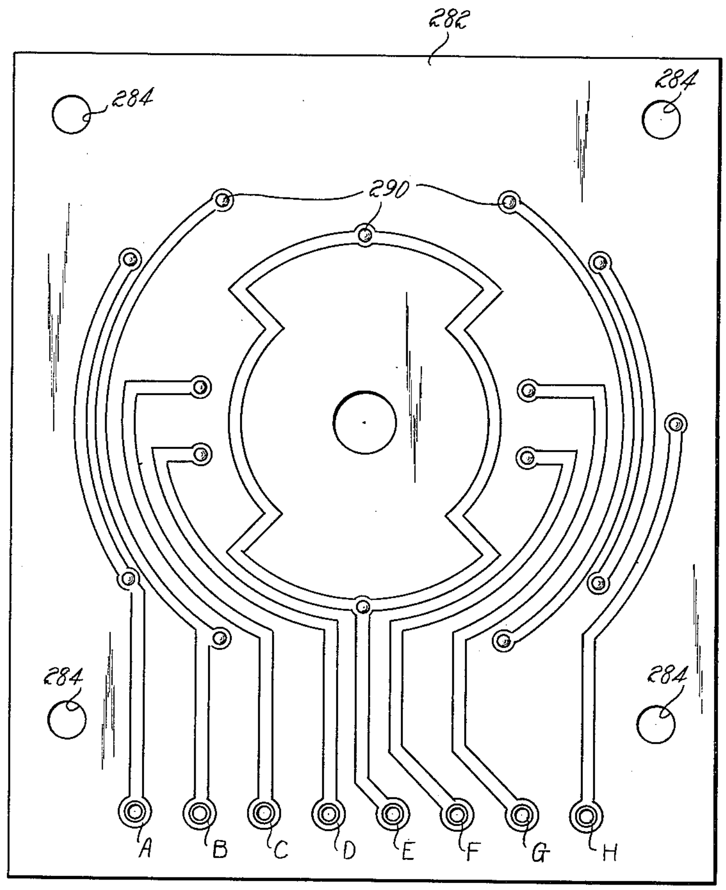
Figure 38:
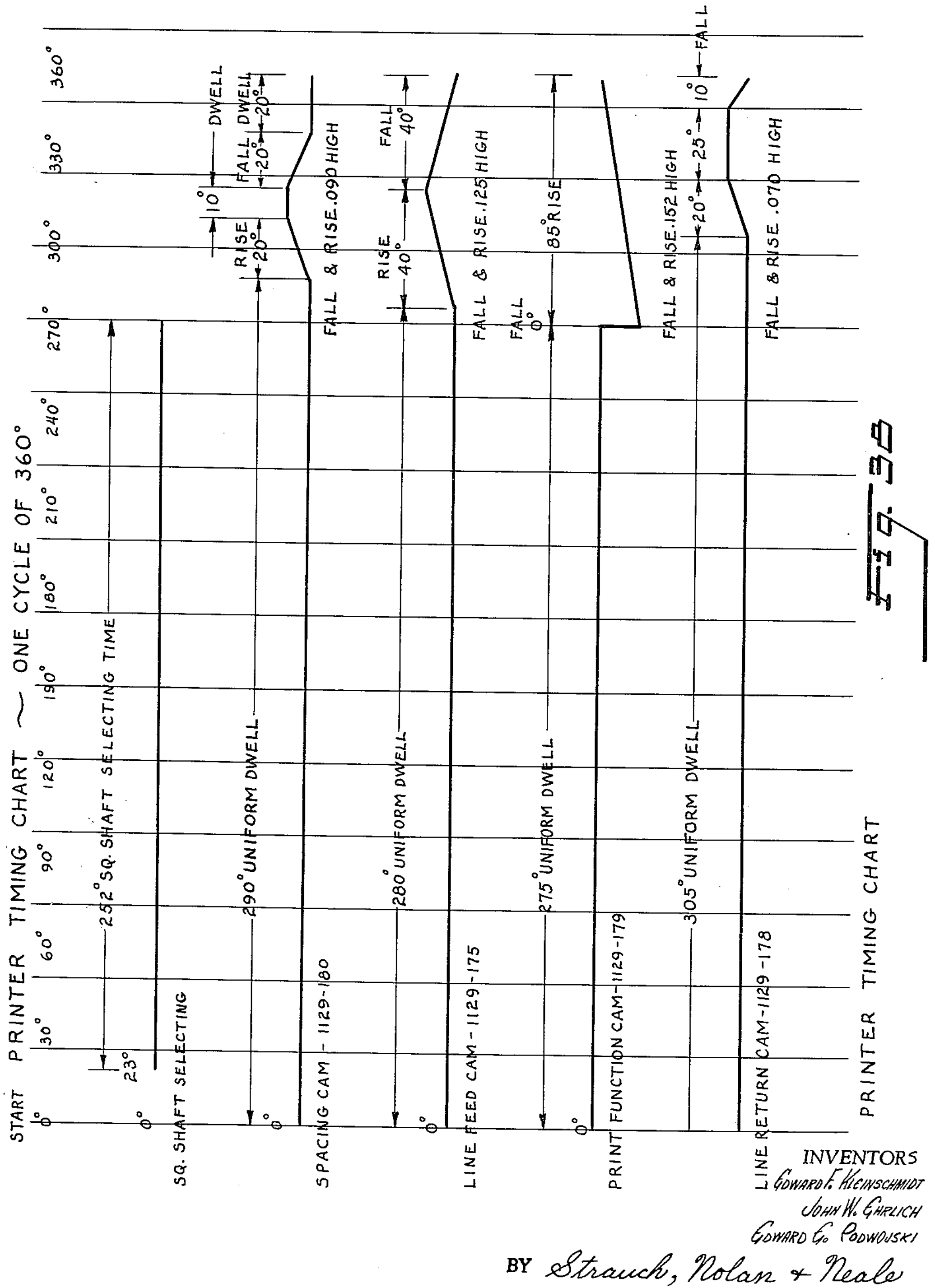
Figures 39, 42, 43, 52:
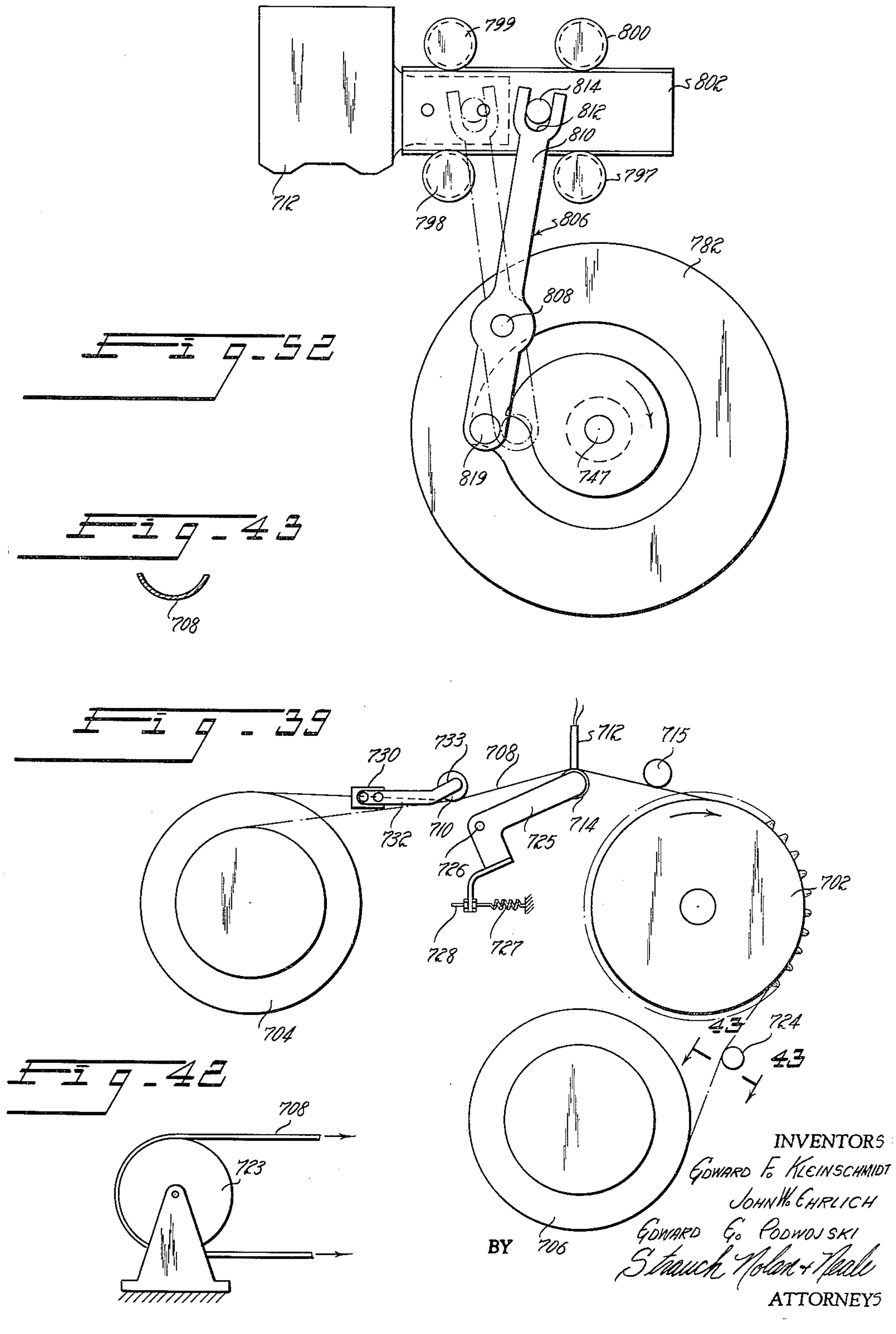
Figures 14, 15, 16:
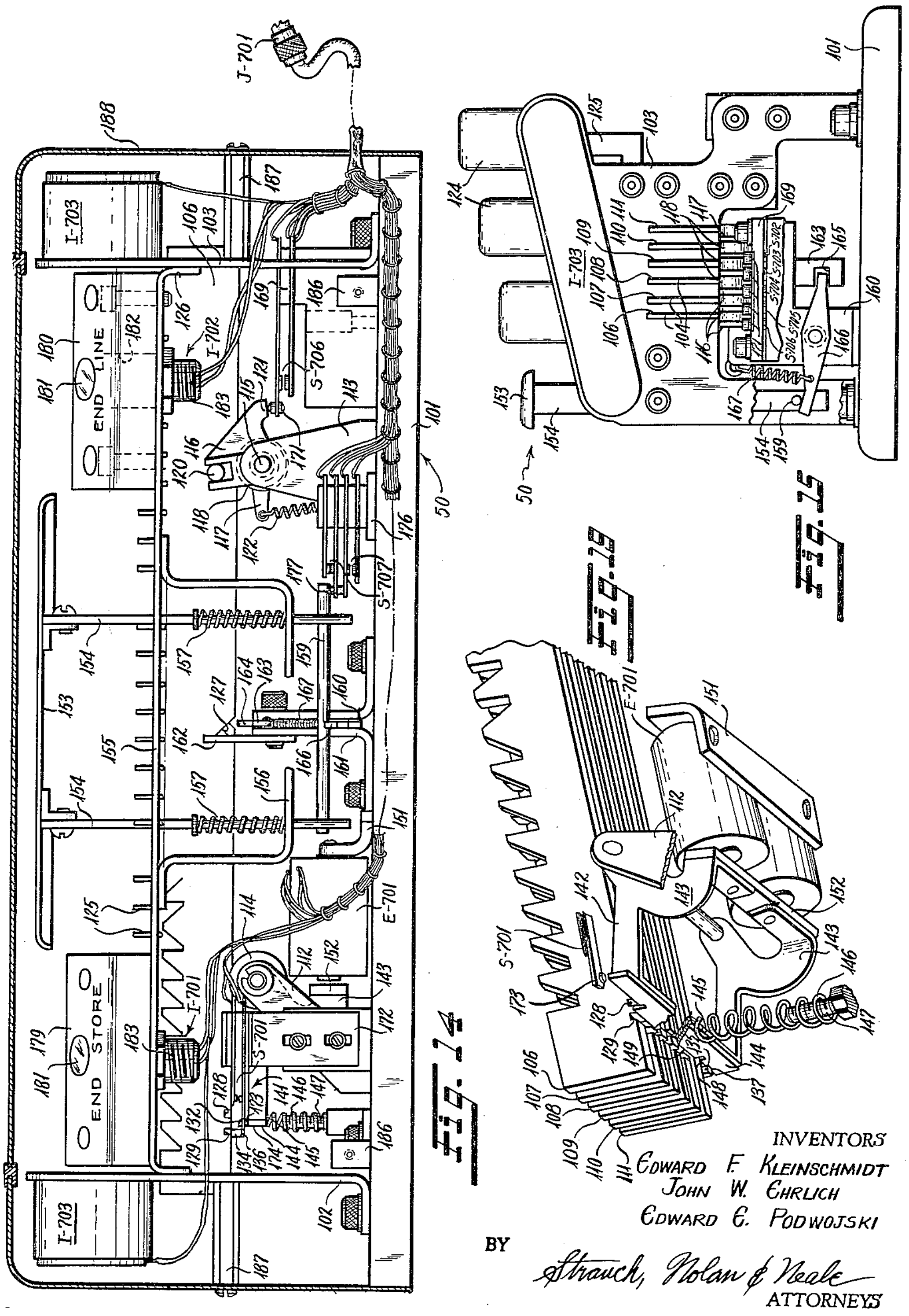
Figure 16:
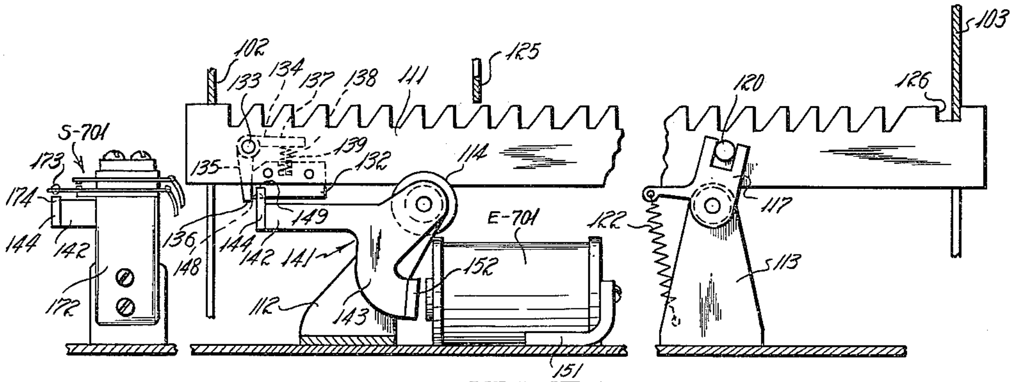
Figure 17:
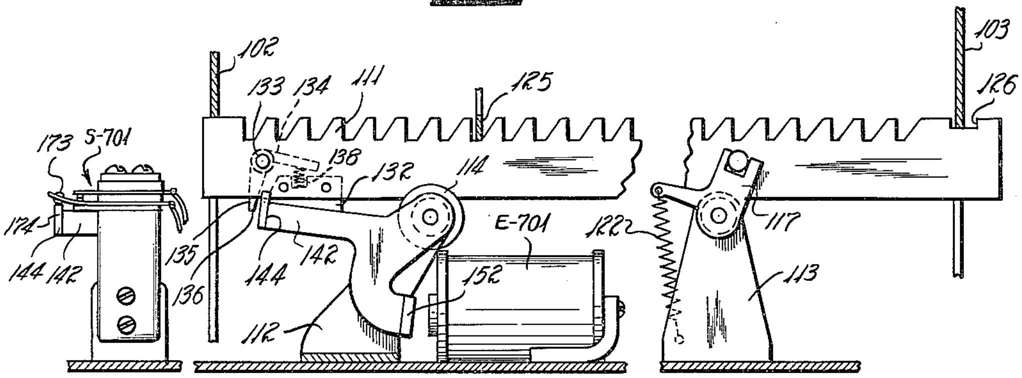
Figure 18:
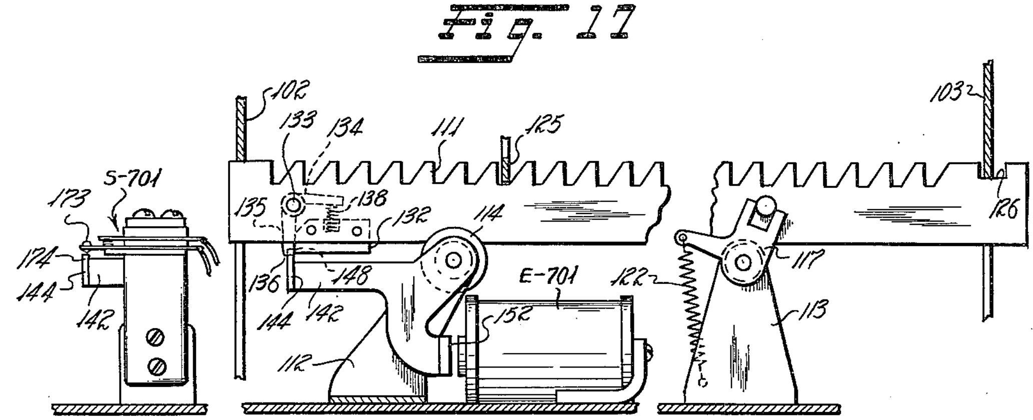
Figures 24, 33:
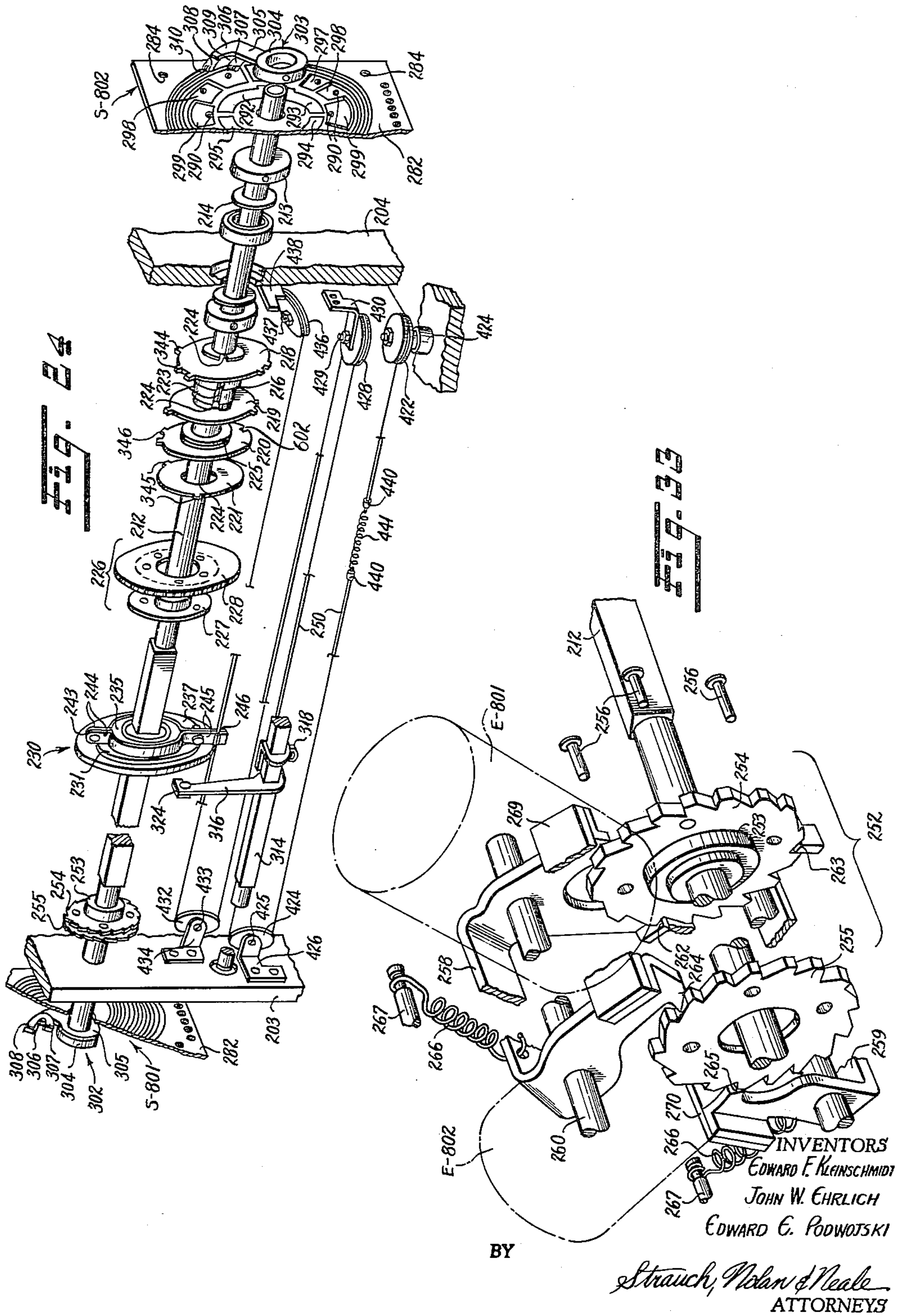
Figure 27:
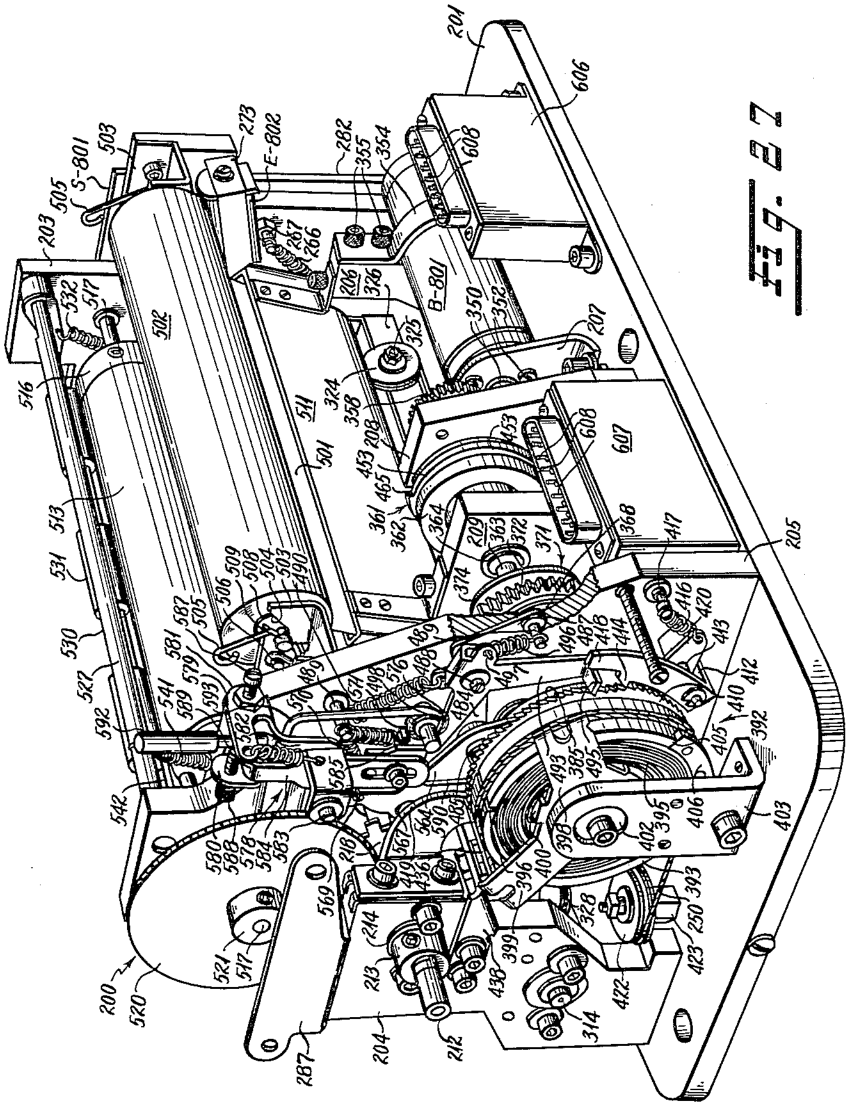
Figure 28:
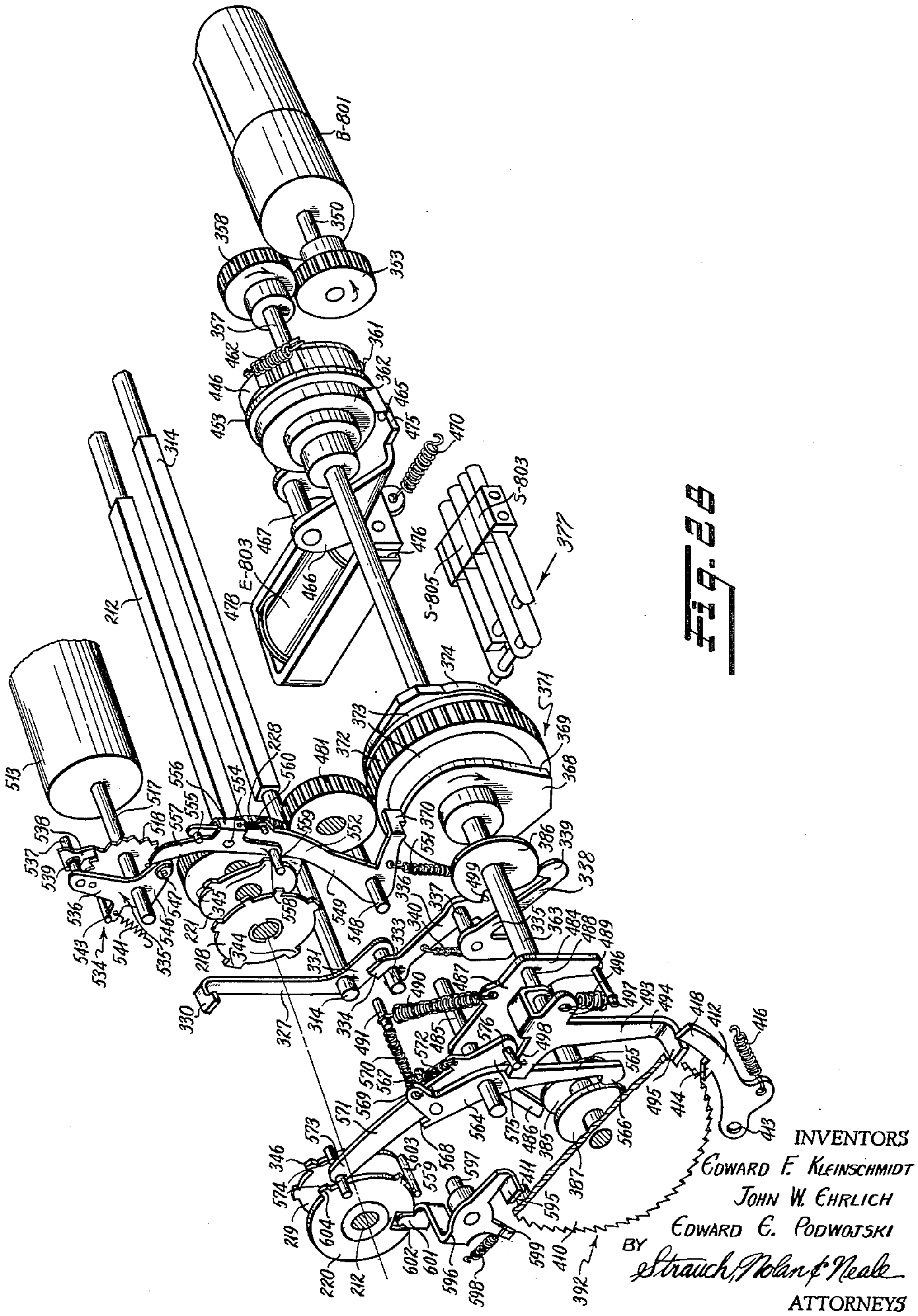
Figure 29:
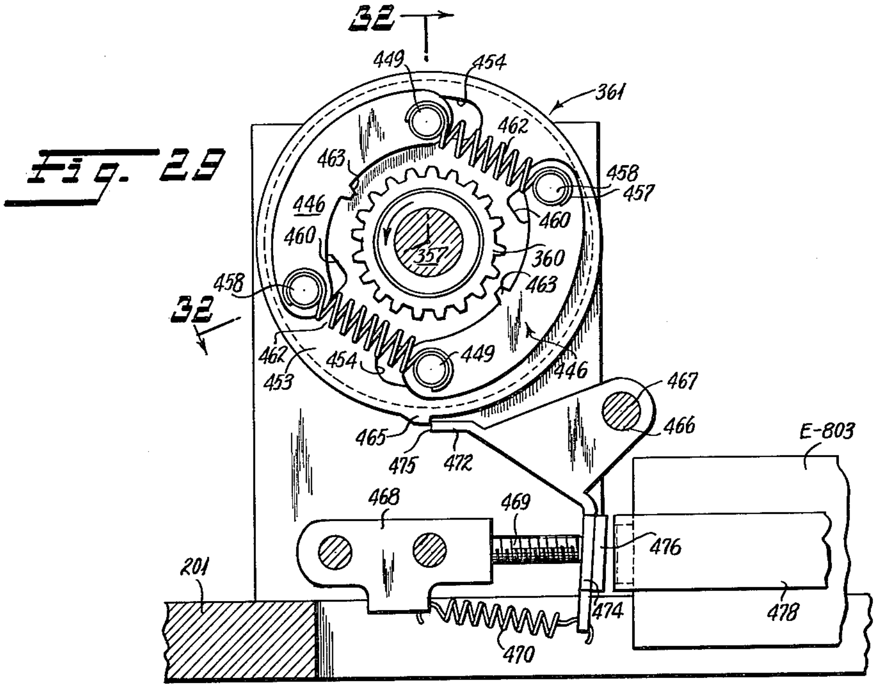
Figures 30, 31:
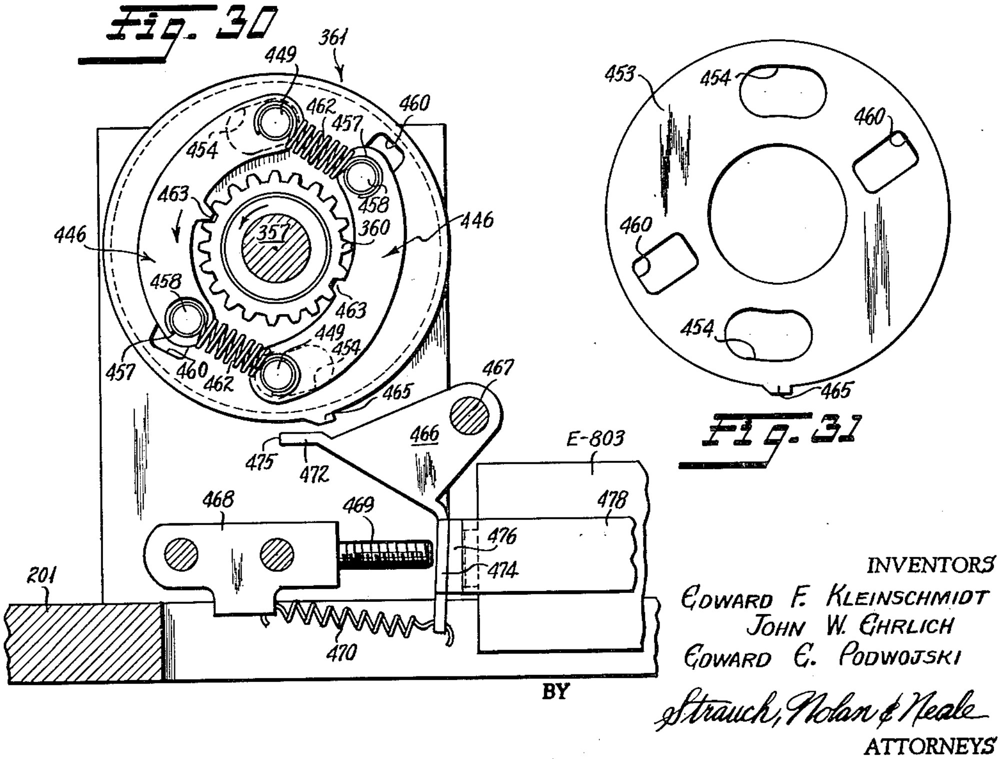
Figure 32:
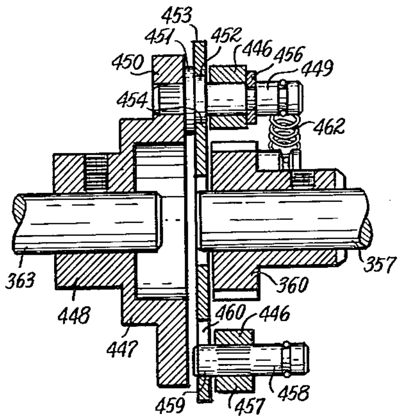
Figure 34:
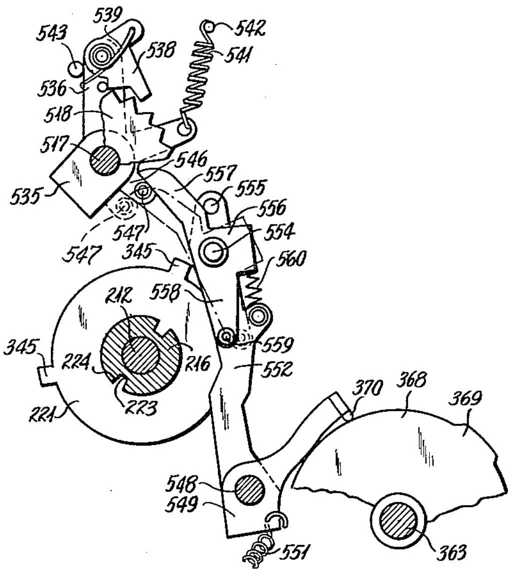
Figure 35:
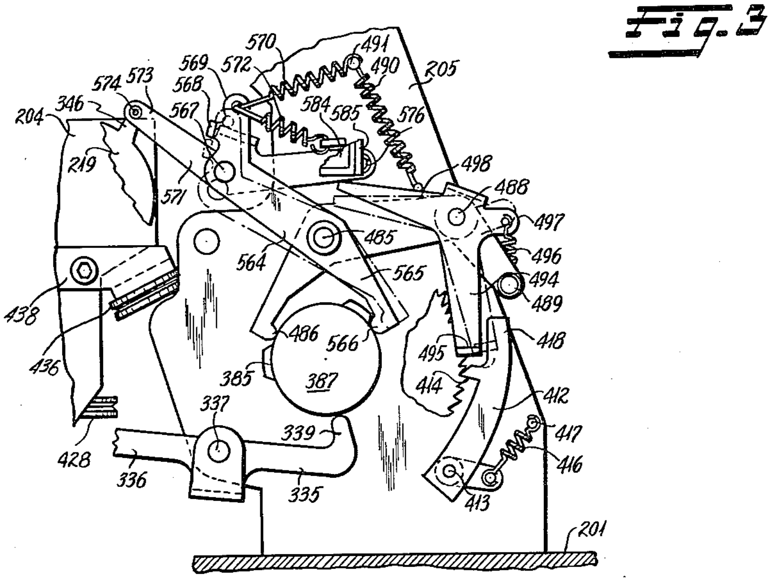
Figure 36:
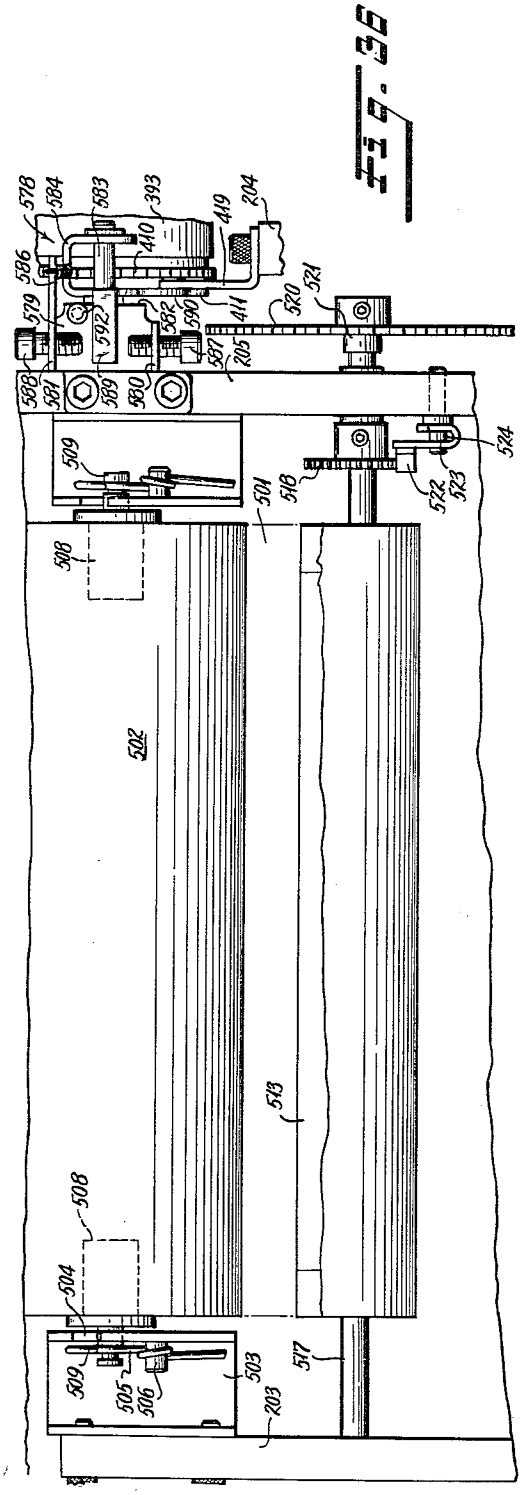
Figure 37:
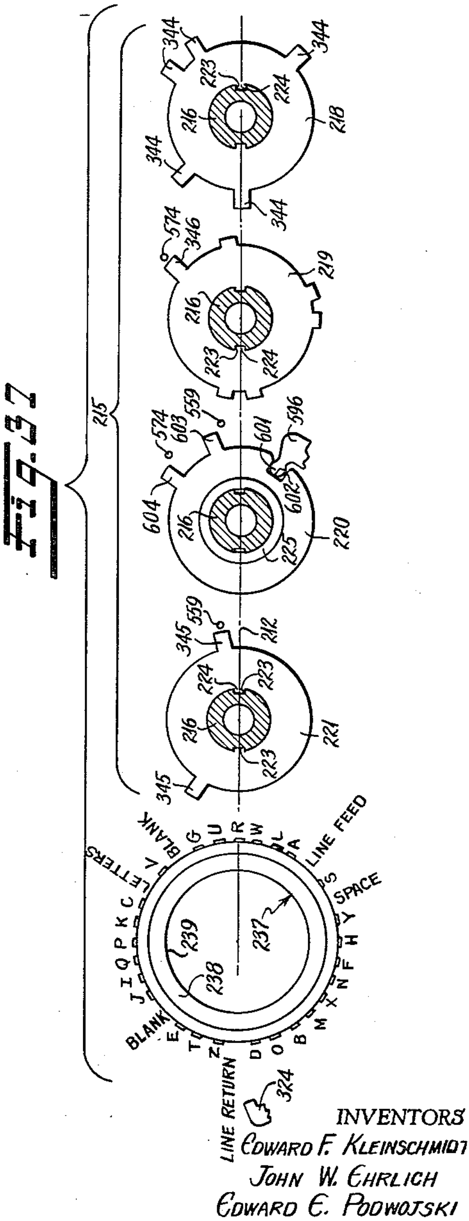
Figure 48:
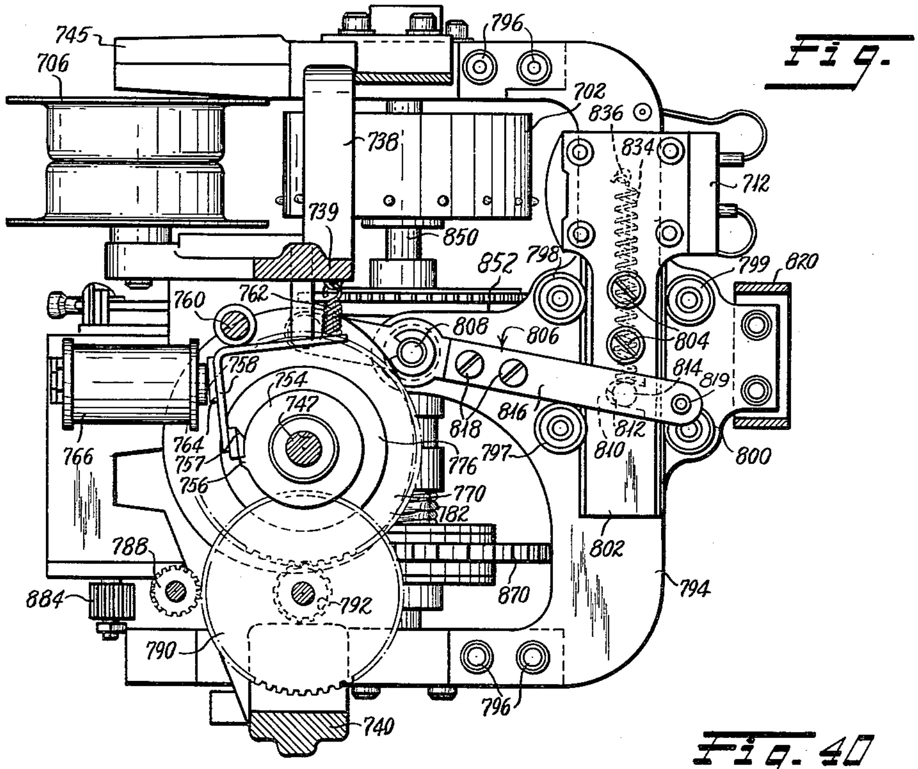
Figure 40:
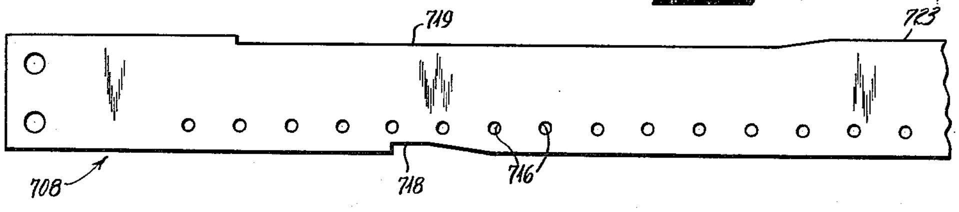
Figure 41:
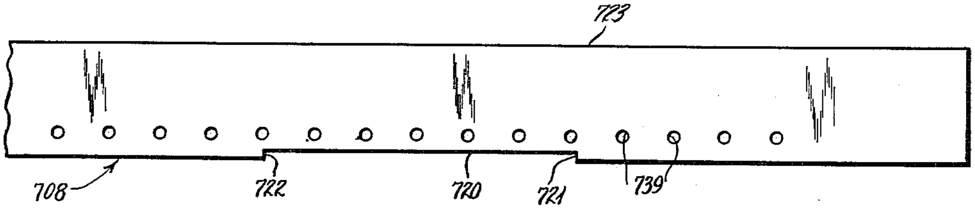
Figure 44:
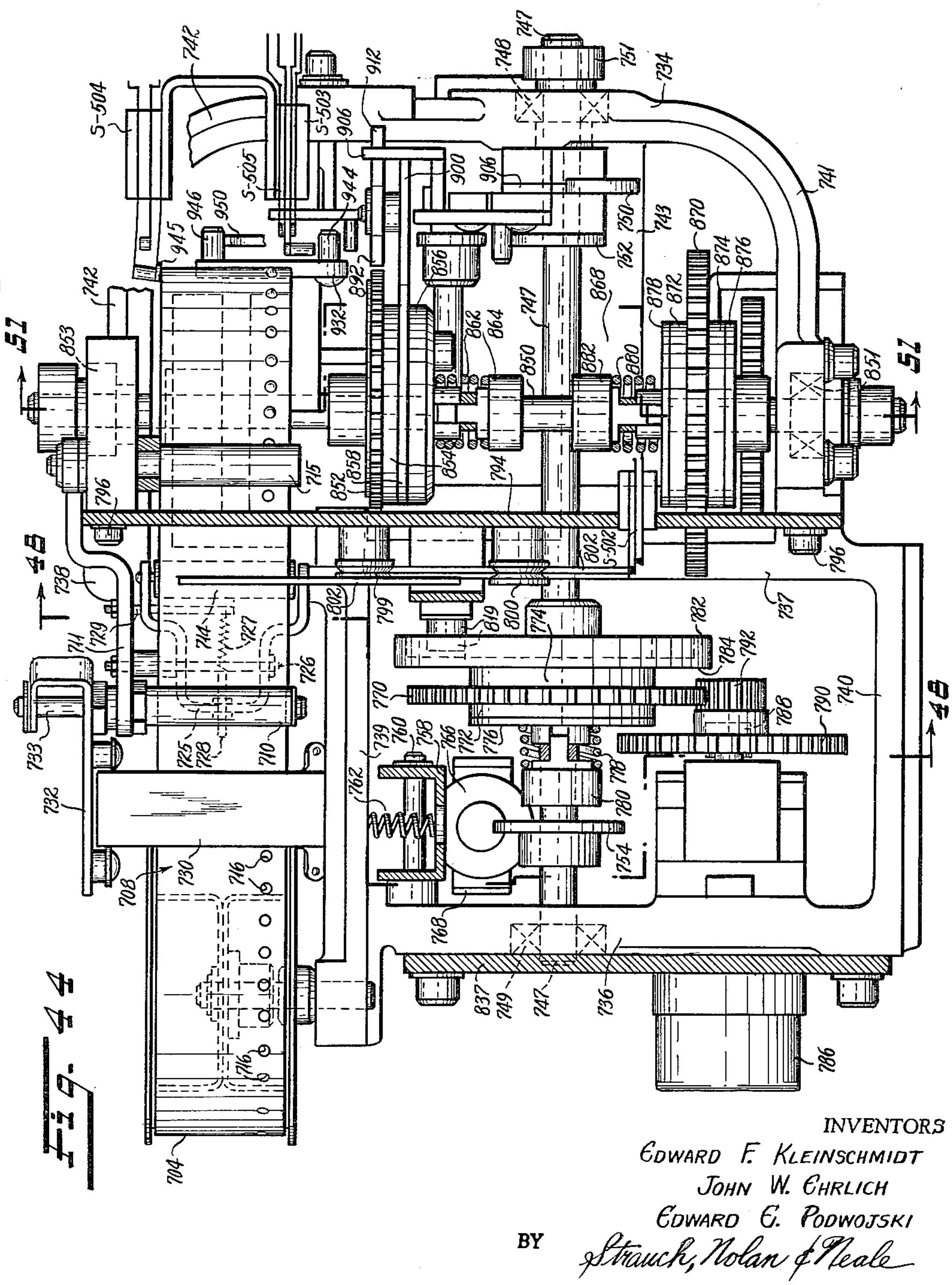
Figures 45, 49:
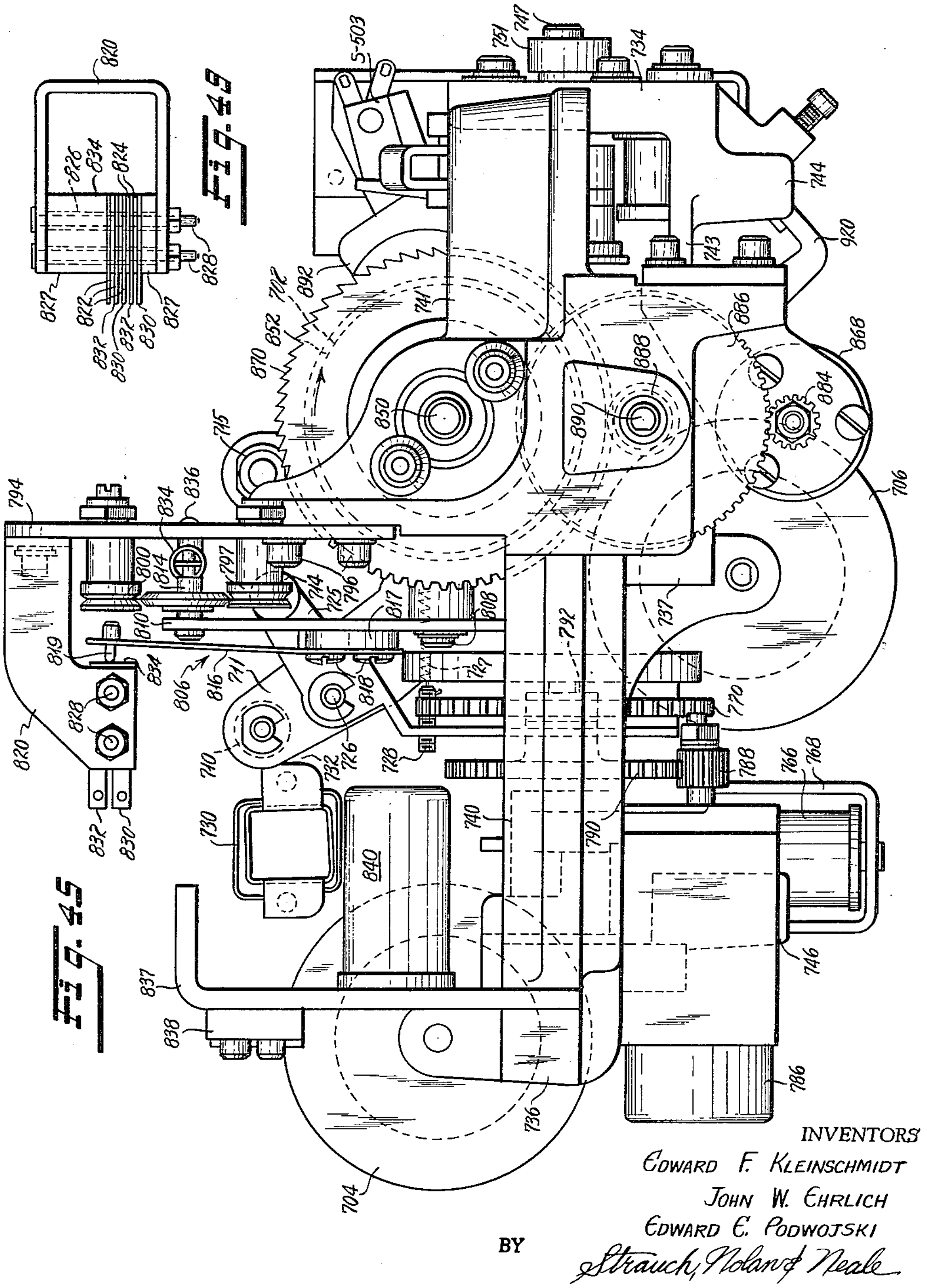
Figure 46:
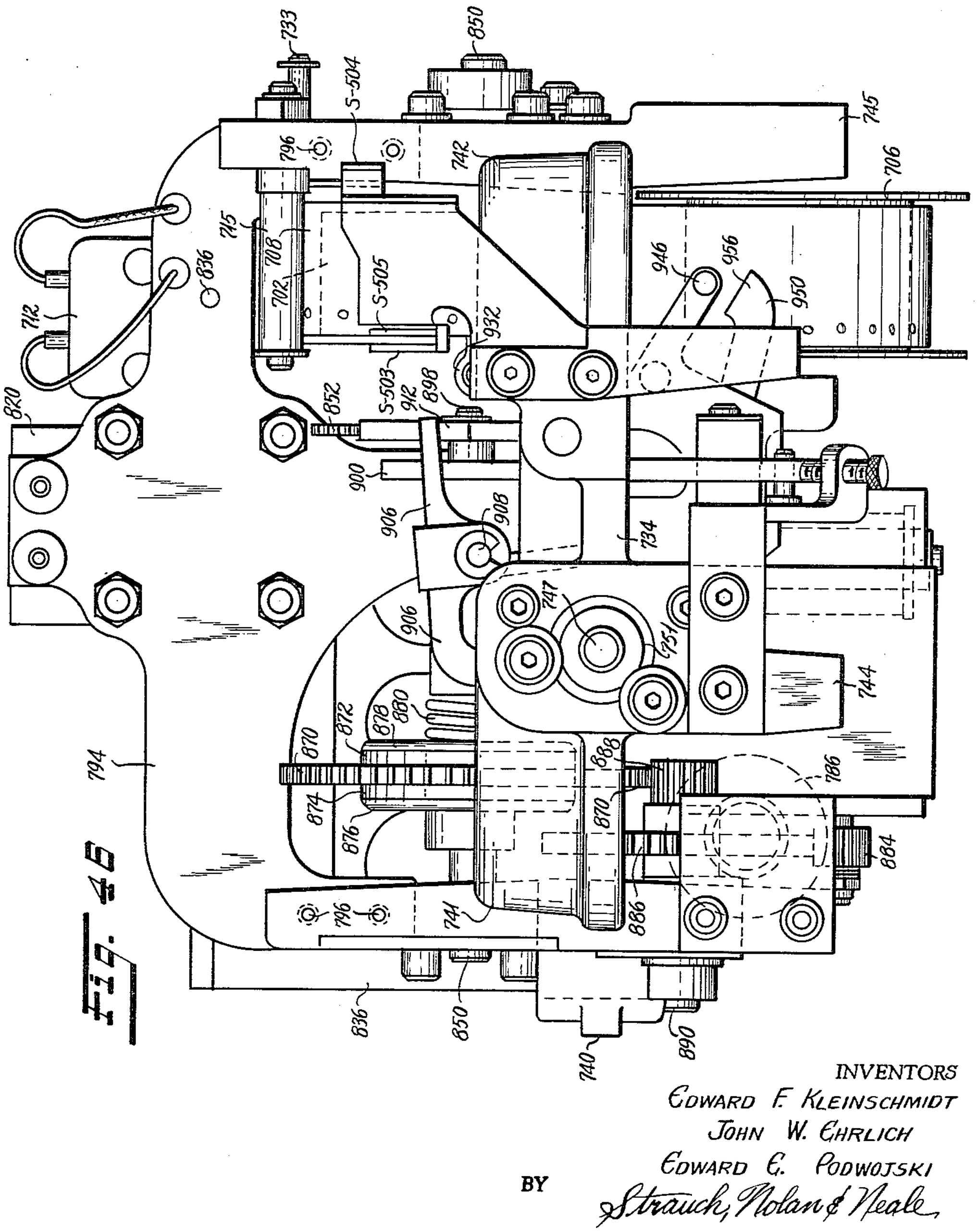
Figure 47:
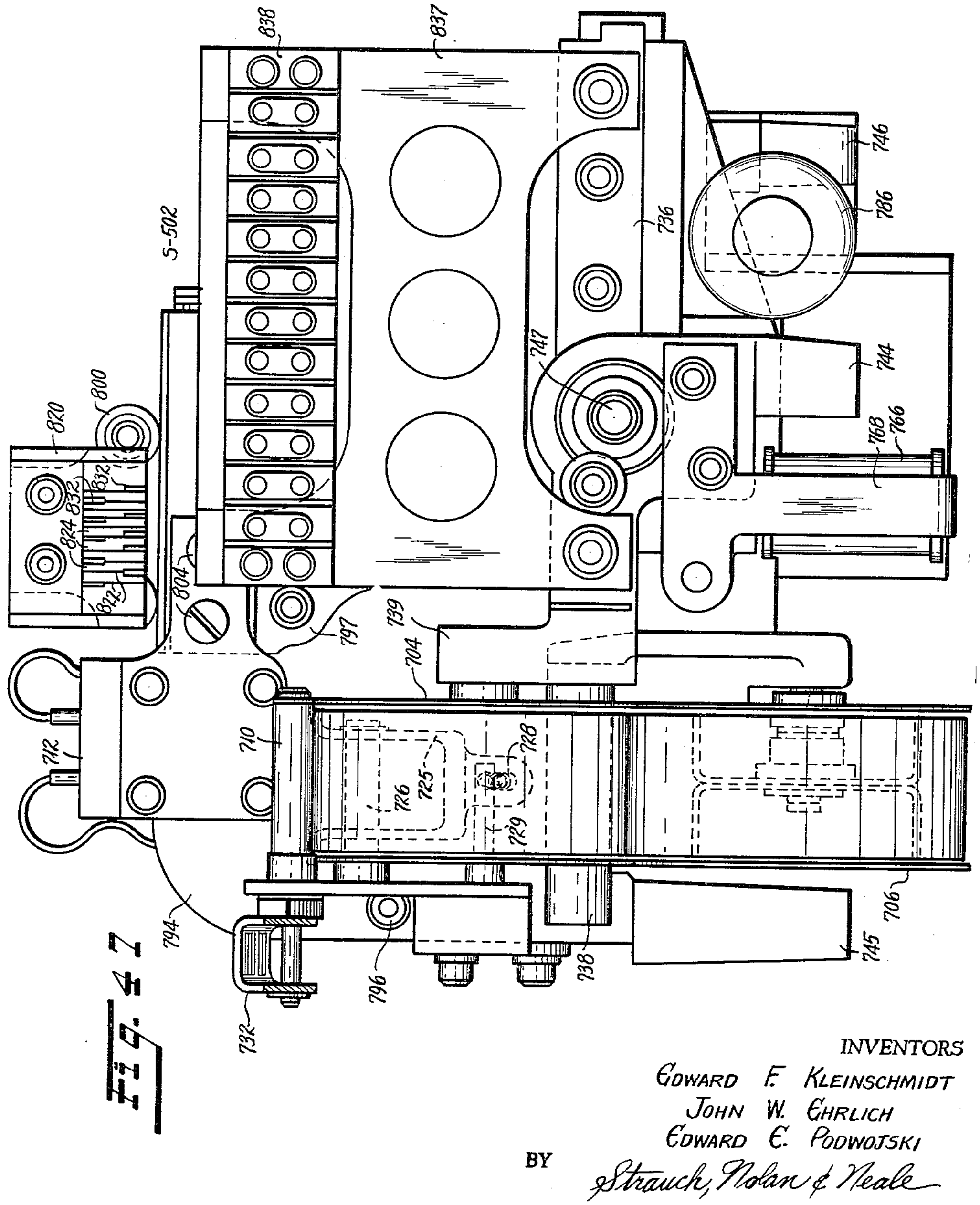

FIGURES 7A, 7B, 7C and 7D when arranged as shown in FIGURE 7 form a schematic diagram of the system function relay circuit;

FIGURE 8 is a schematic wiring diagram of the second register and amplifier circuits;

FIGURE 9 is a schematic diagram of the call system circuits;

FIGURE 10 is a schematic diagram of the receiver circuit;

FIGURE 11 is a schematic diagram of the control box circuits;

FIGURE 12 is a schematic diagram of the power supply;

FIGURE 13 is a schematic diagram of the selectively pluggable call system matrix circuit;

FIGURE 14 is a front elevation view of the keyboard unit, partially broken, illustrating the arrangement of the keys, code bars, locking wedge and associated sets of contacts;

FIGURE 15 is a right hand side view of the keyboard illustrating the code bar contact block and the spacing linkage;

FIGURES 16, 17 and 18 are detail views from the rear of the keyboard unit showing the relationship between the universal bar and locking wedge in the respective inoperative position, the initial shifted position and the repeat blocking position;

FIGURE 19 is a detail perspective view from below, illustrating the cooperation between the locking wedge and the code bars;

FIGURE 20 is a top plan view of the printing unit with the cover, page roll support and guiding structure and the stop solenoids and pawls removed;

FIGURE 21 is a front elevation view of the printing unit shown in FIGURE 20, showing the print hammer, the slidable type wheel, a portion of the cable and pulley system, and the solenoid controlled stop mechanism;

FIGURE 22 is a section view taken on lines 22—22 of FIGURE 21 illustrating some of the carriage spacing line feed, carriage return and print hammer actuating linkage;

FIGURE 23 is a section view taken on lines 23—23 of FIGURE 21 illustrating the solenoid controlled pawls for engagement with the type wheel shaft stop wheel and the pawl camming wheel;

FIGURE 24 is an exploded perspective of the type wheel shaft and the various elements disposed thereon;

FIGURE 25 is a view of the sliding contact side of a commutator plate;

FIGURE 26 is a view of the back side of a commutator plate showing segment connecting circuits;

FIGURE 27 is a perspective view from the rear left hand side illustrating the compact arrangement of function operating linkage;

FIGURE 28 is an exploded perspective view of the function operating mechanism and power source as viewed from the rear of the printer;

FIGURE 29 is an enlarged section view taken on lines 29—29 of FIGURE 20 illustrating the positive function clutch and control with the clutch in disengaged condition;

FIGURE 30 is a section view similar to FIGURE 29 illustrating the clutch elements immediately after the control armature is operated to permit clutch engagement;

FIGURE 31 illustrates the arrangement of pawl actuating holes in the clutch kickout plate;

FIGURE 32 is a section view taken on line 32—32 of FIGURE 29 illustrating the arrangement of the clutch pawl pivot pin and pawl camming pin relative to the driven plate and kickout plate;

FIGURE 33 is a perspective view illustrating the cooperation between the stop pawl and the stop wheel and camming wheel;

FIGURE 34 is an enlarged detail view illustrating the cooperative arrangement of the line feed mechanism between the function shaft and the type wheel shaft;

FIGURE 35 is an enlarged detail view illustrating the cooperative arrangement of the line return mechanism between the function shaft and the type wheel shaft;

FIGURE 36 is a top plan view showing details removed from the printer in FIGURE 20;

FIGURE 37 is a diagrammatic view illustrating the type wheel character positions and the relative sensing cam positions;

FIGURE 38 is a timing chart illustrating the various printer functions between start and stop conditions;

FIGURE 39 is a schematic view of the tape drive system in the recorder unit;

FIGURE 40 is a view of an end section of the recording tape showing the control recesses;

FIGURE 41 is a view of the other end section of the recording tape showing the control notch;

FIGURE 42 illustrates diagrammatically the method by which the recording tape is given a set;

FIGURE 43 is a cross-sectional view of the tape after receiving the set taken along lines 43—43 in FIGURE 39;

FIGURE 44 is a top or plan view of an illustrative embodiment of the recorder unit constructed in accordance with the invention;

FIGURE 45 is a front view in elevation of the recorder unit of FIGURE 44;

FIGURE 46 is a right end view in elevation of the recorder unit shown in FIGURES 44 and 45;

FIGURE 47 is a left end view in elevation of the recording unit of FIGURES 44 through 46;

FIGURE 48 is a sectional view in elevation taken along section lines 48—48 of FIGURE 44.

Figures 50, 51:
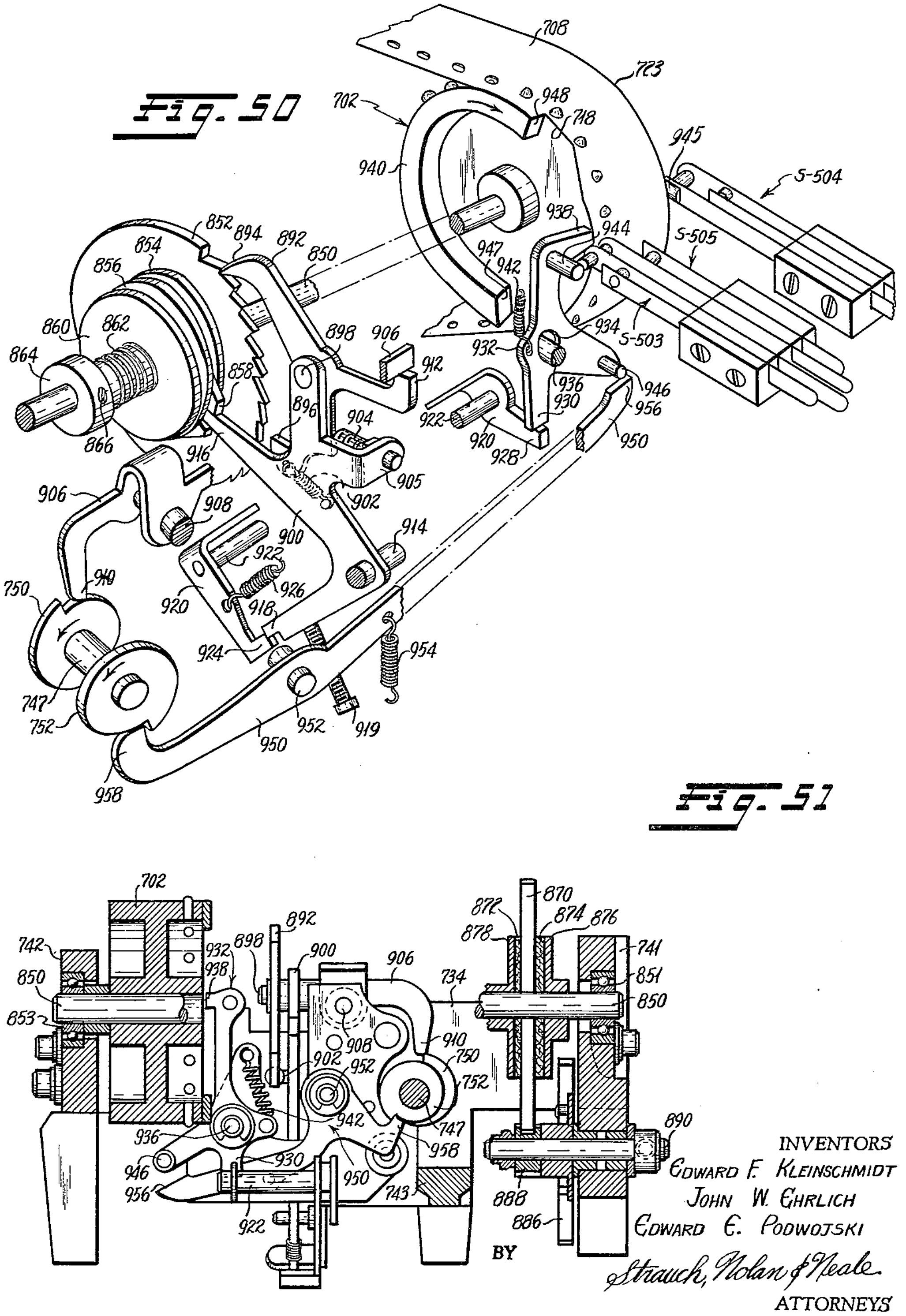

FIGURE 49 is a plan view of the commutator assembly of the recorder unit;

FIGURE 50 is a perspective view of the tape drive mechanism with the various mechanical elements separated to more clearly show their functional relationships;

FIGURE 51 is an elevation view in section taken along lines 51—51 of FIGURE 44; and FIGURE 52 is a lay out view of the recording head drive mechanism.

*General*

Figure 1:
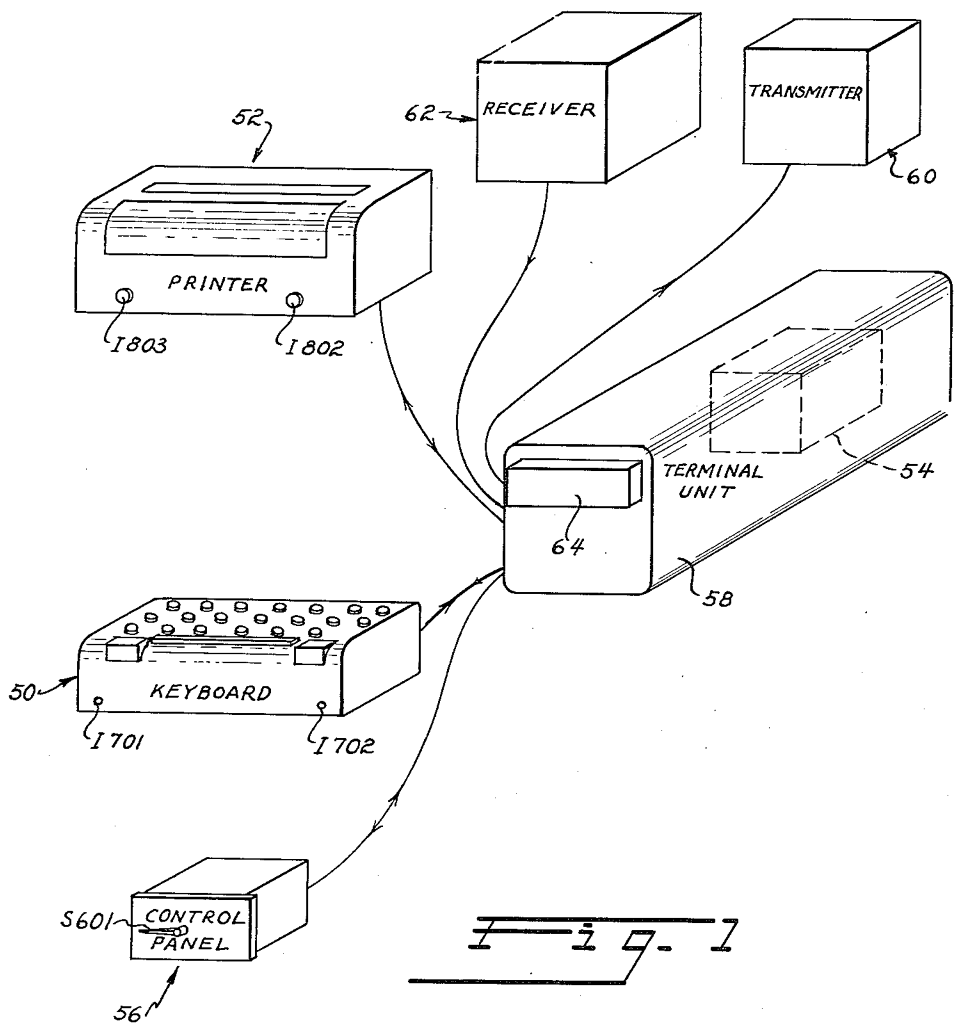
FIGURE 1 is a block diagram generally indicating the relationship of the several units which make up the communications equipment of the present invention.
Figure 2:
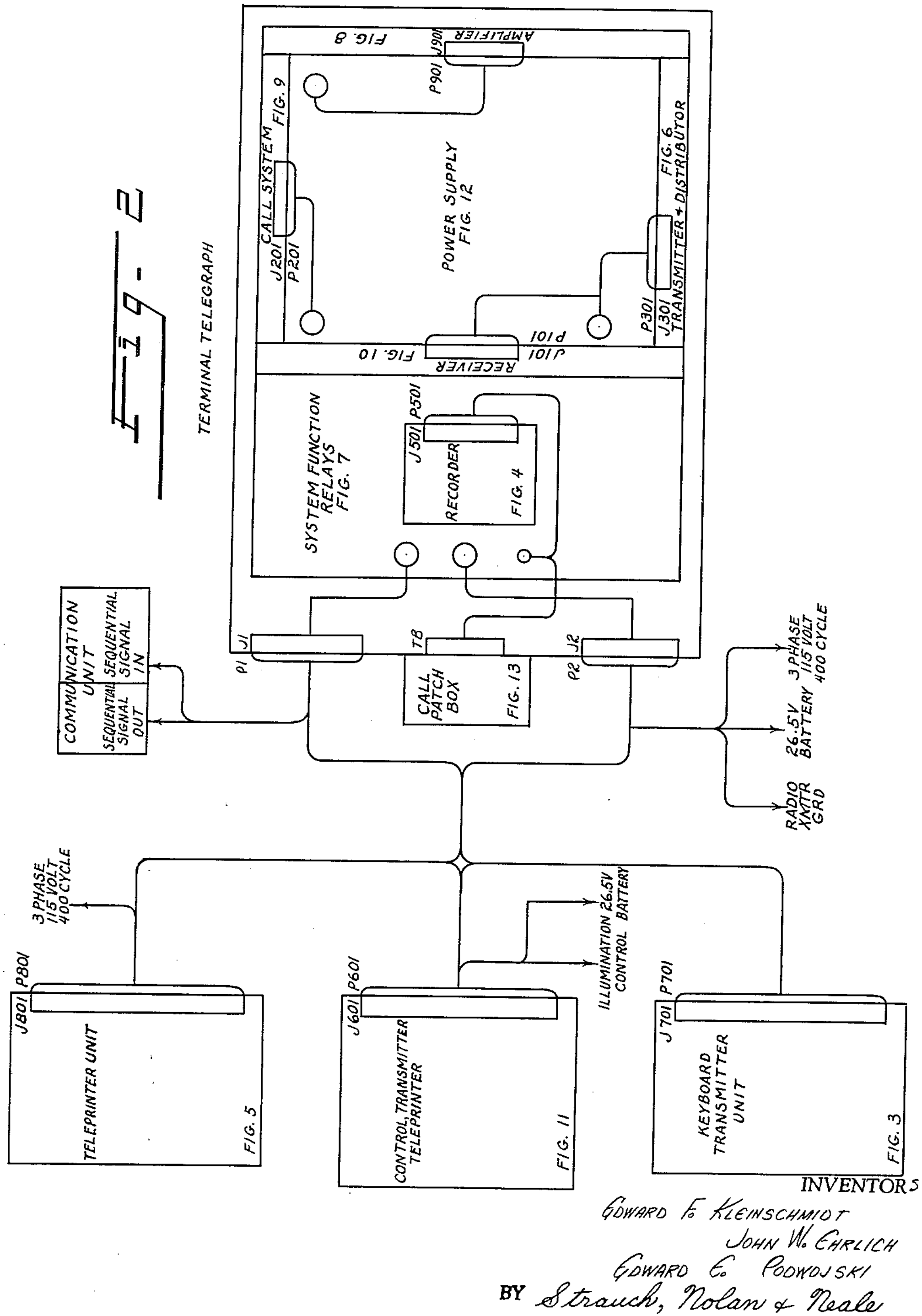
FIGURE 2 is a block diagram of the circuit arrangement of the communication equipment of the present invention.
Figure 3:
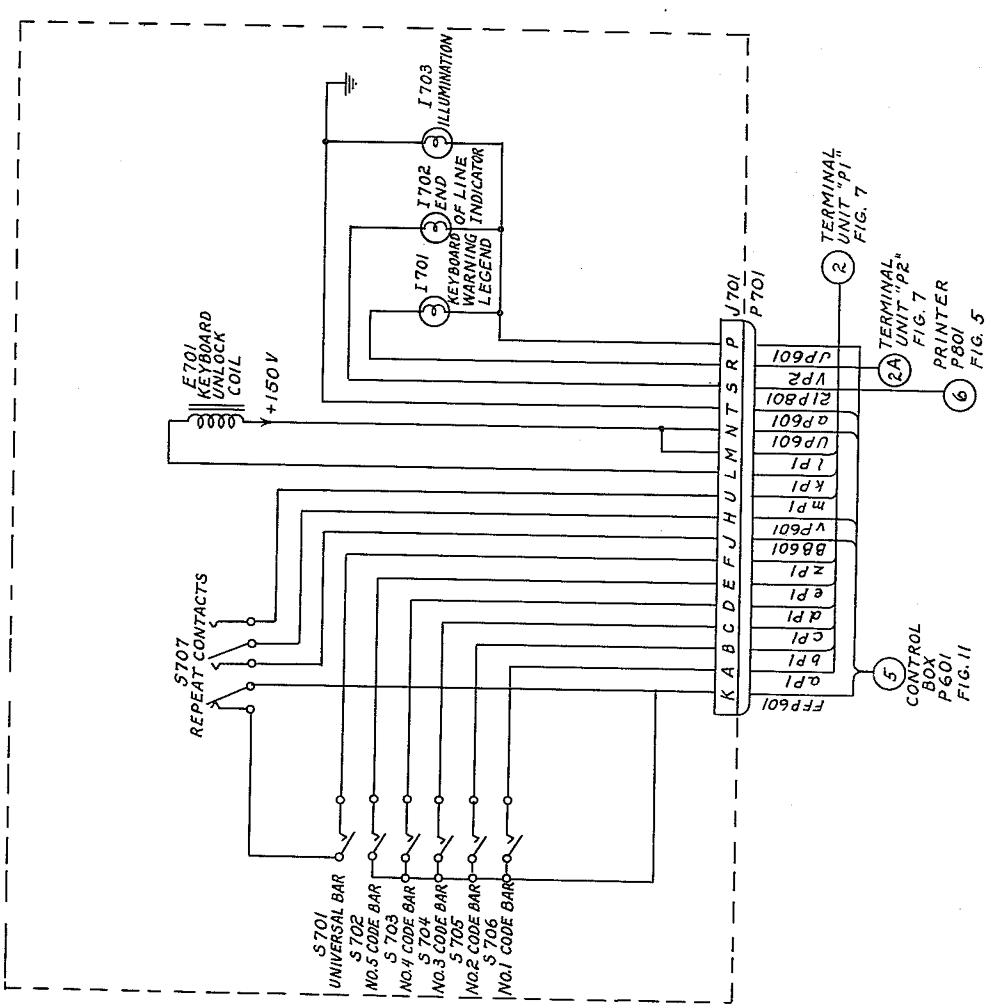
FIGURE 3 is a schematic wiring diagram of the keyboard unit.
Figure 4:
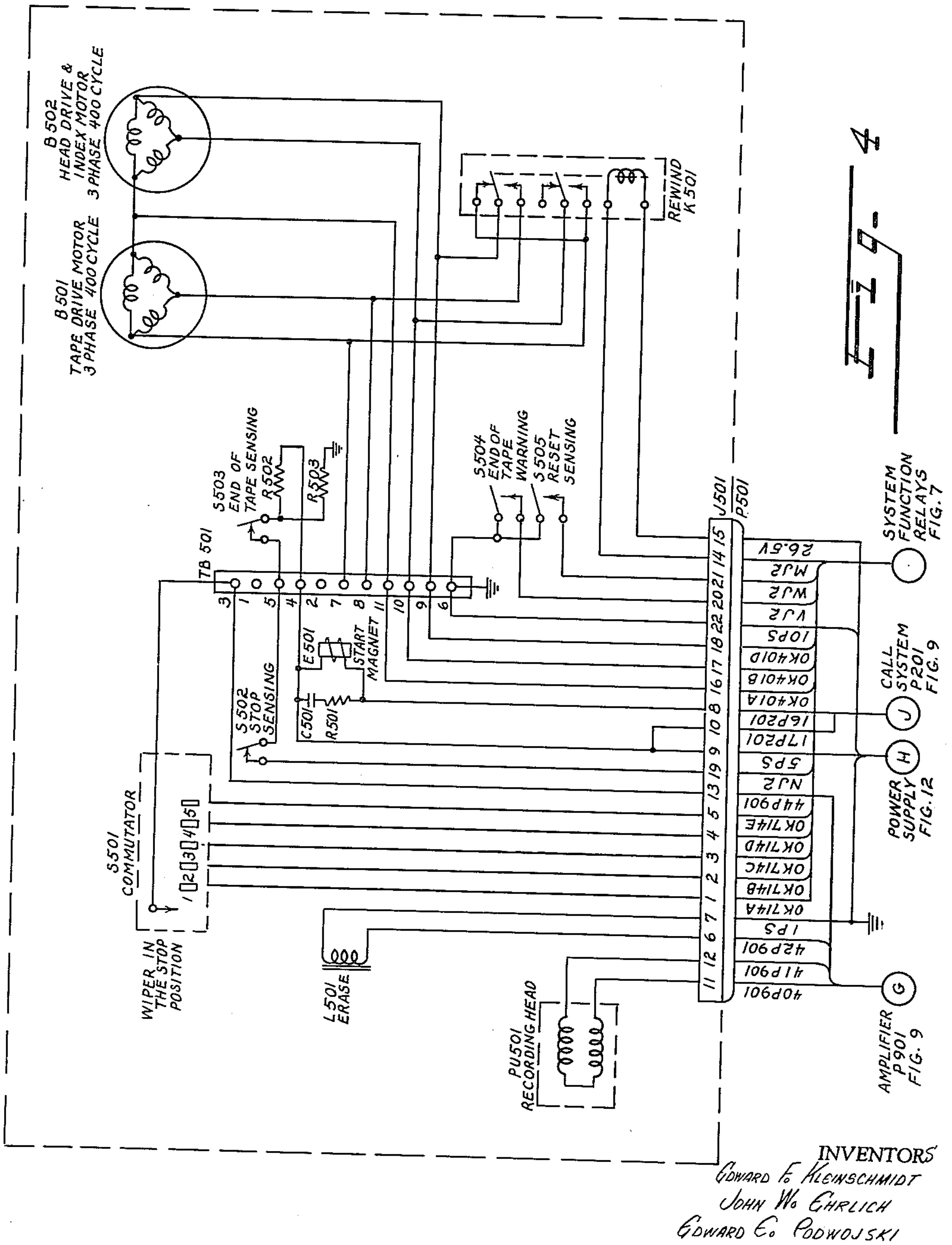
FIGURE 4 is a schematic wiring diagram of the storage unit.
Figure 5:
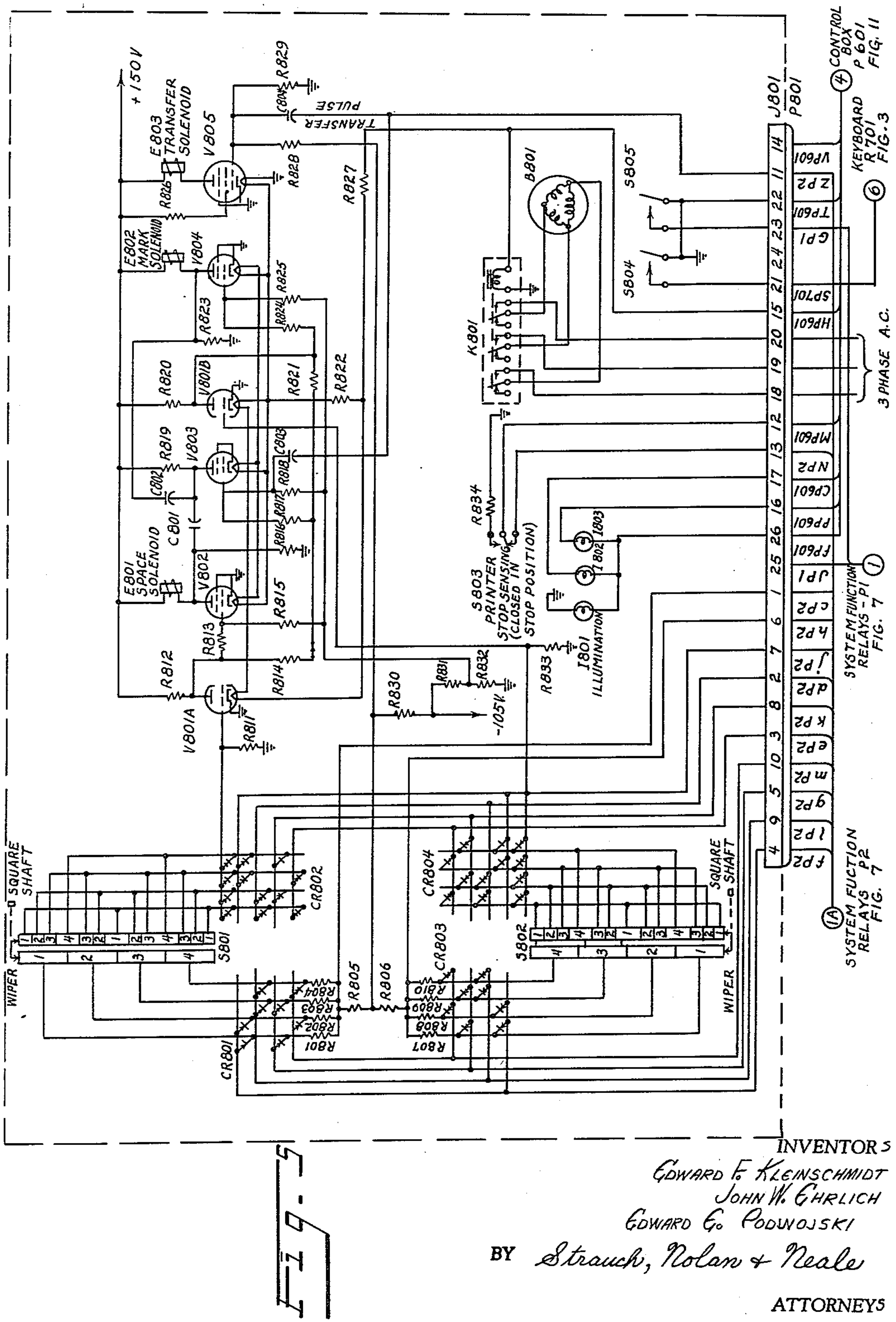
FIGURE 5 is a schematic wiring diagram of the circuitry directly related to the printer unit.

Referring to FIGURE 1, the communication equipment of the present invention physically constitutes five basic units: a keyboard 50 the details of the mechanical structure of which are shown in FIGURES 14 to 19 and the electrical circuitry as shown in FIGURE 3, a page printer unit 52 the mechanical details of which are shown in FIGURES 20 to 38 and the electrical circuitry directly related to which is shown in FIGURE 5, a magnetic storage unit 54 utilizing a reversible magnetizable metal web and the mechanical details of which are shown in FIGURES 39 to 52 and the electrical circuitry of which is shown in FIGURE 4, a control box 56, the electrical circuitry of which is shown in FIGURE 11, and a terminal unit 58 housing the magnetic storage unit 54 and the circuitry shown in FIGURES 5 to 10, 12 and 13.

In order that the relationship of the several components of the present invention may be fully understood, this description will proceed with a general description of the functioning of the overall system, a general description of the structure and operation of the several units, a detailed description of the circuitry and mode of operation thereof and finally a detailed description of the mechanical structure of each of the mechanical components.

The printing communication equipment of the present invention is designed primarily for use in an airborne installation in cooperation with a radio transmitter 60 and a radio receiver 62. The equipment may be operated to control the radio transmitter 60 to transmit a time sequential message signal coded in the well known Baudot code either directly under control of the keyboard 50 or under control of the magnetic storage unit 54, a copy of the transmitted message being recorded in either event by the printer unit 52. The equipment may be operated to store a message in the magnetic storage unit 54 under control of the keyboard for later transmission from the storage unit 54 through the radio transmitter 60, a printed copy of the message being made by the printer both during storage and transmission from storage. A message stored in the storage unit 54 may be transmitted repeatedly so long as the message has not been erased from the storage unit. The equipment is further operable to receive messages identified by a unit call designation of the particular unit (that is the particular aircraft in which the equipment is installed), and to receive messages identified by the group designation of the group of which the unit is a part (that is the group of aircraft of which the aircraft in which the equipment is installed is operatively associated) or may be operated to print all messages transmitted on the frequency to which the receiver is tuned.

The printer unit 52 receives messages and records them on sprocket fed paper. It is associated with the signal circuits through the terminal unit 58. Incoming messages through receiver 62 are recorded as page copy and all messages transmitted from the keyboard 50 or magnetic recorder 54 are monitored by the printer unit 52.

Two lamps I802 and I803 on the cover indicate the source of the message being printed. The right hand lamp I802 glows when messages are coming from the radio receiver and left hand lamp I803 glows when the printer is operating under all other conditions.

The keyboard unit 50 is provided with a standard arrangement of keys manually operable to cause the transmission by transmitter 60 of signals indicative of the 26 characters of the alphabet, plus signals indicative of line return, line feed, letters and space functions or to store such signals in the magnetic recorder 54 for future transmission. All messages originating at the keyboard 50 are monitored by the printer 52. A red lamp I702 on the right end of the keyboard 50 glows to indicate the 66th character position of the printer 52, and a red lamp I701 at the left end of the keyboard 50 glows to indicate, in the illustrated embodiment, that five lines of recording medium are available at the storage unit 54.

As long as the space bar of the keyboard 50 is depressed closing contacts S–707 (FIGURE 3), the space designation of the code will be repeated.

The terminal unit 58 is an enclosure containing: the magnetic recorder 54 (FIGURE 4), a telegraph transmitter circuit (FIGURE 5), a telegraph receiver circuit, (FIGURE 10), a call system circuit (FIGURE 9), an amplifier circuit (FIGURE 8), switching relay circuits (FIGURE 7) and a power supply circuit (FIGURE 12). The magnetic recorder (FIGURE 4) provides a means by which a message, or messages, originating from the keyboard unit 50 may be recorded and stored for future automatic transmission by the radio transmitter 60. The recorded message can be transmitted as many times as is necessary so long as it has not been erased.

The telegraph transmitter (FIGURE 6) is made up of electronic equipment and circuits for generating coded sequential signals which are initiated by depressing a key on keyboard 50 or by operation of the magnetic recorder 54. The telegraph receiver (FIGURE 10) is made up of electronic equipment and circuits to convert coded sequential signals from the radio receiver 62 into simultaneous signals to be delivered to the printer 52 for its operation. The call system (FIGURE 9) is an arrangement of electronic equipment and circuits for turning the printer 52 on or off as indicated by a coded signal from the radio receiver 62. It also turns the recorder 54 off at the end of transmission. The recorder amplifier (FIGURE 8) strengthens the signals received from the magnetized tape of the recorder 54 which are subsequently sent on a simultaneous basis to the printer 52 and on a sequential basis to the radio transmitter 60. Power supply (FIGURE 12) contains electronic equipment to convert the available power source of 115 v., 400 cycle alternating current to the various A.C. and D.C. levels necessary for the operation of all the other equipment. A connection to a 26.5 v. battery current is also a part of this subunit.

A call patch box 64 (FIGURE 13) is attached to the front of the terminal unit 58. It is an arrangement of diode matrix pots and circuits which define the unit call and broadcast call signals for the printer 52. The diode matrix pots have plug-in connectors to facilitate call system designation changes.

The control panel 56 (FIGURE 11) is manually operated to control the various functions of the equipment. A rotary selector switch S–601 determines the type of operation. This switch S–601 has five positions: TRANS KBD (radio transmission under keyboard control), TRANS STORE (radio transmission under control of the storage unit), RCVE (printing a received radio message), REWIND (Rewind of the tape of the storage unit to its start position), and STORE (storage of a message under keyboard control). A CALL toggle switch has two positions: IN (in which only messages having proper call designations are monitored) and OUT (in which all messages are monitored). A POWER switch controls the electric current for the whole set. A lamp I–601 glows while power is on and another lamp I–602 glows after the rewind of the magnetic tape.

The terminal unit 58 of this equipment supplies to the transmitter 60 and receives from the receiver 62, electrical signals in a code form commonly known as "Baudot."

The signals used to designate the code for a character or function are of two types; "spacing" and "marking." Spacing signals are timed interruptions of a line current and marking signals are timed pulses of the current. By combining these two electrical conditions in groups of five in all possible ways 32 different arrangements are possible, 26 of these permutated groups are used as code designations for the alphabet and the remaining 6 are used as code designations for printer functions.

With each one of the groups of five signals is included a "spacing" signal at the start and a "marking" signal at the finish. The addition of these two signals makes it possible to control the starting and stopping of the receiving equipment. The starting signal and the five intelligence signals are of equal length while the stop signal is 1.5 times as long. This longer stop pulse aids in synchronization of the transmitting and receiving equipment.

The basic principle of the operation of this teletypewriter equipment is one of converting the coded positions of 5 mechanical elements into simultaneous current or no current conditions on 5 wire lines. These conditions in turn are distributed on a timed sequential basis for transmission over a single line. At the receiving end the reverse of this takes place and the single wire sequential group is converted to a five wire simultaneous group. In this case the coded electrical conditions of the five wires act to set a mechanical element in one of 32 positions which is indicated by that code group.

*General operating procedure*

To transmit from the keyboard to the radio terminal (messages originating at the keyboard are supplied to the radio transmitter in the form of sequential signals and at the same time are monitored by the printer unit), three steps are taken in addition to turning on the transmitter: (1) Shift POWER toggle S–603 (FIGURE 11) to ON, (2) turn selector switch S–601 (FIGURE 11) to TRANS KBD, and (3) manipulate keyboard 50 (FIGURE 3).

To store a message for future transmission (messages originating from the keyboard are printed and also stored in the magnetic tape recorder for transmission at a later time), four steps are taken: (1) Shift POWER toggle S–603 (FIGURE 11) to ON, (2) turn selector switch S–601 to REWIND until lamp I–602 glows (the tape recorder is caused to rewind all of the tape on the take-up spool, thus bringing the beginning of the tape to the recording head. The glowing of lamp I–602 indicates that this has been completed), (3) turn selector switch S–601 to STORE, (4) manipulate keyboard 50 (FIGURE 3).

To transmit a stored message to the radio terminal (messages previously stored in the magnetic recorder are supplied to the radio transmitter and monitored by the printer. At the end of these messages the equipment is automatically transferred from the TRANS STORE to RCVE condition), three steps are taken in addition to turning on the transmitter: (1) Shift POWER toggle C–603 to ON, (2) turn selector switch S–601 to REWIND and wait for lamp I–602 to glow, (3) turn selector switch S–601 to TRANS STORE.

To print only incoming messages preceded by the designated unit or group call signals (this is the normal standby condition in which sequential signals from the radio receiver cause the printer to type a page copy of only those messages which are preceded by correct unit or group call signals), three steps are taken: (1) Switch POWER toggle S–603 to ON, (2) turn selector switch S–601 to RCVE, (3) Switch CALL toggle S–602 to IN.

To Monitor Home copy or to print incoming messages preceded by correct call signals (this is the condition where messages sent to the magnetic recorder for storage and monitored by the printer may be interrupted by incoming messages preceded by correct call signals. The keyboard will be locked until an End-of-Message signal is received, at which time the keyboard will be unlocked and local monitoring resumed), three steps are taken: (1) Switch POWER toggle S–603 to ON, (2) turn selector switch S–601 to STORE, (3). Switch CALL toggle S–602 to IN. If the incoming message fails to supply an End-of-Message signal the keyboard will remain locked and the set will continue to be in RECEIVE condition. To break the call system the operator must: (1) Turn the selector switch S–601 to RCVE, (2) switch the CALL toggle S–602 to OUT. The selector switch S–601 may then be turned back to STORE and the CALL toggle S–602 switched to IN.

To receive all messages (this is the condition in which the AGC–1 printer types all messages which are picked up by the radio receiver), the operator must: (1) Shift POWER toggle S–603 to ON, (2) turn selector switch S–601 to RCVE, (3) shift CALL S–602 toggle to OUT. This condition may also be operated in STORE or while monitoring line copy as in the preceding paragraph.

Before proceeding with the detail explanation of the circuitry, a brief explanation of the symbolism used in the circuit drawings is in order. In reference to relays, all relays are designated with the letter K followed by an identification numeral. Thus, –K100–, indicates relay 100 or a connection to the coil of relay 100. A letter suffix to a relay designation, such as K100A, indicates a connection to the "A" groups of contacts of relay 100. The letter prefixes, C, O, and A–, such as CK100A, OK100A, or AK100A, designates respectively the normally closed, the normally open and the armature contacts of the A group of contacts of relay 100, or connections to those contacts. The letters R, C, E, V, CR, T, B, S, L, and PS followed by numerals, represent conventionally resistors, capacitors, solenoids, electron valves—vacuum and thyratrons, crystal rectifiers or diodes, transformers and magnetic core storage units, motors, switches, inductances and power supply terminals respectively or connections to such elements. The letters J and P followed by numerals designate sockets and plug connectors and letter or numeral prefixes for such designations indicate the pin connections of such sockets and plugs or connections thereto.

*Keyboard circuitry*

While the detailed structure of the keyboard will be given hereinafter, a general description at this point will be helpful in understanding the circuitry involved. The keyboard 50 consists of 29 keys, a space bar, two red lamps I–802 and I–803 and associated equipment and is used during "transmit keyboard" and "store" operations.

Five code bars, used to set up the mechanical form of the code signal, are located under the key levers and run the width of the keyboard so that they can be engaged by depressing any key lever. Each code bar is notched in one of two ways at the points where it is engaged by each lever. The sides of these notches are slanted to the right or left so that a downward movement of a keylever pushes the code bars either to the right or left. The notches are cut so that the first code bar will move to the right if the first unit of the code for the key depressed is a marking impulse. Whereas, if the second unit of the code is a spacing impulse, the movement of the code bar will be to the left. Thus, depression of the Y key sets up the five-unit code for that letter in the code bars by moving the first, third, and fifth code bars to the right and the second and fourth code bars to the left.

During "transmit keyboard" and "store" operations, the movement of a code bar to the right or left rocks a bell crank which is pivoted on the bar. The positions of the bell crank for each code bar at the right end of the keyboard controls the engagement of a pair of contacts. When the code bar moves to the right, the associated contacts are closed; when it is moved to the left, the contacts are opened. Code bars numbers 1 to 5 are associated respectively with contacts S–706, S–705, S–704, S–703, and S–702 (FIGURE 3). The code bars 1 to 5 correspond respectively to the five intelligence unit signals of the five unit Baudot code which, with the start and stop signals, make up the conventional Baudot code signal group. The contacts when closed represent a mark signal in the code group and, when open, a space signal.

Figure 7B:
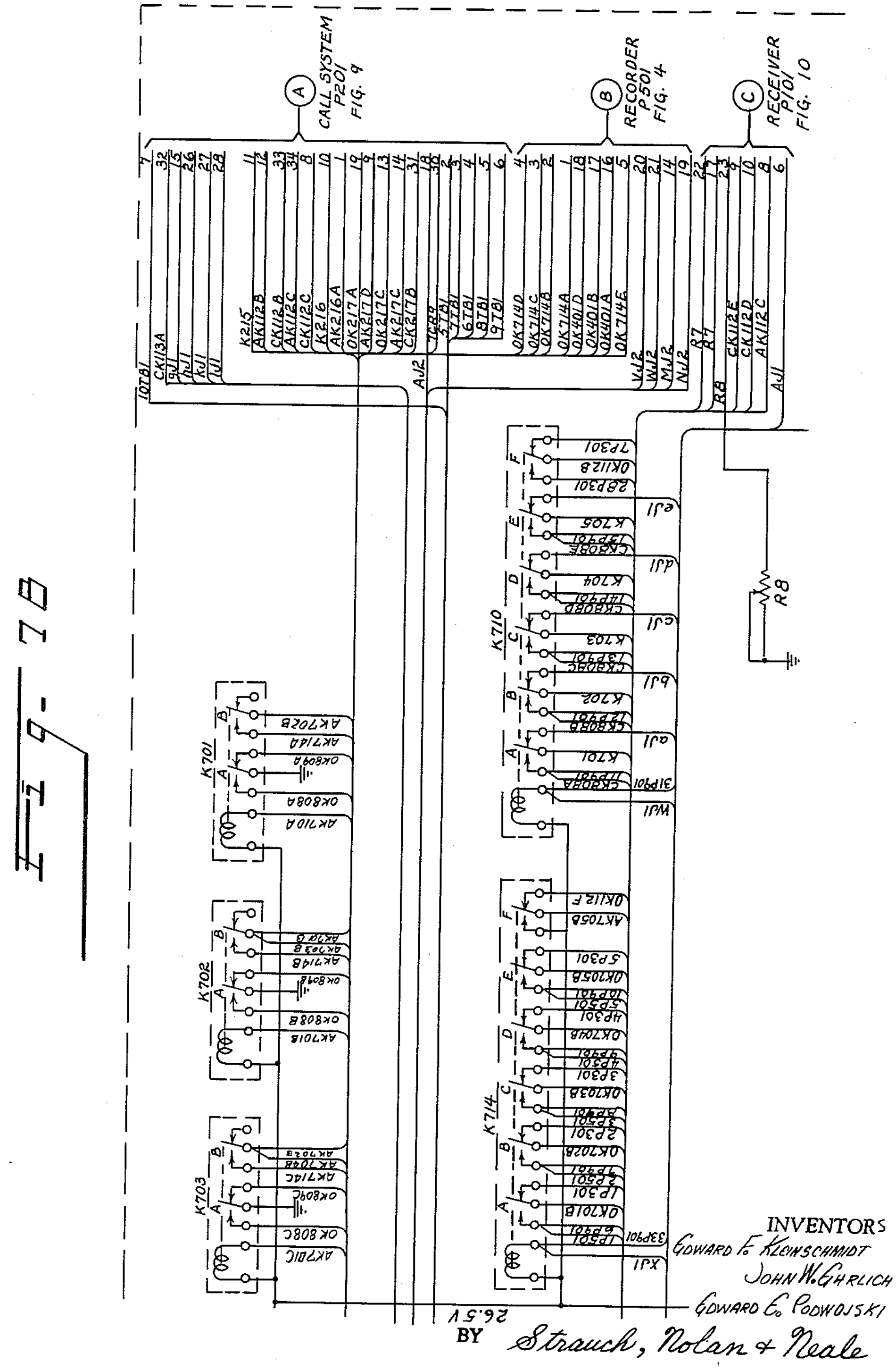

The movable arms of the contacts S–702, S–703, S–704, S–705 and S–706 are connected in common through pin K of J–701 and P–701 to connection FF of P–601 and J–601 (FIGURE 11) to the "transmit keyboard" and "store" fixed contacts of section 1 of the selector switch S–601 and through the movable contact thereof to ground, when the selector switch S–601 is set to one of these two positions in which the keyboard is manipulated. The fixed contacts of the code bar actuated switches S–706, S–705, S–704, S–703 and S–702 are respectively connected through contacts A, B, C, D and E of J–701 and P–701, through the contacts *a*, *b*, *c*, *d*, *e* of P–1 and J–1 (FIGURE 7A), through the normally closed contacts K–710A, K–710B, K–710C, K–710D and K–710E of relay K–710 (FIGURE 7B), to one of the terminals of the coils of relays K–701, K–702, K–703, K–704 and K–705 respectively (FIGURES 7A and 7B). The opposite terminals of these relays are connected in common to a 26.5 volt direct current power line. [Relay K–710 remains de-energized so long as selector switch S–601 (FIGURE 11) is not set to its "transmit store" position.] Through these circuits, the closing of any one of the contacts S–706, S–705, S–704, S–703 or S–702 will energize the corresponding one of the relays K–701, K–702, K–703, K–704 or K–705 (FIGURE 7). Thus, upon depression of a key on the keyboard, the relays corresponding to mark signals in the code group indicative of the significance of the key depressed are energized and those corresponding to space signals remain deenergized.

A universal bar which is located in back of the five code bars is moved to close contacts S–701 (FIGURE 3) each time a key is depressed. The keyboard mechanism is such that S–701 will close slightly after the actuation of the five code bar controlled contacts S–702 to S–706. The movable contact of universal bar contact S–701 is connected through a normally closed contact of the space bar actuated repeat contact group S–707 to pin K of J–701 which, as has been previously explained, is grounded so long as selector switch S–601 (FIGURE 11) is set to its "transmit keyboard" or its "store" position. The fixed contact of S–701 is connected through contact F of J–701 and P–701, through contact Z of P–1 and J–1 (FIGURE 7A) to the coil of relay K–706 (FIGURE 7C), the opposite side of which is connected to the 26.5 volt power supply line. Thus closing of contact S–701 by the universal bar during either transmit keyboard or store operation will energize K–706 slightly after the permutative energization of the relays K–701 to K–705. When the selector switch S–601 (FIGURE 11) is set to its "transmit keyboard" position, the energization of relay K–706 applies ground at the junction between capacitor C–325 (FIGURE 6) and resistor R–363 in the input circuit of the start gate tube V–313A through pin 21 of J–301 and P–301, the normally open contacts K–706A (FIGURE 7C) pin L of J–1 and P–1 (FIGURE 7A), pin EE of P–601 and J–601 (FIGURE 11) and the "transmit keyboard" contact of stage 2 of the selector switch S–601 (FIGURE 11). The grounding of this input lead to the grid of start gate V–313A is effective during "transmit keyboard" operation to initiate a cycle of operation of the ring counter or distributor, tubes V–301 to V–308, which provide, respectively, the eight basic timed signals for controlling the operation of the equipment for the period of one code group.

Upon depression of a key on the keyboard, a mechanically actuated locking wedge engages the left hand bell cranks of the code bars in the keyboard 50 to hold the code bars in position after a key has been depressed until this locking wedge is released by energization of the keyboard unlock coil E–701 (FIGURE 3). The locking wedge prevents the operator from exceeding the typing rate acceptable by the other units. One side of the keyboard unlock coil E–701 is connected through pin N of J–701 and P701, through pin U of P–601 and J–601 (FIGURE 11) through pin Z of J–601 and P–601 (FIGURE 11), through pin K of P–1 and J–1 (FIGURE 7A) to terminal 5 of the power supply (FIGURE 12). The other side of the keyboard unlock coil E–701 is connected through pin L of J–701 and P–701, through pin K of P–1 and J–1 (FIGURE 7A), through pin 27 of P–201 and J–201 (FIGURE 9) to the anode of the keyboard unlock tube V–214.

An input signal to the keyboard unlock tube V–214 is applied to the grid thereof through pin 26 of J–201 and P–201, through pin H of J–1 and P–1 (FIGURE 7A), through pin R of P–601 and J–601 (FIGURE 11) the movable arm of stage 2A of selector switch S–601. When S–601 is in its "transmit keyboard" position, the connection is through pin P of J–601 and P–601 (FIGURE 11) through pin J of P–1 and J–1 (FIGURE 7A) through pin 29 of P–301 and J–301 (FIGURE 5) and capacitor C–312 from the number 6 tube V–306 of the ring counter. By this circuit, when the selector switch S–601 is in its "transmit keyboard" position, the keyboard unlock tube will be rendered conductive when it receives a pulse from the sixth tube of the ring counter (FIGURE 6) and will energize the keyboard unlock coil E–701 (FIGURE 3) to release the keyboard for further manipulation by the operator. When the selector of switch S–601 (FIGURE 11) is set to its "store" position, a positive pulse will be transmitted through capacitor C–601, through the normally closed contacts K–601E through pin M of J–601 and P–601, through pin 12 of P–801 and J–801 (FIGURE 5) through the normally closed contacts of S–803 which are closed when the main drive or function shaft of the printer is restored to its stop position, through pin 13 of J–801 and P–801, through pin N of P–2 and J–2 (FIGURE 7C), through pin 19 of P–501 and J–501 (FIGURE 4), through contacts S–502 which are closed only when the recording head of the storage unit has completed its cycle of operation, through contacts S–503 which are closed so long as the end of the magnetic storage tape has not been reached, from the junction between resistors R–502 and R–503 which form a voltage divider network between ground and a 150 volt power supply line from terminal 5 in the power supply (FIGURE 12) through pin 9 of J–501 and P–501 (FIGURE 4).

Thus when the selector switch S–601 (FIGURE 11) is set to its store position, the last to close of switches S–502 (FIGURE 4) in the storage device and S–803 in the printer (FIGURE 5) will transmit an impulse through C–601 (FIGURE 11) to the grid of the keyboard unlock tube V–214 (FIGURE 9) to energize the keyboard unlock coil E–701 (FIGURE 3) and release the keyboard keys for selection of the next signal to be stored.

The keyboard unit (FIGURE 3) contains an end of line indicator lamp I–701 one side of which is connected in common with the keyboard warning legend lamp I–701 through pin P of J–701 and P–701 (FIGURE 3) through pin J of P–601 and J–601 (FIGURE 11) and through pin M of J–601 and P–601 to an external source of 26.5 volts. The opposite terminal of I–702 is connected through pin S of J–701 and P–701 (FIGURE 3), through pin 21 of P–801 and J–801 (FIGURE 5) and, when closed, the contacts of S–804 end of line indicator switch to ground. The keyboard warning legend lamp I–701 (FIGURE 3) is connected through pin R of J–701 and P–701, through pin V of P–2 and J–2 (FIGURE 7C), through pin 20 of P–501 and J–501 (FIGURE 4) and the normally open contacts of end of tape warning switch S–504 to ground. Thus when S–504 is closed the tape is advanced to a position in which only five lines of recording capacity remain available for further recording by the recorder unit the keyboard warning legend lamp I–701 (FIGURE 3) will be illuminated.

Figure 6:
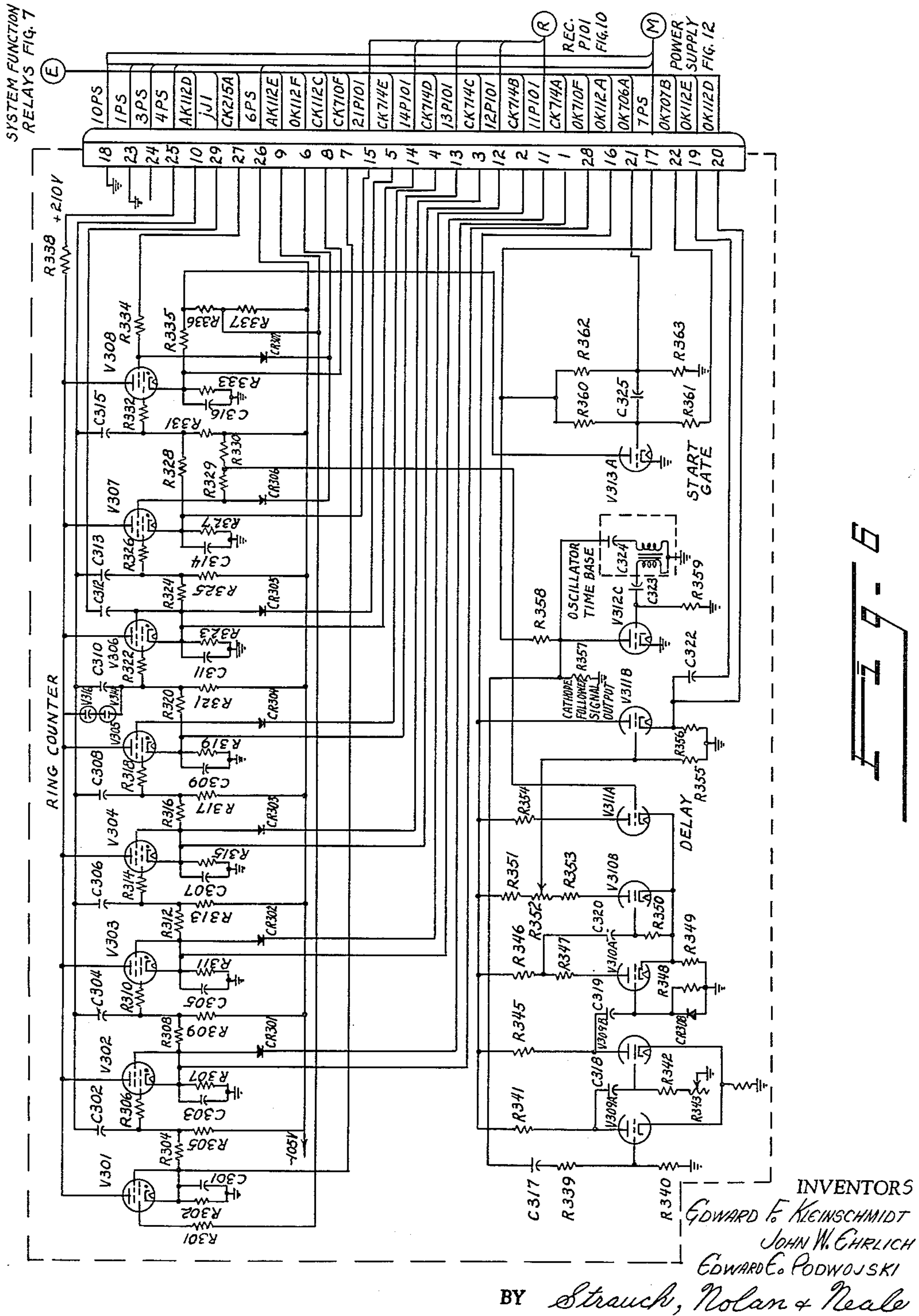
FIGURE 6 is a schematic wiring diagram of the transmitter and distributor circuit.
Figure 7C:
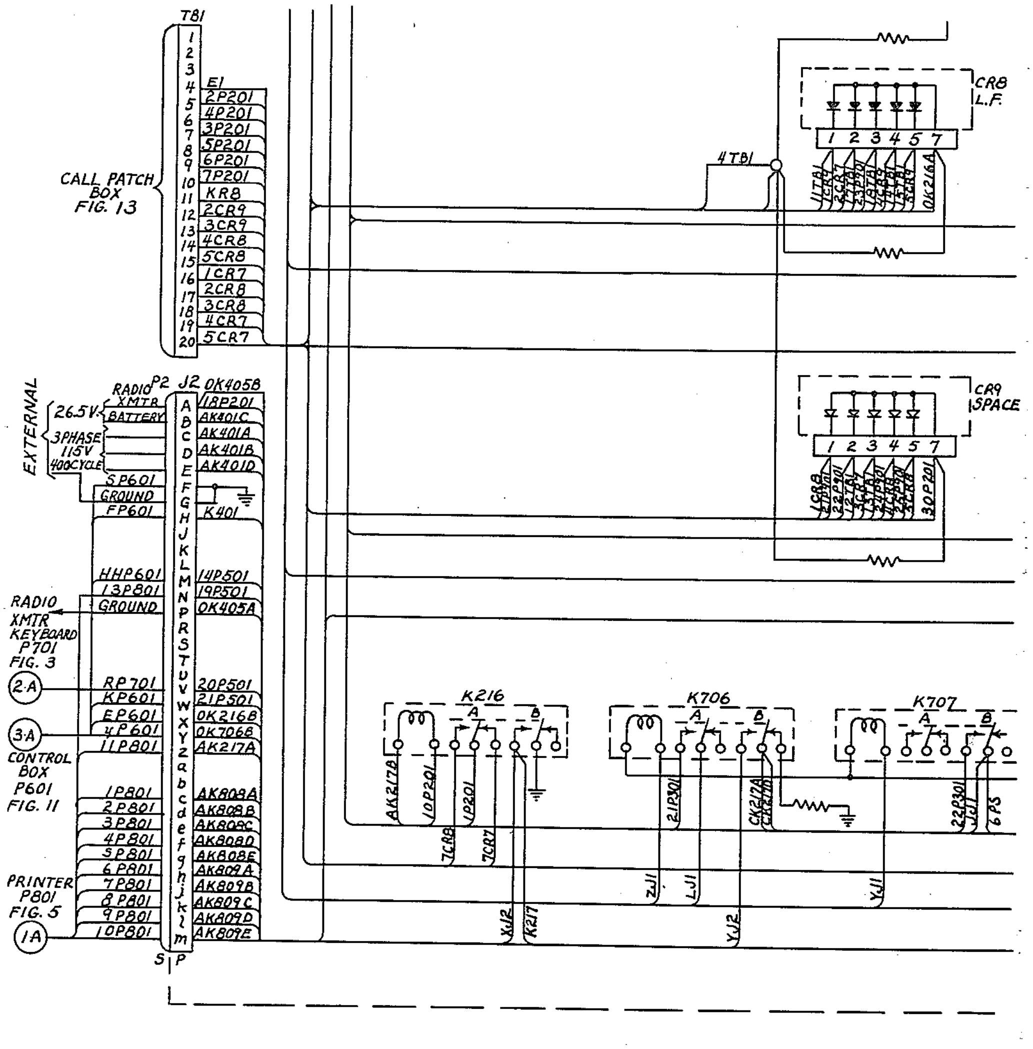
Figure 7D:
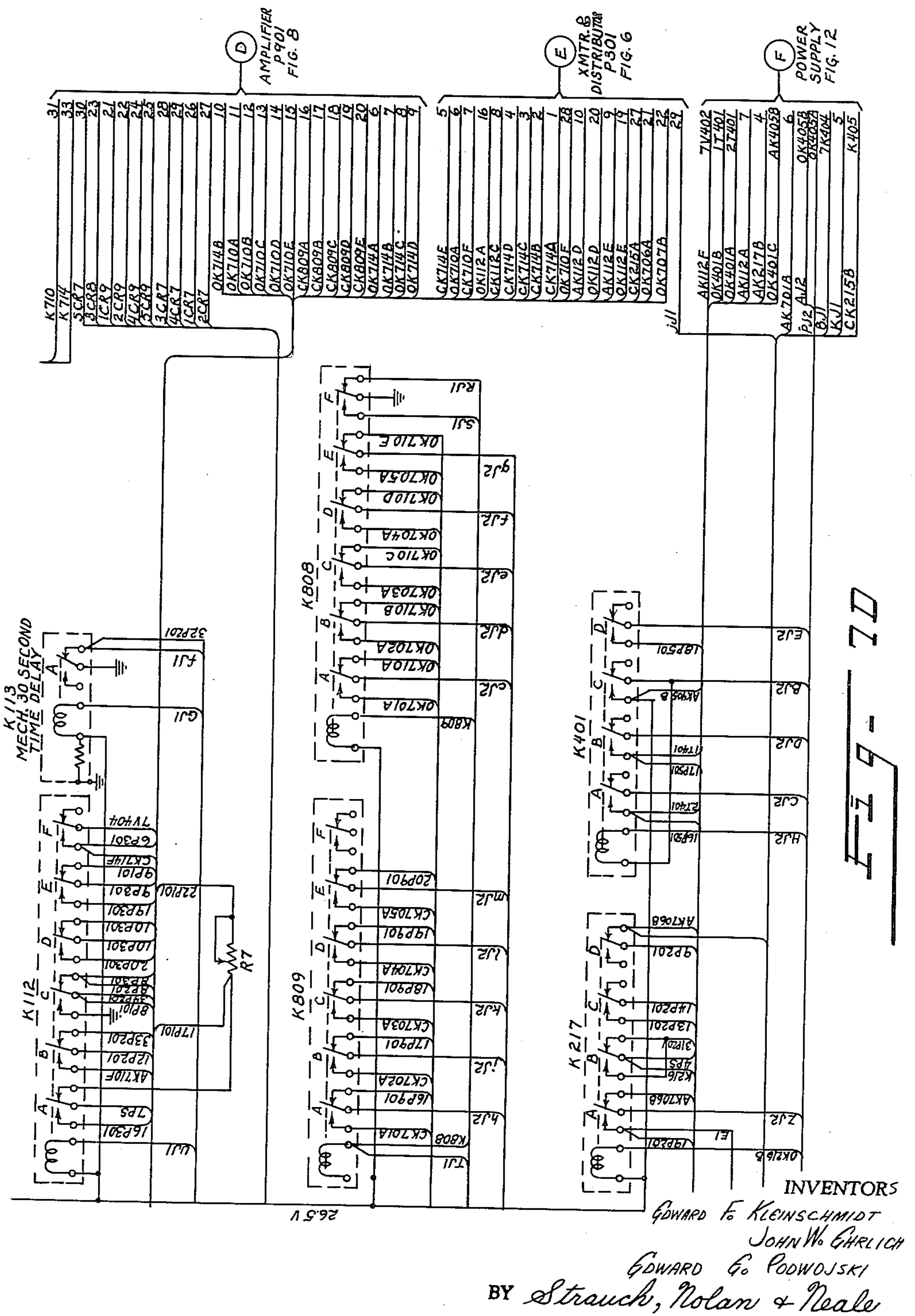

The repeat contact switch is operative, when actuated, to open the possible circuit through universal bar contact S–701, to apply ground from pin K of J–701 through pin J of P–701 and J–701, through pin BB of P–601 (FIGURE 11), stage 1A of selector switch S–601 when its "transit keyboard" position, through pin U of J–601 and P–601, through pin Y of P–1 and J–1 (FIGURE 7A) to energize K–707 (FIGURE 7C). Energization of K–707 is effective through its normally open B contacts, to apply −105v. from terminal 6 of the power supply (FIGURE 12) through pin 22 of P–301 and J–301 (FIGURE 6), and resistor R–361 to the grid of start gate V313A.

The other contacts of S–707 (FIGURE 3), when closed, transmit the signal through the normally closed contacts K–601E, through pin V of J–601 and P–601 (FIGURE 11), through pin H of P–701 (FIGURE 3), through the contacts of S–701, pin U of J–701 and P–701, pin N of R–1 and J–1 (FIGURE 7A), to the normally closed contacts K–217D. This signal, through pin 9 of P–201 and J–201 aid through C–221 (FIGURE 9) pulses V–213 to start the recorder; and to AK–706B as a terminal and through normally closed contact K–217A and pin Z of J–2 and P–2 and pin 11 of P–801, initiates operation of the printer as will be explained hereinafter.

*Printer unit circuitry*

The printer unit is used to produce a printed record during "transit keyboard," "store," "transmit store," and "receive" operations of all transmitted received and stored messages. Basically, the printer unit, which is a typewheel page printing receiver which records upon a continuously fed roll of paper, comprises a function shaft and a typewheel carrying square shaft mounted for rotation about spaced parallel axes and drive coupled through a friction clutch. Drive torque is applied to the function shaft through a one revolution positive drive clutch from a motor B–801 (FIGURE 5) but the positive clutch is normally held disengaged by the armature of solenoid E–803. Upon each energization of solenoid E–803 the positive clutch is engaged and rotates the function shaft through a single revolution.

The periphery of the typewheel is divided into thirty-two equal spaces, twenty-six of which contain alphabetical type faces. This wheel is mounted upon the square shaft for rotation therewith, whereby character selection is performed, and for movement axially of the square shaft, whereby line space and line return movements are effected. Rotative positioning of the square shaft is utilized in conjunction with cams in the function shaft to effect printing, line feed, line return and automatic line return and feed. Fixed for rotation with the square shaft adjacent one end thereof is a sixteen toothed stop wheel. During a cycle of operation of the printer, the square shaft is released for rotation simultaneously with the release of the function shaft but its movement may be arrested at any one of the thirty-two possible positions of the print wheel. Movement of the square shaft is arrested by the energization of either solenoid E–801 or E–802 to engage the armature of the energized solenoid with an aligned tooth of the sixteen tooth stop wheel. The armature of solenoids E–801 and E–802 are so spaced about the periphery of the sixteen toothed stop wheel that one is operative to stop the square shaft at sixteen equally spaced positions and the other operative to stop the square shaft at a position intermediate each of those sixteen positions to provide a total of thirty-two positions.

The energization of each of the solenoids E–801 and E–802 is synchronized during rotation of the square shaft with the sixteen possible positions at which it may be operated by one of two commutators S–801 and S–802 each having sixteen output segments coupled respectively to the input circuits to solenoids E–801 and E–802 and a wiper fixed for rotation with the square type wheel shaft. During each printer cycle, a single commutator segment of the total of thirty-two is rendered operative to transmit a signal to energize the associated one of solenoids E–801 or E–802 and arrest movement of the type wheel shaft and print wheel at the desired position.

After the type wheel has been positioned in this manner a print hammer strikes the paper against the selected type face to cause the light surface of the paper to be broken to reveal a dark paper base in the form of the selected character. If the positioning of the type wheel corresponds to a function signal rather than a character signal, the print hammer is blocked by a cam on the type wheel shaft during operation of the printer in accordance with the selected functions of space, line feed, and line return.

Referring now to the circuitry in detail, the drive motor B–801 (FIGURE 5) is connected through the normally open contacts of relay K–801 to an external source of three phase 400 cycle 115 volt current. Relay K–801 is energized as soon as the power switch S–603 is turned on by applying 26.5 volts through pin 15 of J–801 and P–801 (FIGURE 5), through pin H of P–601 and J–601 (FIGURE 11) and through the left hand contact of the double pole switch S–603 to an external battery source of 26.5 volts D.C. The motor B–801 (FIGURE 5) is, therefore, running so long as the power switch S–603 (FIGURE 11) is on.

The selection of the one of commutators S–801 and S–802 which is operative for any given code group of five unit signals of the Baudot code is effected under control of the first unit signal of the code group. Considering first the printer actuation under keyboard control, as was pointed out in connection with the description of the keyboard circuitry shown in FIGURE 3, the closing of the number 1 code bar contact S–706 is effective to energize relay K–701 shown in FIGURE 7B. So long as K–701 remains de-energized, ground is applied through the normally closed contacts of K–701A through the normally open contacts K–809A (K–809 and K–808 being energized as will be explained hereinafter so long as the selector switch S–601, FIGURE 11, is set to its "store," or "transmit store" and no incoming signal is received, or its "transmit keyboard" positions), through pin H of J–2 and P–2 (FIGURE 7C), through pin 6 of P–801 and J–801 (FIGURE 5) to apply ground to the junction of resistor R–806 with the resistors R–807 to R–810. As will become apparent presently the grounding of this junction point renders commutator S–802 inoperative. Since S–706, number 1 code bar contact, in its open position corresponds to a space in the first unit of the five unit code and results in K–701A (FIGURE 7B) remaining open and the application of ground through pin 6 of J–801 to render commutator S–802 inoperative, commutator S–802 is operative when a mark signal appears in the first unit of the five unit code and is inoperative when a space signal appears in the first unit of the five unit code. Thus, if a mark signal appears in the first unit of the code, S–706 (FIGURE 3) is closed to energize relay K–701 (FIGURE 7B) to apply ground through the normally open contacts of K–701A through the normally open contacts K–808A (which are closed during "store," "transmit store" and "transmit keyboard" operation) through pin C of J–2 (FIGURE 7C), through pin 1 of P–801 and J–801 in the input resistor network to commutator S–801, commutator S–801 is rendered inoperative and S–802 is operative. It will be noted that the transfer of the armature contact K–701A removes the ground from the resistor network to commutator S–802 through pin 6 of J–801 so that S–802 is operative for a mark signal in the first unit of the five unit code.

The relays K–702, K–703, K–704, and K–705 (FIGURES 7A and B), through the position, transferred or normal, of their A armature contacts, are effective to control the individual position at which the square shaft is stopped. The normally closed A contacts of relays K–702, K–703, K–704 and K–705 are effective so long as these relays remain de-energized to apply ground through the normally opened contacts K–809B, K–809C, K–809D and K–809E through pins J, K, L, and M of J–2 and P–2 (FIGURE 7C) to pins 7, 8, 9 and 10 of P–801 and J–801 (FIGURE 5). The normally opened contacts K–702A, K–703A, K–704A and K–705A are effective, upon energization of any of these relays K–702, K–703, K–704 and K–705, to apply ground through the associated normally opened contacts K–808B, K–808C, K–808D and K–808E through pins D, E, F, and G of J–2 and P–2 to pins 2, 3, 4 and 5 of P–801 and J–801 (FIGURE 5).

Therefore K–702 in its de-energized position applies ground to pins 2 or 7 of J–801 alternatively, if K–702 remains de-energized, corresponding to a space in the second unit of the five unit code, ground is applied to pin 7, if K–702 is energized corresponding to a mark in the second unit of the five unit code ground is applied to pin 2 of J–801. Similarly K–703 controls the alternative application of ground to pins 8 and 3 of J–801, pin 8 being grounded so long as K–703 remains de-energized and pin 3 being grounded upon energization of K–703. Relay K–704 controls the alternative application of ground to pins 9 or 4 of J–801, pin 9 being grounded so long as K–704 remains de-energized and pin 4 being grounded upon energization of K–704. K–705 controls the alternative application of ground to pin 10 or pin 5 of J–801, pin 10 being grounded so long as relay K–705 remains de-energized and pin 5 being grounded upon energization of relay K–705.

As is apparent from reference to FIGURE 5, the selective grounding of pins 4, 9, 5 and 10 of J–801 through the actions of the diode networks CR–801 and CR–803 is effective to ground all but one of the four left hand segments 1, 2, 3 and 4 of the commutators S–801 and S–802. Further the selective application of ground to the pins 3, 8, 2 and 7 of J–801 is effective through the diode networks CR–802 and CR–804 to ground all but one of the four commutator segments 1, 2, 3 and 4 in any group of four commutator segments of the right hand half of the commutators S–801 and S–802 corresponding to any single commutator segment on the left hand half of commutators S–801 and S–802. Thus for any given setting of relays K–701 to K–705, a selection is made between commutators S–801 and S–802 by relay K–701, a selection of an individual one of the four segments of the left hand half of the commutators S–801 and S–802 will be made by the coaction of relays K–704 and K–705 with the diode networks CR–801 and CR–803, and a selection of a single one of the four commutator segments on the right hand half of the commutators S–801 and S–802 corresponding to the selected one of the commutator segments on the left hand half of those commutators will be made by the coaction of the diode network CR–802 and CR–804 with relays K–702 and K–703.

A negative 105 volts D.C. is applied to the junction between resistors R–830 and R–831 (FIGURE 5) through pin 25 of J–801 and P–801, through pin J of P–1 and J–1 (FIGURE 7A) and through the terminal of the movable contact of K–707B (FIGURE 7C) from terminal 6 of the power supply (FIGURE 12). This negative voltage is applied through a voltage divider network to the junction between R–805 and R–806 (FIGURE 5).

As to the one of the commutators S–801 or S–802 which is rendered inoperative by grounding of the pins 1 or 6 of J–801, the voltage appearing at the junction between R–805 and R–806 is dropped completely across R–805 or R–806, so that the associated one of the diode networks CR–801 or CR–803 is grounded. As to the one of the diode networks CR–801 or CR–803 which is not grounded by pins 1 or 6 of J–801, which for example we will assume to be CR–803, the negative voltage appearing at the junction of R–805 and R–806 is dropped through R–806 and through the three resistors of the group R–807, R–808 and R–809 and R–810 which are grounded through the diodes of the diode network CR–803 by the pins 4, 9, 5 and 10 of J–801. As to the one of the four lines leading to the four left hand commutator segments designated 1, 2, 3 and 4 of S–802 which is not grounded by the diode network CR–803, which in the present example we will assume to be segment number 4, corresponding to the ungrounded condition of pins 9 and 10 of J–901, the negative voltage will appear on the segment numbered 4 of the left hand half of the commutator S–802. Assuming that pins 3 and 2 of J–801 are ungrounded and pins 8 and 7 are grounded, as the wiper of the commutator S–802 advances along the commutator segments, the three commutator segments of the left hand side of the commutator S–802 designated 1, 2 and 3 are grounded so that no signal will be transmitted through the commutator wiper. As the commutator wiper advances along the length of the number 4 segment of the left hand half of the commutator S–802 through the four steps designated 4, 3, 2 and 1, segments 4, 3 and 2 have been grounded through the diode network CR–804 by the ground appearing on pins 8 and 7 of J–801. When the wiper advances to the number 1 commutator segment associated on the right hand side of the commutator S–802 associated with the number 4 segment on the left hand side of that commutator, the negative voltage applied at the junction of R–805 with R–806 will produce current flow through R–833, the one of the lower row of diodes of the diode matrix CR–804 associated with the lead to the number 1 commutator segments of the right hand half of the commutator S–802, through the wiper and the number 4 commutator segment of the left hand half of the commutator S–802 through R–810 and R–806. The negative voltage appearing at the ungrounded end of R–833 is applied to the grid of an amplifier tube V–801B, the anode of which is coupled through resistance R–824 to the grid of a thyratron tube V–804 in the anode circuit of which the Mark solenoid E–802 is connected. Therefore when this circuit is completed, a negative pulse will be applied to V–801B producing a positive pulse to V–806 to turn on that thyratron tube and energize the solenoid E–802 to cause its armature to engage the sixteen tooth ratchet affixed to the square shaft of the printer and terminate rotation of the square shaft.

If the first unit of the five unit code had been a space signal rather than a Mark signal so that pin 6 of J–801 was grounded and pin 1 remained ungrounded, the circuit made through the diode networks CR–801 and CR–802 and the commutator S–801 would have applied a negative voltage to the grid of amplifier tube V–801A across through resistor R–811 producing a positive signal through R–813 to the grid of thyratron tube V–802 to energize the space solenoid E–801 and engage its armature with the sixteen tooth ratchet to arrest movement of the square shaft at a position offset by one thirty second of a revolution from the position at which it would be stopped under control of the Mark solenoid E–802.

By this circuitry therefore any permutative setting of the code bar operated switches S–702, S–703, S–704, S–705 and S–706 is effective to arrest movement of the print wheel carrying square shaft of the printer at the one of the thirty-two possible positions corresponding to that permutation of the code bars.

The line feed of the paper and line return of the print hammer and type wheel are: automatic, key controlled or manually operable. The automatic line feed and line return functions operate mechanically when the type wheel and print hammer reach the extreme right hand side of the page as will be explained later. This feature prevents the loss of copy when the line return signal is not received after the seventy-second character. The key control line feed and line return functions are operated from the separate keyboard unit 50 or other remote transmitting equipment. The Baudot code signal for line return causes both line feed and line return mechanisms to operate through positioning of the square shaft. The printer is also automatically line returned and line fed when a button on the upper right hand side of the printer unit is manually depressed. The operation of the printer on line feed and line return under signal control is effected mechanically after the square shaft of the printer has been positioned to the position corresponding to those signals.

The type wheel and print hammer are attached to drum wound cables and a pawl and detent engaging ratchet of the drums spaces them across the page. A spring is wound up as the spacing takes place and release of the space pawl and detent will allow the hammer and type wheel to return to the start of the line. The print hammer is blocked from striking the paper when a function designation is received. The mechanism is driven through gears and clutches from the three phase induction motor B–801.

A lamp I–802 (FIGURE 5), when blowing, indicates that the message being recorded by the printer is coming from the radio receiver 62; another lamp I–803 when glowing indicates that the printer is monitoring a message to the radio transmitter 60 either from the keyboard 50 or from the storage unit 55. Lamps I–802 and I–803 are connected in common from one terminal thereof through pin 26 of J–801 and P–801, through pin F of P–601 (FIGURE 11) and through pin M of J–601 and P–601 to an external source of 26.5 volts D.C. The opposite side of I–802 is connected through pin 17 of J–801 and P–801, through pin C of P–601 and J–601 (FIGURE 11) through the normally open contacts K–601C of relay K–601 which is energized during "transmit keyboard," "transmit store" operations and during "receive" operation whenever a message signal is being received by the unit from an external source, through pin R of J–601 and P–601, through pin R of P–1 and J–1 (FIGURE 7A), and through the normally closed contacts K–808F of relay K–808 (which is energized during "transmit keyboard," and "transmit store" and "store" operations only during actual transmission and storing) to ground (FIGURE 7D), so that I–802 (FIGURE 5) is illuminated upon the energization of relay K–601 (FIGURE 11) in response to the receipt of an incoming signal, and so long as K–808 remains de-energized as it does when selector switch S–601 either is in its "receive" position or during receipt of a message when S–601 either is in its "receive" position or during receipt of a message when S–601 is in its "store" or "transmit store" positions.

I–803 (FIGURE 5) is connected through pin 16 of J–801 and P–801 through pin P of P–601 and J–601 (FIGURE 11), through the normally open contacts K–601D of relay K–601, through pin N of J–601 and P–601, through pin S of P–1 and J–1 (FIGURE 7A) and through the normally open contacts K–808F of relay K–808 (FIGURE 7D) to ground. The simultaneous energization of K–601 and K–808 is indicative of the fact a message is being transmitted. Thus when selector switch S–601 is set to "transmit keyboard" or when S–601 is set to "transmit store" and relay K–808 is energized, I–803 is illuminated. With S–601 set to "transmit store" or "store" and, relay K–808 de-energized by the receipt of an incoming message, or with S–601 in its "receive" position and a signal being received, lamp I–802 (FIGURE 5) is illuminated (FIGURE 11).

A further lamp I–801 is connected between ground and the common connection for lamps I–801 and I–802 to pin 26 of J–801 (FIGURE 5) to provide illumination for the page copy of the printer unit.

A cam on the spacing drum actuates at swtich S–804 at the sixty-sixth character position to cause illumination of the end of line margin lamp I–701 (FIGURE 3) of the keyboard to glow as has been previously explained in reference to the keyboard unit.

A further switch S–803, a single pole double throw switch is in its closed position as shown in FIGURE 5 so long as the frictionally driven main shaft of the printer unit is in its stop position and is effective to connect terminals 12 and 13 of J–801 and P–801. At all other times, the contact is transferred to ground pin 12 of J–801 and P–801 through resistor R–834. This switch is part of the interlock circuit for the keyboard unlock coil E–701 as has been explained above.

In describing the operation of the stopping of the square shaft of the printer, it has been assumed thus far that the square shaft was rotating. Before the square shaft can be rotated, it is necessary to disengage the armature of the last energized one of the solenoids E–801 and E–802 from the sixteen tooth ratchet and permit drive connection of the main power shaft to the drive motor B–801. This main power shaft is coupled to the drive motor B–801 through a one revolution clutch mechanism controlled by actuation of the transfer solenoid E–803. In order to initiate a cycle of operation of the printer, a positive pulse is applied through pin 11 of J–801 and through capacitor C–804 to the grid of the tube V–805 to render that tube conductive to energize the transfer solenoid E–803 to permit drive connection between the main power shaft of the printer and drive motor B–801. This same pulse is applied through capacitor C–803 to the grid of tube V–803 which in turn applies a negative pulse through capacitors C–801 and C–802 to the anode circuits of thyratrons V–802 and V–804 to cut off the conducting one of those two tubes and de-energize the one of the solenoids E–801 or E–802 which are previously energized, to thereby release the sixteen toothed ratchet and the square shaft of the printer to permit rotation of that shaft from the function or main drive shaft through the frictional connection therebetween.

This positive pulse applied through pin 11 of J–801 and P–801 originates in three different ways: (1) from the operation of the universal bar of the keyboard, (2) from the operation of the magnetic recorder reproducer during transmission, and (3) operation of the telegraph receiver.

Pin 11 of J–801 and P–801 is connected through pin Z of P–2 and J–2 to the armature contact of K–217A of relay K–217. Relay K–217 is energized upon the grounding of the normally opened contact K–216B upon energization of relay 216 which occurs when the transmitter is turned on to apply +26.5 volts to AJ2, through 18P201 (FIGURE 9), R–262, R–239, 10J–201 and P–201, K–216 (FIGURE 7C), AK217B as a terminal, to 4PS, a +210 v. terminal (FIGURE 12), for "transmit keyboard" and "transmit store" operations; and when the proper designation of a unit call or a broadcast call is received by the equipment through the receiver 62 when set to "transmit store," "store" or "receive"; and when the equipment is set to "receive" and the call switch S–602 is in its "out" position. These latter two operations will be explained in detail hereinafter. With K–217 deenergized during actual storage operation the normally closed contact of K–217A is connected to the armature contact of K–706B which latter contact is also connected to the normally closed contact of K–217D. When the selector switch S–601 is set to store (FIGURE 11), and K–706 is energized upon actuation of the universal bar contact S–701 (FIGURE 3) pin 11 of J–801 (FIGURE 5) is connected through the normally closed contacts K–217A, through the normally open contacts K–706B, through pin Y of J–2 and P–2 (FIGURE 7C), through pin Y of P–601 and J–601 (FIGURE 11) to the junction between R–602 and R–603 forming a voltage divider network for the 150 voltage applied through pin Z of J–601 as has been described hereinbefore and through the movable arm of the stage 4A of selector switch S–601 when in its store position. This positive signal applied through pin 11 of J–801 during store operation initiates operation of the main power shaft and square shaft of the printer as has been described hereinbefore.

During any receiving operation and when the transmitter is on during "transmit keyboard" and "transmit store" operations, K–217 is energized so that the armature contact of K–217A connects pin 11 of P–801 (FIGURE 5) to pin 19 of P–201 (FIGURE 9) which is connected to the cathode of cathode follower tube V–210A. During receiving operations, the grid of cathode follower tube V–210A receives its input from the delayed multi-vibrator V–209A and V–209B through pin 33 of J–201, P–201, the normally closed contacts K–112B which is de-energized during "receive," "rewind" and "store" operations and energized during "transmit keyboard" and during "transmit store" operations while K–215 remains de-energized. The delayed multi-vibrator formed by tubes V–209A and V–209B receives a pulse through capacitor C–212, through pin 34 of J–201, P–201, through the normally closed contacts K–112C and through pin 8 of J–301, P–301 (FIGURE 6) from the cathode of the number 8 ring counter distributor tube V–308. When the eighth distributor tube V–308 (FIGURE 5) is turned on at the end of each cycle of the ring counter, a positive pulse will be transmitted to the delayed multi-vibrator formed by tubes V–209A and V–209B (FIGURE 9) which will cause the cathode follower V–210A to conduct thus supplying a positive pulse to the pin 11 of J–801 (FIGURE 5).

During "transmit keyboard" and "transmit store" operations, the transfer pulse to the printer through pin 11 of J–801 (FIGURE 5) is also derived from the cathode of cathode follower tube V–210A via pin 19 of J–201, OK–217A and ZJ2 but, in "transmit keyboard," the grid of cathode follower tube V–210A is controlled by a signal derived from the cathode of the first distributor tube V–301 (FIGURE 6), via 7P–301, CK–710F (FIGURE 7), AK–710F, OK–112B, AK–112B and 12P-201 (FIGURE 9) and, in "transmit store," the grid of cathode follower tube V–210A is controlled by a signal derived from the cathode of the second distributor tube V–302 (FIGURE 6) via 28P–301, OK–710F (FIGURE 7), AK–710F, OK–112B, AK–112B and 12P–201 (FIGURE 9). Thus, in "transmit keyboard," the transfer pulse to the printer occurs upon the firing of the first distributor tube via the normally closed contacts K–710F and, in "transmit store," the transfer pulse to the printer occurs upon the firing of the second distributor tube via the normally open contacts K–710F.

*Storage unit*

The storage unit is a magnetic tape recorder and reproducer designed to accommodate storage and read out of data indicative signals in the form of the Baudot code. The tape in the present form of the invention is a steel tape of sufficient width to provide at least five intelligence recording positions across the width of the tape. In each recording cycle of operation, the recording head PU–501 (FIGURE 4) is caused to reciprocate across the width of the tape while the tape remains stationary, the movement of the recording head PU–501 being synchronized with the movement of the wiper of a commutator S–501 across five commutator contacts or segments which correspond to the five units of the five unit Baudot code. In between each recording movement of the recording head, the tape is advanced longitudinally one recording space by a sprocket drive wheel engaging a series of perforations extending longitudinally along one edge of the steel recording tape. This sprocket is driven by the motor B–501 through a friction driven escapement mechanism.

As has been pointed out before when it is desired to store a message in the storage unit for future transmission, the power toggle S–603 (FIGURE 11) is turned to its on position, the selector switch S–601 is turned to the rewind position until the lamp I–602 glows, the selector switch S–601 is then turned to its store position and the unit is ready for keyboard manipulation. The shifting of the selector switch S–601 (FIGURE 11) to its rewind position applies ground through section 1 of S–601 through pin HH of J–601 and P–601 through pin M of P–2 and J–2 and through pin 14 of P–501 and J–501 to one side of rewind relay K–501 (FIGURE 4). The opposite terminal of rewind relay K–501 is connected through pin 15 of J–501 and P–501 to a 26.5 volts source in the power supply (FIGURE 12). The energization of rewind relay K–501 reverses the connections between tape drive motor B–501 and the three phase power supply to reverse the direction of drive of B–501 to advance the tape in its reverse direction to its initial starting position. When the tape reaches its starting position, S–505 the reset sensing switch closes to apply ground through pin 21 of J–501 and P–501, through pin W of J–2 and P–2, through pin K of P–601 and J–601 to the connection to one side of lamp I–602 the opposite side of which is connected through pin M of J–601 and P–601 to a 26.5 volts power supply source. Illumination of I–602 advises the operator that the storage tape is rewound. The tape drive sprocket is automatically disengaged from its drive mechanically when the tape is restored to its starting position.

The selector switch S–601 (FIGURE 11) is now set to its "store" position to de-energize relay K–501 (FIGURE 4) and restore the normal direction of drive of tape drive motor B–501 and to establish the necessary circuitry to permit storage of information in the storage unit under control of the keyboard. When the selector switch S–601 (FIGURE 11) is set to its "store" position, ground is applied through stage 2 of the selector switch S–601, through pin DD of J–601 and P–601, through pin X of P–1 and J–1 (FIGURE 7A) to a terminal of the relay coil K–714 (FIGURE 7B) to energize relay K–714, its opposite terminal being connected to the 26.5 volt power supply line.

Ground is also supplied by this connection to K–714 through pin 33 of P–901 and J–901 (FIGURE 8) to energize relay K–901. The energization of K–901 applies a 6.3 volt A.C. current from terminal 2 of the power supply (FIGURE 12) through pin 34 of P–901 and J–901

(FIGURE 8), through the normally open contacts K–901A, through pin 42 of J–901 and P–901, through pin 6 of P–501 and J–501 to the erase coil L–501 (FIGURE 4), the opposite side of which is grounded to terminal 1 of the power supply (FIGURE 12) through pin 7 of J–501 and P–501 (FIGURE 4). The erase coil L–501 is so located in the storage unit that the steel recording tape must pass through the erase head L–501 before reaching the recording head PU–501 when the tape is being advanced in its normal direction.

The energization of K–901 (FIGURE 8) also connects the wiper of commutator S–501 (FIGURE 4) through pin 13 of J–501 and P–501 through pin 44 of P–901 and J–901 (FIGURE 8) through the normally closed contact K–902A, through resistor R–908, through the normally open contacts K–901B, through pin 40 of J–901 and P–901, through pin 11 of P–501 and J–501 (FIGURE 4) to one side of the recording head PU–501. The opposite side of recording head PU–501 is connected through pin 12 of J–501 and P–501, through pin 41 of P–901 and J–901 (FIGURE 8) to ground. By this connection any voltage appearing upon the segments 1 through 5 of commutator S–501 will induce current flow in the recording head PU–501 (FIGURE 4) to record upon the tape as the wiper of commutator S–501 is moved across those segments.

The segments 1 through 5 of commutator S–501 are connected through pins 1 through 5 respectively of J–501 and P–501 to the normally opened contacts A, B, C, D and E of relay K–714, which is energized, as has been pointed out before, when the selector switch S–601 (FIGURE 11) is in its "store" position. The armature contacts A, B, C, D, and E of relay K–714 are connected to the normally open B contacts of relays K–701, K–702, K–703, K–704 and K–705 respectively. It will be recalled that in keyboard operation, the energization of relays K–701 through K–705 is under control of the code bar actuated switch S–706 through S–702 (FIGURE 3) and that upon the closure of any of these switches the corresponding one of the relays K–701 through K–705 will be energized. The armature contacts B of relays K–701 through K–705 are connected in common to the armature contact K–714F, which when K–714 is energized during storage operation, is connected through contact OK–714F to the 26.5 volt D.C. line.

By this circuitry therefore the movement of a code bar in the keyboard to close one of the code bar actuated switches S–706 through S–702 is effective to apply a 26.5 volt signal to the corresponding one of the segments 1 through 5 of commutator S–501 (FIGURE 4) which, as the wiper of commutator S–501 is moved in synchronization with the recording head PU–501, is effective to induce current flow through the recording head PU–501 and recordation of a signal in a position transverse of the tape corresponding to the code bar moved.

The storage unit start magnet E–501 (FIGURE 4) is connected between terminal 5 of the power supply (FIGURE 12), a source of 150 volts plus, through pin 9 of J–501 and P–501 and the anode of the recorder release magnet tube V–213 through pin 8 of J–501 and P–501 and pin 16 of P–201 and J–201 (FIGURE 9). The grid of this tube V–213 is pulsed, upon energization of K–706 by the universal bar contact S–701, through pin 9 of J–201 and P–201, AK217D, CK217D, AK706B, OK706B, YJ2, and YP601, from the junction of R–602 and R–603, R–602 being connected to a plus 150 power supply by terminal in "store." This same signal forms the transfer pulse to the printer from AK706B, through CK217A, AK217A, 2J2 and 11P801 as has been explained hereinbefore.

During the storage operation, the A contacts of relays K–701 through K–705 are effective through the normally open contacts of relays K–808 and K–809 (FIGURE 7D) to apply to ground alternatively to the pairs of pins 4 and 9, 5 and 10, 3 and 8, 2 and 7 and 6 and 1 of J–701 (FIGURE 5) to control the positioning of the type wheel carrying square shaft as has been previously described. K–808 and K–809 are energized during "store" by the application of ground through TJI, BP601, AK601B, CK601B, and the store contact of section 3 of S601. In this manner a printed record is made of the information stored in the storage unit.

When it is desired to transmit a stored message to the radio transmitter, the power toggle switch S–601 (FIGURE 11) is turned to on, the selector switch S–601 is set to its "rewind" position until the lamp I–602 glows to rewind the steel recording tape to its start position as has been described hereinbefore, and the selector switch S–601 is turned to its "transmit store" position. With the selector switch S–601 (FIGURE 11) in its "transmit store" position, relay K–901 (FIGURE 8) remains deenergized, and relay K–902, one side of which is connected through pin 43 of J–901 and P–901 to the 26 volt line, is energized by grounding the opposite terminal thereof through pin 31 of J–901 and P–901 to one side of the coil of relay K–710 (FIGURE 7B) as a terminal, through pin W of J–1 and P–1 through pin W of P–601 and J–601 (FIGURE 11) through section 5A of selector switch S–601, through pin W of J–601 and P–601, through pin P of P–1 and J–1 (FIGURE 7A), through the normally closed relay contacts K–215B, through pin M of J–1 and P–1, through pin CC of P–601 and J–601 (FIGURE 11) and through stage 3 of selector switch S–601 to ground. Relay K–215 is connected in the plate circuit of transmit store end of message detector tube V–211 (FIGURE 9). This relay is energized upon transmission of the end of message signal upon completion of transmission of a message from storage and is effective to restore the circuit to its "receive" condition to record incoming signals.

Referring again to FIGURE 8, with relay K–901 deenergized, the ungrounded side of recording head PU–501 (FIGURE 4) is connected through pin 11 of J–501 and P–501, through pin 40 of P–901 and J–901 (FIGURE 8) through the normally closed contacts K–901B, to the ungrounded side of the primary winding of transformer T–901 which is connected in the grid input circuit of amplifier tube V–901A the output of which is connected to the grid of a second stage amplifier tube V–901B. With relay K–902 energized as has been previously described, the output of V–901B from its anode is connected through normally open contacts K–902A, through pin 44 of J–901 and P–901, through pin 13 of P–501 and J–501 (FIGURE 4) to the wiper of commutator S–501. As has been previously pointed out, the segments 1 through 5 of commutator S–501 are connected to the normally open contacts A through E of relay K–714 (FIGURE 7B). These normally open contacts A through E of relay K–714 are also connected to pins 6, 7, 8, 9 and 10 respectively of P–901 and J–901 (FIGURE 8) which are respectively connected to the normally open contacts B, C, D, E and F of relay K–902 which, when relay K–902 is energized as it is during "transmit store" operation, is effective to connect these terminals to the input grid circuits of thyratron tubes V–902, V–903, V–904, V–905 and V–906.

By this circuitry during transmit store operation, as the recording head and commutator move in synchronism across the tape, signals are induced in the recording head PU–501 (FIGURE 4) which are amplified by V–901 (FIGURE 8) and applied to the wiper of commutator S–501 (FIGURE 4). This signal is distributed over the five wires in synchronism with the movement of the recording head PU–501 by the commutator S–501. A recorded signal in the 1, 2, 3, 4 or 5 position across the recording tape will thus be effective through the circuitry to fire the corresponding one of thyratrons V–902, V–903, V–904, V–905 or V–906 respectively. The firing of any one of these five thyratrons is effective to energize the one of the relays K–904, K–905, K–906, K–907 and K–908 connected in its anode circuit. These relays will remain energized and the associated one of the tubes will remain conducting until released by energization of relay K–903 by the conduction of tube V–104B (FIGURE 10) in the plate circuit of which relay K–903 is connected through pin 36 of J–901 and P–901 and through pin 16 of P–101 and J–101 (FIGURE 10). The timing of the energization of K–903 to break the B plus line to thyratrons V–902 through V–906 as well as V–104B will be explained hereinafter.

The normally open contacts A of relays K–904 through K–908 are connected through pins 11, 12, 13, 14 and 15 of J–901 and P–901 to the normally open contacts A, B, C, D, and E of relay K–710 (FIGURE 7B).

It will be remembered that during "transmit store" relay K–710 is energized in parallel with relay K–902 as has been explained hereinbefore. With relay K–710 energized, the normally open contacts A, B, C, D, and E of relay K–710 are connected respectively to the coils of relays K–701, K–702, K–703, K–704 and K–705. Thus the energization of any one of the relays K–904 through K–908 will produce energization of a corresponding one of the relays K–701 through K–705. As has been described hereinbefore in reference to "transmit keyboard" operation, the permutative energization of relays K–701 to K–705 controls the application of ground to terminals 1 through 10 of J–801 of the printer unit (FIGURE 5) through the normally open contacts of relays K–808 and K–809 (FIGURE 17) to control the printer operation. In "transmit keyboard" and "transmit store," K–808 and K–809 are energized through TJ1, BP601, AK601B, OK601B, WP601, PP–1, CK215B, AK215B, MJ1, CCP601 and section 3 of S–601 to ground.

By this circuitry therefore the selective energization of relays K–904 through K–908 (FIGURE 8) is effective to selectively apply ground to the terminals 1 through 10 of J–801 of the printer units for controlled printing in the same manner as described hereinbefore in reference to the control of the printer and the control of the keyboard. Thus during " transmit store" operation the printer unit is operated to produce a printed record of signals read from the storage unit and transmitted as will now be explained.

Pulses from the number 3, 4, 5, 6 and 7 distributor tubes V–302 through V–306 are applied through diodes CR–301 through CR–305 (FIGURE 5) through terminals 1 through 5 of J–301 and P–301 to the normally closed contacts A through E of relay K–714 to the normally open B contacts of relays K–701 through K–705 respectively. The armature B contacts of relays K–701 through K–705 are connected through a common connection to the armature contact K–714F and the normally closed contact K–714F to the normally opened contact K–112F. The normally opened contact K–112F is also connected through pin 6 of P–301 (FIGURE 6) and through diodes CR–306 and CR–307 to the output of the seventh and eighth distributor tubes V–307 and V–308. During "transmit store" operation, relay K–112 is energized through pin U of J–1 and P–1 (FIGURE 7A), through pin A of P–601 and J–601, through the normally open A contacts of relay K–601 (FIGURE 11), through pin W of J–601 and P–601 which is grounded through the B contacts of relay 215 when the selector switch S–601 is in its transmit keyboard or transmit store positions as has been explained hereinbefore.

It is apparent from the foregoing explanation that, in timed sequence with the cyclical operation of the ring counter of FIGURE 5, a time sequential signal including a pulse from those of the distributor tubes V–302 through V–306 associated with an energized one of the relays K–701 through K–705 and an impulse from the seventh and eighth distributor tubes V–307 and V–308 will appear at the normally open contact K–112F. With relay K–112 energized as has been explained hereinbefore, this train of signals is applied to pin 7 of relay driver tube V–402

(FIGURE 12) to control the operation of the signal relay K–404 to apply ground to pin B of J–1 and P–1 which is the sequential signal output connection to the radio transmitter.

By this circuitry, during transmit store operation, the five unit signal recorded in the storage unit (FIGURE 4) is sensed and converted into simultaneous signals represented by the selective energization of relays K–904 through K–908 (FIGURE 8) which is utilized to effect control, through relays K–701 to K–705, of the printer in accordance with the significance of the signal and to produce a time sequential signal under control of the ring counter (FIGURE 6) for transmission to the transmitter indicative of the same data as that of the signal sensed in the storage unit.

The sequential signal to the transmitter during transmit keyboard operation is generated and produced by the same circuits as has just been described for transmit store operation.

*Transmit distributor circuits*

Thus far it has been assumed that a series of pulses from the distributor tubes V–301 to V–308 will be applied to control the cyclical operation of the circuitry without explanation of the operation of this source.

The linear ring counter distributor advances one step for each pulse applied to the pulsing bus. With a seven-tube ring, using the number one output as the start pulse, outputs numbers 2 to 6 for number 1 to 5 mark, and the number 7 output as the stop pulse, a driving pulse pattern consisting of six 22 millisecond pulses and one 31 millisecond pulse must be applied to the pulse bus to produce a 7.42 unit Baudot code. One of the biggest problems in obtaining a stable, accurate time base lies in obtaining a stable oscillator. Reactance variation of one of the components to obtain a frequency to produce the required 31 millisecond pulse is incompatible with the requirements of a stable oscillator. It is therefore desirable to use a continuously running frequency source and to obtain the variation in pulse spacing by other means. If the variation in pulse spacing is to be accomplished externally from the oscillator, as by dividing the output of the time base oscillator, another problem arises in connection with the 7.42 unit code. Suppose that a frequency was chosen such that 100 cycles would, when counted by suitable circuitry, produce pulses spaced 22 milliseconds apart and when divided, 142 cycles would produce 31 millisecond spacing. By the use of gates controlled by the distributor, a suitable pulse train could be applied to the ring driving bus to produce a 7.42 unit code whose accuracy would be dependent on the accuracy of the oscillator and dividrs. Since both 100 and 142 are divisible by two, the frequency could be cut in half and the dividers lowered to 50 and 71, respectively. Since there are no common factors btween 50 and 71, these represent the lowest amounts of division possible. It is possible that one divider could be used to produce both counts by external control from the ring, but in any event the circuitry required is extensive.

In order to simplify the time base circuit, it was decided to modify the code from the standard 7.42 units while maintaining the code compatable with the present standard equipment utilizing a 7.42 unit code. The use of 7.5 units offers a solution which results in an extremely simple time base. The difficulty in generating a 7.42 unit code arises because of the odd length of the stop pulse. The 7.5 unit code requires a 1.5 unit stop pulse giving a ratio of 2 to 3 with respect to making and stop pulses. In the present invention this stop pulse is obtained by combining two distributor outputs, one 11 millisecond pulse and one 22 millisecond pulse to obtain the 33 millisecond stop pulse.

The transmit circuit used in the equipment of the present invention is shown in FIGURE 6 and consists of the following: (1) A reed controlled oscillator operating at 272.7 cycles, (2) a first divider which is driven by the 272.7 oscillator and divides at 90.9 cycles, (3) a second divider driven by the first divider dividing to 45.45 cycles except during the time the number 7 ring output tube V–307 is energized. Voltage from the number 7 output tube V–307 is applied to the second divider which disables the divide function. The result of this action is the number 7 output which is energized for 11 milliseconds, (4) cathode follower V–311(*b*) to provide a low impedance drive source for the ring pulse bus through pin 10 of J–301.

When no transmission is occurring, the number 8 output tube V–308 remains energized because the ring circuit is broken by means of a start gate V–313(*a*). Driving pulses are applied to the drive bus at 45.45 cycles. For keyboard operation the gate is pulsed closed for a sufficient period to allow a drive pulse to fire the first ring tube V–301. The ring then cycles down to the number 8 tube and stops. Width of the gating pulse is not critical and does not enter into the signal timing except that start of transmission may be delayed up to a maximum of 22 milliseconds after a key is operated. Utilization of a frequency higher than the 90.0 cycles required by the time base results in a reduction in the effects of vibration of the reed control.

The time base circuitry is generally shown in FIGURE 6. During all operations other than the reception of an external signal this circuitry is controlled from the transmitter oscillator base tube V–312 (FIGURE 6) which, with the related components shown, is a reed controlled oscillator operating at 272.7 cycles. The output of this oscillator, appearing across resistor R–357, is connected through capacitor C–317 to the grid of a first divider circuit, formed by tubes V–309A and V–309B, which is effective to produce an output frequency through capacitor C–319 of 90.9 cycles per second. The 90.9 cycle signal applied through capacitor C–319 is connected to the input of a second divider formed by tubes V–310A and V–310B, the output of which is 45.45 cycles per second. This output signal is taken from the movable arm of the potentiometer R–352 and transmitted through capacitor C–321 to the input grid of cathode follower tube V–311B.

The ring counter formed by tubes V–301 through V–308, each of which is a thyratron tube, has a normal terminal condition in which V–308 is conducting and all other tubes of the ring are non-conducting. Due to the circuitry, only one of the tubes V–301 through V–308 can conduct at any given time and the conduction of any given tube in the ring primes the input circuit to the next adjacent higher tube in the ring so the next impulse applied to the ring will turn on such next adjacent higher tube and extinguish all other tubes of the ring. The output signals of cathode follower tube V–311B are applied through capacitor C–322, through pin 19 of J–301 and P–301, the normally opened contacts K–112E (FIGURE 7D), through pin 9 of J–301 and P–301 (FIGURE 6) through R–301 to the grid of the first ring counter tube V–301, and to the junction between R–336 and R–337 in the voltage divider network for the cathode of the eighth counter tube V–308. The signal from the cathode follower tube V–311B is also applied through pin 20 of J–301 and P–301, through the normally opened contacts K–112D, through pin 10 of P–301 and J–301 and through capacitors C–302, C–304, C–306, C–308, C–310, C–313 and C–315 in parallel to the grids of tubes V–302 through V–308, tubes numbers 2 through 8 of the ring counter.

Normally the first distributor tube V–301 is biased to cut-off the —105 voltage applied through pin 26 of J–301 and R–337 and R–301 to its grid. So long as this bias is maintained, V–308, the eighth distributor tube, will remain conducting and the other tubes will remain non-conductive. The anode of a start gate tube V–313A is connected to the junction between resistors R–335 and R–336 in the voltage divider network controlling the bias to the first distributor V–301. During "transmit keyboard" operation, when start gate V–313A is conductive the junction between resistors R–335 and R–336 is effectively grounded thus reducing the bias applied to the grid of V–301 sufficiently so that a pulse supplied from the cathode follower tube V–311B through terminal 9 of J–301 is effective to render V–301 conductive. When V–301 becomes conductive V–308 is turned off.

The grid of the start gate V–313A is connected through resistor R–361 and pin 22 of J–301, P–301 to the normally open relay contacts K–707B. Relay K–707 is energized for all positions of the selector switch other than transmit keyboard by application of ground through section 1A of selector switch S–601 (FIGURE 11), pin U of P–601 and J–601, pin Y of P–1 and J–1 (FIGURE 7A) to the coil of relay K–707. Relay K–707 when energized is effective through its normally open B contacts to apply —105 volts from terminal 6 of the power supply through pin 22 of P–301 (FIGURE 6) and R–361 to the grid of the start tube V–313A. With the selector switch S–601 (FIGURE 11) set in its transmit keyboard position, the pin 22 of J–301 is connected, as has been described above to the movable arm of section 1A of selector switch S–601 (FIGURE 11) which, when in the "transmit keyboard" position, is connected through pin BB and through pin J of P–701, J–701 (FIGURE 3) to the normally opened contact of the repeat contacts S–707 operated by the space bar. Upon operation of the space bar the pin J of J–701 is connected to pin K of J–701 which for transmit keyboard operation is connected to ground as has been described hereinbefore. The application of ground in this manner to the grid of start gate V–313A (FIGURE 6) primes V–301, the first tube of the distributor ring counter for operation so long as the repeat contacts are closed. Thus the ring counter will continue to cyclically operate.

The grid of start gate tube V–313A is also connected through capacitor C–325, through pin 21 of J–301, P–301 (FIGURE 6), to the normally open contact K–706A. As has been explained hereinbefore, relay K–706 is energized in "transmit keyboard" and "store" by operation of the universal bar contacts S–701 (FIGURE 3). The armature contact AK–706A is connected through pin L of J–1 and P–1 (FIGURE 7A) and through pin EE of P–601 and J–601 (FIGURE 11) to ground through section 2 of the selector switch S–601 in its "transmit keyboard" position. By this circuitry, upon each energization of K–706 (FIGURE 7C), ground is applied through pin 21 of J–301 (FIGURE 6) and through the capacitor C–325 to render the start gate V–313A temporarily conductive so that a pulse from the cathode follower V–311B applied through pin 9 of J–301, as has been described hereinbefore, can fire V–301 the first tube of the distributor ring. The tubes V–301 through V–308 of the ring counter will fire in succession upon the receipt of impulses through pin 10 of J–301 from the cathode follower until the eighth distributor tube V–308 is again fired in which condition the distributor ring will remain until the pulse is again transmitted to the start gate V–313A.

During "transmit store" operation, operation of the ring counter is initiated by the same pulse that is applied through C–221 (FIGURE 9) to the recorder release tube V–213, via 150201, gJ1 (FIGURE 7), LP601 (FIGURE 11), AK601F, OK601F, section 3A of S–601, P601, NP1 (FIGURE 7), AK215A, CK215A, 27P301 (FIGURE 6) and R–334. During "Receiver" operation, operation of the ring counter is initiated by a pulse from V104A (FIGURE 10) via 9J101, CK112E, AK112E and 9P301.

When the seventh distributor tube V–307 fires, the resulting output signal is applied from the junction of resistors R–329 and R–330 to the grid of delay tube V–311A, the cathode of which is connected in parallel with the cathodes of the divider tubes V310A and V–310B through resistor R–349 to ground. This renders the divider inoperative for one cycle of output of the first divider formed by V–309 and V–309B so that the next signal occurs eleven milliseconds after V–307 was turned on, turning off V–307 and turning on V–308.

*Receiver operation*

When it is desired to record all calls received by the receiver irrespective of the preceding call designation signal, the selector switch S–601 (FIGURE 11) is set to receive and the call switch S–602 is set to its "out" position.

Under these conditions relay K–601 is energized by the application of ground through stage 3 of selector switch S–601, through the call switch S–602, to the coil of relay K–601 the opposite side of which is connected to a 26.5 volt source through the power switch S–603.

Ground is also applied through section 2 of the selector switch S–601, through call switch S–602, through pin AA of J–601 and P–601, through pin F of P–1 and J–1, to the normally closed contact K–113A as a terminal, through pin 32 of P–201, J–201 (FIGURE 9) to resistor R–252 in the grid input to thirty-second reset tube V–210B rendering that tube conductive. Relay K–216 is connected between pin 4 of the power supply (FIGURE 12) by the switch contact K217B as a terminal and the anode of V–201B (FIGURE 9) via pin 10 of P–201, J–201 and resistor R–239. The energization of relay K–216 applies ground through the normally open contact K–216B to relay K–217 to energize that relay.

An incoming signal consisting of a start signal, five coded signals and a stop signal are applied through pin A of P–1 and J–1 from the radio receiver and through pin 6 of P–101 and J–101 (FIGURE 10) and through capacitors C–102 and resistors R–129, R–132, R–135, R–138 and R–141, to the grid of the start tube V–104A and coincidence detector tubes V–102B, V–105A, V–105B, V–106A and V–106B respectively. The start pulse when applied to start tube V–104A produces a signal through capacitor C–104, through pin 9 of J–101 and P–101, through the normally closed contacts K–112E, through pin 9 of P–301 (FIGURE 5) to the input circuit to V–301, the first distributor tube. This signal is effective to turn off the eighth distributor tube V–308 and turn on the first distributor tube V–301, thereby initiating operation of the ring counter.

While conducting, V–308 is effective to apply a positive voltage via pin 8 of J–301 and P–301, the normally closed contact K–112C and pin 8 of J–101, P–101 (FIGURE 10) and resistor R–101 to the grid of gate tube V–101A, the cathode of which is connected in parallel with the cathode of one of the receiver time base multi-vibrator tubes V–103B through R–112 to ground. So long as V–101A, the gate tube, is conducting, the multi-vibrator receiver time base remains inoperative. When the eighth distributor tube V–308 (FIGURE 6) is cut-off and the first distributor tube V–301 is turned on, this positive voltage is reduced to a negative voltage to cut off the gate tube V–101A and permit the receiver time base to operate as a multi-vibrator. The initiation of the operation of the receiver time base is thus controlled by the start pulse to the start tube which shifts the ring counter of FIGURE 6 from its eighth position to its first position. The output of the multi-vibrator receiver time base (FIGURE 10) is differentiated and fed to the grid of the clipping amplifier tube V–101B. The positive output signal from the anode of V–101B is connected via pin 10 of J–101 and P–101 and the normally closed contacts K–112D and pin 10 of J–301, P–301 (FIGURE 6) to the input circuits to the second through eighth distributors V–302 through V–308. These impulses are are effective to advance the ring counter in steps until it reaches its eighth position in which the positive voltage from the cathode of V–308 is effective to render the gate tube V–101A conductive and terminate operation of the receiver time base multi-vibrator (FIGURE 10). The cathodes of tubes V–303 through V–307 are connected through pins 11 through 15 of J–301 and P–301 and pins 11 through 14 and 21 of P–101 and J–101 (FIGURE 10) to the input circuits of coincident tubes V–102B, V–105A, V–105B, V–106A and V–106B repectively. If a mark signal is applied through pin 6 of J–101 simultaneously with the application of a 3, 4, 5, 6 or 7 pulse to V–102B, V–105A, V–105B, V–106A and V–106B such one of the tubes will be rendered conductive. Magnetic memory cores are connected in series with the anode of each of these coincidence tubes so that if the coincidence tube is rendered conductive the associated one of the magnetic memory cores T–101 through T–105 will be caused to store a signal.

When the eighth distributor tube again fires, the signal applied through pin 8 of J–101, as hereinbefore described, is applied through capacitor C–101 to the grid of the relay tube V–102A the anode of which is connected through the memory cores T–101 through T–105 to terminal 5 of the power supply (FIGURE 12) by a pin 18 of J–101. This impulse through memory cores T–101 to T–105 is effective to produce an output impulse through the associated capacitors C–105, C–110, C–112, C–114, and C–116 for those cores in which a signal has been stored. These capacitors C–105, C–110, C–112, C–114 and C–116 are connected in parallel through pins 1 through 5 of J–101 and P–101 and through pins 1 through 5 of P–901 and J–901 (FIGURE 8) and the normally closed contacts B, C, D, E, and F of relay K–902 to the grid of the thyratrons V–902 through V–906. Thus when a read out signal is transmitted by read out tube V–102A through the magnetic cores T–101 through T–105, for each one of those cores in which a signal has been stored, the corresponding one of the thyratrons V–902 through V–906 will be fired to energize the associated one of the relays K–904 through K–908. These relays store the input signal and set up the printing matrix of FIGURE 5 as has been explained hereinbefore.

When the seventh tube of the ring counter of FIGURE 6 fires during the next succeeding cycle of that ring counter the signal applied through pin 21 of J–101 (FIGURE 10) to the grid of the fifth coincidence tube V–106B is also applied through capacitor C–115 to the grid of B plus break tube V–104B to render that tube conductive. The anode of that tube 104B is connected through pin 16 of J–101 and P–101, through pin 36 of P–901, to the coil of K–903 the opposite side of which is connected through its own contacts to terminal 5 in the supply (FIGURE 12) through pin 9 of J–901 and P–901. The energization of relay K–903 is effective to unfire any of the thyratrons V–902 through V–906 which has been fired and to break the B plus supply to the B plus break tube V–104B (FIGURE 10) restoring it to its non-conductive condition.

The signal applied through capacitor C–115 is applied through diode CR–101 to the junction between resistors R–121 and R–122 to apply a negative signal through resistors R–128, R–131, R–134, R–137 and R–140 to the grid of each of the coincidence tubes V–102B, V–105A, V–105B, V–106A and V–106B.

*Call system*

The call system of the present invention provides an electronic system for recognizing a start of message code and call sign letters, determined by the unit to appear in the proper sequence, and which is effective to prevent operation of the equipment upon the receipt of letters making up the call sign letters received at random as part of a transmitted text. In the present invention, the call signal consists of a two letter call alert signal followed by a permutation of three of any of 16 keyboard letters for a unit and for a broadcast call. Thus LTRS–LTRS A B C would be a possible call.

Referring to FIGURE 13 of the drawings, which is the schematic diagram of the call patch box circuit unit, sixteen sockets designated A through P respectively are provided. Six pluggable diode units designated CR–1 through CR–6 are provided, diode units CR–1 through CR–3 being for the first, second and third letters of the unit call and CR–4 through CR–6 being letters one, two and three of the group call. These pluggable units may be inserted in any of the sockets A through P shown in FIGURE 13. As illustrated, the unit call will be letters-letters A B C and the group call will be letters-letters D E F. By this arrangement, the unit call may consist of any three of the letters A through P in any order desired and the group call may consist of any three of the remaining letters arranged in any order desired.

The output wires of the pluggable diode units CR–1 through CR–6 are connected respectively through pins 5 through 10 of TB–1 and through pins 2, 4, 3, 5, 6 and 7 respectively of P–201 and J–201 to the call system circuitry. The connection from CR–1 through pin 2 of J–201 is to the junction between resistors R–210 and R–212 in the voltage divider network between V–202 and V–203. The connection from CR–2 through pin 4 of P–201 is to the junction between resistors R–218 and R–219 and the voltage divider network between V–203 and V–204. The connection from CR–3 through pin 3 of J–201 is the junction between resistors R–223 and R–225 in the voltage divider network between V–204 and V–207. The connection from CR–4 through pin 5 of J–201 is to the junction between resistors R–211 and R–213 in the voltage divider network between V–202 and V–205. The connection from CR–5 through pin 6 of P–201 is to the junction between resistors R–229 and R–230 of the voltage divider network between tubes V–205 and V–206. The connection from CR–6 through pin 7 of P–201 is to the junction between resistors R–234 and R–236 in the voltage divider network between V–206 and V–208.

Referring again to FIGURE 13, terminals 1 of sockets A, B, D, E, F, J and K are connected in common to pin 16 of TB–1; pin 1 of sockets C, G, H, I, L, M, N, O and P are connected in common to pin 11 of TB–1. Pins 2 of sockets P, A, C, G, I, J, K, and L are connected in common to pin 17 of TB–1; and pins 2 of sockets B, D, E, F, H, M, N, O are connected in common to pin 12 of TB–1. Pins 3 of sockets J, O, A, B, D, E, G, L are connected to pin 13 of TB–1; and pins 3 of sockets C, F, H, I, K, M, N and P are connected in common to pin 18 of TB–1. Pin 4 of sockets A, E, H, I, L, and P are connected in common to pin 14 of TB–1; and pin 4 of sockets B, C, D, F, G, J, K, M, N and O are connected in common to pin 19 of TB–1. Pins 5 of A, C, D, E, F, I, J, K and N are connected in common to pin 15 of TB–1; and pins B, G, H, L, M, O and P are connected in common to pin 20 to TB–1. All of the pins 6 of the sockets A through P are connected in common to pin 4 of TB–1. Pin 11 of TB–1 is connected to terminal 1 of CR–8 as a terminal, to terminal1 of CR–9 as a terminal (FIGURE 7D), through pin 21 of P–901 to the normally opened B contact of K–904 (FIGURE 8). Pin 16 is connected to terminal number 1 of CR–7 (FIGURE 7A) and through pin 26 of P–901 to the normally closed B contacts of K–901. Thus so long as K–901 remains de-energized ground is applied to pin 16 of TB–1 and no ground is applied to pin 11 of TB–1. Upon energization of relay K–904, ground is applied to pin 11 of TB–1 and removed from pin 16 of TB–1. Similarly pins 12, 13, 14 and 15 of TB–1 are connected to the normally opened B contacts of K–905, K–906, K–907 and K–908 respectively (FIGURE 8) and pins 17, 18, 19 and 20 of TB–1 are connected respectively to the normally closed B contacts of K–905, K–906, K–907 and K–908.

From the circuitry it is apparent that the selective energization of relays K–904 through K–908 (FIGURE 8) is effective through its B contacts to apply ground to at least one of the input terminals of each of the sockets A through P (FIGURE 13) other than the one plug if any having the letter designation corresponding to the letter of which the selective energization of the relays K–904 through K–908 is indicative. For example if the relays K–904 through K–908 are selectively energized to indicate the letter A, ground will be applied to at least one of the terminals of the sockets B through P of the circuit of FIGURE 13 but no ground will be applied to the input terminals for the socket A.

The pin 4 of TB–1 is connected to terminal E–1 (FIGURE 7C), to the normally opened contact K–217A (FIGURE 7D) and through pin 19 of P–201 (FIGURE 9) to the cathode of cathode follower tube V–210A. Thus each time cathode follower tube V–210A is caused to conduct, a positive going signal is applied to terminal six at each of the sockets A through P. For those of the sockets in which one of the terminals 1 through 5 thereof are grounded as has been explained hereinbefore by relays K–904 through K–908, no signal is transmitted to the output terminals 5 through 10. As to the one of the sockets as to which no ground is applied to terminals 1 through 5 thereof, an output signal may be transmitted to the terminals 5 through 10 if one of pluggable diode units CR–1 through CR–6 is plugged into that socket. Thus with the plugs in the sockets as shown in FIGURE 13, and assuming that no ground has been applied to the terminals 1 through 5 of socket A, a positive signal will be transmitted to pin 5 of TB–1, which it will be recalled is connected to the junction between resistors R–210 and R–212 (FIGURE 9).

Signals of this type transmitted to the circuit of FIGURE 9 have no effect unless preceded by two letters signals and then have effect only if appearing in the proper sequence. Thus with the units plugged as shown in FIGURE 13, or the circuit of FIGURE 9 to be operative, the "letters" signal must be received twice and then the signals A, B and C received in that order without the intervention of a space signal before the unit will be rendered operative to receive.

The "letters" diode circuit is shown in FIGURE 7A. Its terminals 1 through 5 are connected respectively to pins 26, 27, 28, 29 and 30 of P–901 (FIGURE 8) to the normally closed B contacts of relays K–904 through K–908. So long as any one of the relays K–904 through K–908 remains de-energized, ground will be applied to one of the terminals 1 to 5 of the diode socket for CR–7 (FIGURE 7A) to prevent the transmission of a signal through that unit. If all of the relays K–904 through K–908 are energized, no ground is applied to those terminals 1 through 5 and the signal from the cathode follower tube V–210A (FIGURE 9) will be transmitted to pin 7 of CR–7 socket, through the normally closed contacts K–216A, through pin 1 of P–201 (FIGURE 9) and through capacitor C–202 and C–203 in parallel to the grid circuits of tubes V–201 and V–202. In the normal condition in the absence of an input signal, none of the tubes V–201 through V–208 is conducting. V–201 is primed to conduct by the connections from its grid circuit through resistor R–201 to the high voltage B plus input through pin 31 of J–201. The application of the first letter signal through CR–7 (FIGURE 7A) and pin 1 of J–201 (FIGURE 9) will cause V–201 to fire. The firing of V–201 through the resistor network applies priming voltage to V–202 so that the next letters signal received will fire V–202. The firing of V–202 extinguishes thyratron V–201, and applies priming voltage to V–203 and V–205, the first tubes of the unit call counter and the broadcast call counters respectively. It should be noted that due to the common plate connections, only one of the thyratrons V–201 through V–206 can be rendered conductive at any one time. If with the circuit of FIGURE 13 plugged as shown, the letter A follows the second letters signal, a positive signal will be applied through pin 2 of J–201 to the junction between R–210 and R–212 which will cause V–203 to fire and extinguish V–202. If the letter following the two letters signals was a D rather than A, a signal would have been applied through pin 5 of J–201 to the junction between R–211 and R–213 to fire V–205, the initial counter of the broadcast call counter and to extinguish V–202.

Assuming again the call signal letters-letters A B C, the letter B will cause a signal to be applied through pin 4 of J–201 to the junction between R–218 and R–219 to fire V–204 and extinguish V–203. The final letter C will cause a signal to be applied through pin 3 of J–201 to the junction between resistors R–223 and R–225 to fire V–207. The anode of V–207 is connected through resistor R–239, through pin 10 of J–201 and P–201 and through the coil of relay K–216, to the armature B contact of relay K–217 as a terminal to terminal 4 of the power supply (FIGURE 12) supplying 210 volts. Thus the firing of thyratron V–207 is effective to energize the relay K–216.

The energization of relay K–216 applies ground through its normally open B contacts to relay K–217 to energize that relay and through pin X of J–2 and pin E of P–201 (FIGURE 11) to energize relay K–601. The energization of K–217 and K–601 is effective to set up circuitry to receive and print the incoming message.

If the three letters following the letters-letters signal had been D, E and F, this would have caused the application of voltage successively to the junction between R–211 and R–213 the input circuit of V–205, to the junction between R–229 and R–230 in the input circuit of V–206, and to the junction between R–234 and R–236 in the input circuit to V–208. The input signal to V–205 would have caused that tube to fire and prime V–206; the input signal to V–206 would have caused that tube to fire and prime V–208; and the final signal to V–208 would have caused that tube to fire and energize relay K–217 and K–601 as has been pointed out above.

As has been indicated generally hereinabove, if a space signal is received in between any of the signals of the call code, it indicates that the signals received are not a call designation of the unit and will reset the circuit of FIGURE 9. The space diode units CR–9 is shown in FIGURE 7C. Its terminals 1 through 5 are connected through pin 21 of P–901, pin 22, of P–901, pin 3 of CR–7 as a terminal and pin 28 of P–901, pin 24 of P–901, and pin 25 of P–901 to the normally open B contact of relay K–904, the normally open B contact of K–905, the normally closed B contact of K–906, and the normally open B contacts of K–907 and K–908 respectively. Thus when the space signal is received energizing relay K–906 and allowing relays K–904, K–905, K–907 and K–908 to remain de-energized, the cathode follower signal applied to terminal E–1 (FIGURE 7C) is effective through terminal 7 of CR–9 and pin 30 of P–201 (FIGURE 9) and capacitor C–129 to cause space counter reset tube V–212 to conduct thereby applying a negative signal through capacitor C–220 to the anode circuits of each of the counter tubes V–201 through V–206 to turn off any tube of that counter chain which has been fired.

The end of message signal consists of two successive line feed signals. The line feed diode unit is CR–8. Its terminals 1, 2, 3, 4 and 5 are connected respectively to pin 1 of CR–9 as a terminal and through pin 21 of P–901, to pin 2 of CR–7 as a terminal through pin 23 of P–901, to pin 4 of CR–9 as a terminal and through pin 24 of P–901, and to pin 5 of CR–9 as a terminal and through pin 24 of P–901, and to pin 5 of CR–9 as a terminal and through pin 25 of P–901 to the normally open B contacts of K–904, K–906, K–907 and K–908 and the normally closed B contact of K–905. Thus with K–905 energized and relays K–904 and K–906 to K–908 de-energized the line feed signal has been received and the signal from cathode follower tube V–210A (FIGURE 9) appearing at terminal E–1 (FIGURE 7C) is transmitted to the normally open contact K–216A. Since relay K–216 was energized at the completion of the proper call designation signal, this signal is transmitted through the normally open contacts K–216A through pin 1 of J–201 and through capacitors C–202 and C–203 in parallel to the grid circuits of V–201 and V–202. In the same manner as explained before in reference to the two letters signals indicating the start of a call signal, the two line feed signals fire successively V–201 and V–202. The firing of thyratron V–202 applies through R–253 a signal through pin 14 of J–201 the normally open C contacts of relay K–217 (which is energized during received operation), through pin 13 of P–201 (FIGURE 9) and capacitor C–216 to the grid of thirty-second reset tube V–210B. The anode of this tube V–210B is connected in parallel with the anodes of V–207 and V–208. Conduction of V–210B is effective to lower the anode voltage upon thyratrons V–207 and V–208 sufficiently to turn off either of those tubes which may be conducting. Extinguishing V–207 or V–208 is effective to de-energize relay K–216 (FIGURE 7C) and thereby de-energize relays K–217 (FIGURE 7D) and relay K–601 (FIGURE 11) and restore the receiver to its normal condition.

During "transmit store," an end of message signal is effective to prime through resistor R–253 (FIGURE 9), the end of message detector tube V–211 so that a pulse received when signal is transmitted through pin 8 of J–301, P–301 from the cathode of V–308, to the normally closed contact K–112C as a terminal, through pin 8 of J–201, P–201 and capacitor C–218 thyratron V–211 will be fired. Relay K–215 is connected in the plate circuit of end of message detector tube V–211 through pin 11 of J–201 and P–201. Relay K–215 is connected through pin V of J–1 (FIGURE 7A) and pin X of P–601 (FIGURE 11) to section 4A of selector switch S–601 in its "transmit store" position which is effective to apply 150 volts through relay K–215 to the anode of V–211 (FIGURE 9). Thus upon transmission of an end of message signal during "transmit store," K–215 is energized. This restores the unit to its "receive" condition.

*Keyboard*

The keyboard is essentially a standard form of teletypewriter keyboard but incorporates some special mechanisms as will be illustrated and described with reference to FIGURES 14 through 19. With respect to FIGURES 14 and 15, the keyboard 50 has a base plate 101 and two side plates 102 and 103 secured thereto adjacent each end. Each side plate 102 and 103 has six vertically disposed parallel slots 104 that provide guideways for five notched code bars 106, 107, 108, 109 and 110 and one universal code bar 111 disposed for sliding movement to right and left. Left and right code bar support brackets 112 and 113 respectively, are secured to base plate 101 below code bars 106 through 111. The left hand support bracket 112 carries a shaft with spacers 114 and rollers, not shown, which coact with the lower edge of each code bar and provide a roller track for longitudinal shifting. The right hand support bracket 113 carries a pivot shaft 115 which journals five code bar contact bell cranks 116, and one code bar spring lever 117 which are maintained in spaced relation by rollers 118 which support the right end of the code bars. Bell cranks 116 and 117 have an upwardly directed forked portion disposed along the side of a respective code bar which fits around a code bar pivot post 120 secured in the side of each code bar.

Each of the five contact bell cranks 116 includes a horizontal arm having its end 121 formed as a contact actuator. The spring bell crank 117 is disposed adjacent the universal bar 111 and pivotally engages its pivot post 120 in a manner similar to that described for the contact bell crank 116. However, the spring lever horizontal arm extends toward the left hand side of the printer and cooperates with a spring 122 connected to an anchor fixed to the base plate 101, thereby biasing the universal bar 111 to its left hand position.

In a conventional manner the upper edge of each code bar is serrated with a plurality of inclined notches arranged with a right or left incline whereby depression of a key 124 and its associated key bar 125 will shift a code bar in a predetermined manner to the right or left. Through cooperation of the five code bars 106–110 with contact levers 116, any code bar moving to the right will pivot its contact lever 116 clockwise (FIGURE 14) to close individual sets of contacts associated with each contact lever in a manner to be described. Movement of any of the code bars 106–110 to the left will pivot the respective contact levers 116 counterclockwise, which movement positively assures that the associated individual sets of contacts are open. Closed contacts indicate a "mark" condition while open contacts indicate a "space" condition. Thus in accordance with a right or left hand shift of the five individual code bars 106–110, a representation of a five unit combination Baudot or similar code signals will be set up in the sets of contacts. The sixth code bar 111, a universal bar, has all of the notches in its upper surface inclined in a direction to shift the universal bar toward the right every time any key 124 is depressed, against the bias of spring 122. The universal bar is the only one of the code bars that is positively spring loaded to an unoperated position. The right hand end of every code bar has a square notch 126 provided in its upper edge for cooperation with the upper edge of the vertical slots in the right hand side plate thereby providing a limit stop for longitudinal shift of all code bars.

Of the lower edge of code bars 106–111, a single centrally located inclined notch 127 is present. These notches 127 are used in conjunction with the spacing mechanism (later described) and their inclinations are so arranged to determine "spacing" position of the code bars 106–110 and to shift the universal bar 111 to the right. The left hand lower edge of code bars 106–110 includes two notches 128 and 129 which furnish a means for locking the bars during transmission of a signal. As is conventional in this form of code bar keyboard, when the five code bars are shifted by depression of one key no other key can be depressed. Therefore if the code bars are locked after a key is depressed no other key can be depressed until the code bars are unlocked. This will be discussed further hereinafter with relation to the locking wedge assembly. Each key lever is associated with a key lever return spring 130 which returns the key levers to their initial position out of contact with the code bars when the operator releases the key.

The universal bar 111 has no notches, such as the locking notches 128 and 129 in the code bars. However, adjacent the left hand end on the rear side of universal bar 111 a relatively heavy latch block 132 (FIGURE 16) is riveted and is positioned with its lower surface parallel with and lower than the lower edge of the universal bar. Immediately to the left of latch block 132 a stud 133 is fixed through the universal bar and pivotally carries a repeat blocking latch lever 134. Latch lever 134 is an L-shaped lever having a depending arm 135 disposed adjacent the left edge of latch block 132. When assembled the tip 136 of depending arm 135 extends a short distance below the lower edge of latch block 132 as is illustrated in FIGURES 16 through 18. The upper arm 137 of the latch lever 134 extends horizontally over the upper surface of latch block 132 and is biased counterclockwise (FIGURES 16 through 18), so its depending arm abuts the left edge of latch block 132, by a spring 138 disposed in a socket 139 formed in the upper edge of latch block 132.

Pivotally mounted on the left hand support bracket 112, is a code bar locking wedge assembly 141 including a laterally disposed U-shaped arm 142 and a depending set of arms 143 (FIGURE 1). Secured by rivets on the bight of the U-shaped arm 142 is a substantially vertically disposed locking wedge blade 144. The lower edge of wedge blade 144 includes a depending lug 145 that serves as a retainer for a locking wedge spring 146 whose other end is disposed on a spring post 147 secured to base plate 101. Spring 146 biases the locking wedge assembly clockwise, as viewed in FIGURE 19, so the wedge blade 144 is biased toward the surfaces of the code bars 106–111. As shown in FIGURE 19 the left top edge 148 of the wedge blade 144 is recessed a slight amount from the top central edge 149 of the blade. The recessed edge 148 abuts the lower edge of latching block 132 while the central wedge blade edge 149 is disposed closely adjacent the lower edges of code bars 106–110. When a key 124 is depressed and the code bars are shifted to left or right in a predetermined combination one of the notches 128 or 129 in code bars 106–110 will be disposed immediately above the central portion 149 of the wedge blade 144. However the locking wedge assembly 141 will not shift into locking position under bias of spring 146 until the universal bar is completely shifted to the right (FIGURE 17) removing the latch block 132 from above the recessed edge 148 of the wedge blade 144. This mechanical relationship between the movement of the code bars 106–110 and the movement of the universal bar 111 a sufficient amount to permit locking wedge assembly actuation is predetermined to permit the code bars 106–110 to be fully positioned just prior to the final movement of the universal bar which permits the locking wedge to pivot under bias of spring 146 and place the central edge 149 of the wedge blade 144 into the appropriate notches 128 or 129 of the five code bars 106–110. This movement of the locking wedge assembly will lock and prevent any further shift of all six code bars 106–111.

Shown in FIGURE 14, a mounting bracket 151, secured to the base plate 101, carries a double solenoid unit E–701. The depending arms 143 of locking wedge assembly 141 have secured thereto a magnet armature 152 which is disposed immediately in front of the pole faces of solenoid unit E–701, a proper flux gap being maintained between armature 102 and the solenoid pole faces. As will be apparent, energization of the solenoid unit E—701 will move the locking wedge assembly 141 against the bias of spring 146, removing the wedge blade 144 from the code bar notches 128 and 129 and from behind the latch block 132 on universal bar 111 and permitting the universal bar to be biased by spring 122 to its left hand position. The code bars 106–110 will shift slightly, if they had been key shifted to the right, as a result of the inherent resilience of the contacts, to be described.

When the code bars are initially shifted by depression of a key 124, the universal bar 111, in moving to its right hand position, will cause the side edge of depending arm 135 of the repeat blocking latch lever 134 to engage the side of the wedge blade 144. As illustrated in FIGURE 17, full shifting movement of universal bar 111 by depression of a key 124, will pivot the latch lever 134 against the bias of spring 138. If the key 124 is held in depressed position, the universal bar cannot return to its left hand position when energization of the solenoid E–701 causes a releasing actuation of the locking wedge assembly 141. However the solenoid actuation will remove wedge blade 144 from its latching position in the code bar notches 128 and 129. This simultaneously removes the recessed edge 148 from behind latch block 132 to a position below the tip end 136 of the blocking latch lever's depending arm 135, permitting the latch lever 134 to return its depending arm 135 against the edge of latch block 132 under bias of spring 138 (FIGURE 18). Such action will place the tip end 136 of the latch lever depending arm 135 immediately above the recessed wedge blade edge 148. Therefore, when the solenoid unit E–701 is de-energized to permit the locking wedge assembly to be pivoted under bias of spring 146, the locking wedge assembly is prevented from moving back into a code bar locking position by engagement of the recessed wedge blade edge 148 with the tip end 136 of the depending blolcking latch lever arm 135. As the upward movement of wedge blade 144 is utilized, in a manner to be described, to close a set of switch contacts which, through the communication control circuit previously described, starts transmission of the signal combination set up by the code bars 106 through 110, it will be seen that the repeat blocking structure thus described can prevent repeat transmission of a character whose key is held depressed, because the locking wedge assembly is prevented from moving up to close the start operation contacts to initiate the transmitting operation.

A space bar 153, FIGURES 14 and 15, is secured to two vertical guides 154 disposed in holes formed in the forward edge of the front keyboard guide strip 155 and also passing through holes provided in a support bracket 156. Springs 157 disposed between the support bracket 156 and washers clipped to guides 154 bias the space bar 153 to its upward inoperative position. The lower end of guides 154 carry a transverse rod 159 having its right hand end extended to provide a contact actuator, as will be described. Behind the space bar assembly and secured to base plate 101 are two angle brackets 160 and 161 providing a support for a vertically arranged code bar guide comb 162 and vertically guiding a space keybar 163. Space keybar 163 has a lateral top portion 164 disposed beneath all six code bars 106–111 for cooperation with the aforementioned central lower edge notches 127. Adjacent its lower end, the space keybar 163 is notched at one side to form a recess 165 for receiving one end of a spacing lever 166 that is pivotally mounted between the two angle brackets 160 and 161 with its opposite end disposed under the spacing bar rod 159. A spring 167 is fastened adjacent the forward end of spacing lever 166 and biases the lever 166 into contact with the lower side of the spacing bar rod 159. Depression of space bar 153 will, through the rod 159, cause the spacing lever 166 to pivot against the bias of spring 167 and shift the space keybar 163 upwardly into contact with the inclined sides of the lower code bar notches 127, positioning all code bars in the combination representing a space signal. Release of the space bar permits spring 167 to return the lever 166 to its inoperative position, which lowers the space keybar 163 away from cooperation with the code bar notches 127, permitting the universal bar 111 to return to its left hand position.

Fastened to base plate 101 below the right hand ends of code bars 106–110 is a switch block assembly 169 containing five sets of contact switches normally self biased to the open position. The upper leaves of the contact switches project under associated actuator ends 121 of the code bar contact levers 116 and each upper leaf includes a wear pad 171 which is engaged by the actuator end 121 of the contact levers. Code bar 110 is associated with switch S–702, code bar 109 is associated with switch S–703, code bar 108 is associated with switches S–704, code bar 107 is associated with switch S–705 and code bar 106 is associated with switch S–706. Movement of any of code bars 106–110 to the right will pivot the associated contact actuating lever 116 clockwise (FIGURE 14), moving its actuator end 121 into engagement with the associated switch leaf wear pad 171 to move the upper switch leaf and its contact into engagement with the lower leaf and its contact thereby closing the associated switch. The inherent resiliency of the upper switch contact leaf is sufficient to open the contact when a depressed key is released and the code bars are unlocked to enable a shifting movement of the code bar to the left. Deliberate shift of a code bar to the left by depression of a key will positively remove the actuator end 121 of the contact actuating lever 116 from its associated contact wear pad 171 to enable the switch to be resiliently opened when such a switch condition desired by the preset code bar combination. The upper leaves of all switches S–702 through S–706 are connected to a common line while the lower leaves are connected to individual lines leading into a keyboard socket J–701 which is adapted to be connected with the control circuit.

Seen at the left hand side of the keyboard unit 50 (FIGURE 14) is a universal bar switch S–701, mounted on a bracket 172 which is secured to the base plate 101. The universal switch S–701 includes two contacts normally in open condition. One contact includes a wear pad 173 disposed above a lateral extension 174 of the locking wedge blade 144. Whenever the locking wedge assembly moves to a locking position in code bar notches 128 and 129, such upward movement will cause the wedge blade lateral extension 174 to abut the universal switch wear pad 173 and cause the switch contacts to close (FIGURE 17). As previously mentioned the repeat blocking mechanism will prevent upward movement of the locking wedge assembly (FIGURE 18) if a key is held depressed after a signal has been transmitted and the solenoid unit E–701 has been energized and de-energized and the universal contact S–701 is prevented from being moved to a closed position, thereby preventing initiation of a transmitting operation. Lead lines from the two contacts of switch S–701 connect into the socket J–701.

To permit repeated transmission of spacing signals by continued depression of space bar 153 a space bar switch S–707 is mounted on a bracket 176 adjacent the extended end on the space bar rod 159. Switch S–707 has three sets of contacts one of which sets is normally closed and the other two are open. These sets of switches are described in the control section of the specification. The switch S–701 has an operating arm wear pad 177 disposed immediately below the actuator end of rod 159 and when the space bar is depressed the actuator end of rod 159 contacts wear pad 177 and opens the normally closed contacts and closes the normally open contacts of switch S–707. Switch S–707 is wired in the control circuit to initiate the transmitting mechanism and will repeatedly send spacing signals, as set up by the code bar switches S–702 through S–706, until the space bar 153 is released to enable the sets of contacts of switch S–707 to return to their normal positions. The leads from the various contacts of switch S–707 are also connected into the socket J–701.

Mounted at each end of the front keyboard guide strip 155 are two blocks 179 and 180 of Lucite or similar material, which have a blind hole 182 drilled in their lower surface. Both of the Lucite blocks 179 and 180 are covered with an opaque surface material excepting for a small circular portion 181 aligned over the blind bore 182. Lamp sockets 183 are fastened to the keyboard guide strip immediately below the blind bore in blocks 179 and 180. The left hand block 179 surrounds a lamp I–701 which is disposed in its respective socket 183 which a similar lamp I–702 is enclosed in the right hand block 180 and disposed in its respective socket 183. The lamp I–801 in the left hand socket is used to visually signal the keyboard operator that the end position of the magnetic tape storage unit is approaching, a suitable legend being lettered on the opaque surface of the Lucite block 179. In a similar manner the lamp I–702 signals the keyboard operator that he is aproaching the end of a line on the page printer and a suitable legend is so inscribed on the opaque surface of the Lucite block 180. By using the Lucite blocks with the blind bore 182, a diffused light is seen through the open circles 181 on the upper surface of the blocks. This is a desired form of lighting in aircraft where direct light rays are undesirable.

The circuit lines for lamps I–701 and I–702 are connected to the sockets J–701 for connection into the control circuit. On either end of the keyboard unit mounted on the left and right side plates 102 and 103 are keyboard lighting assemblies I–703, which are connected to a lead connecting to the socket J–701.

Suitable brackets 186 and studs 187 are provided on the keyboard support structure to provide attachment means for an enclosing cover indicated by phantom lines 188.

The keyboard thus described is an integral unitary device having horizontally shiftable code bars each associated with an individual contact switch to preset a simultaneous mark and space signal representative combination according to the Baudot code. The mechanical shifting of code bars 106–111 is accomplished upon depression of any of twenty-six alphabetical character keys, the space bar or a line return, line feed or blank key that can be used for a call signal if desired by adding a special switch (not shown). The simultaneous contact manifestation of the code signal will be set up prior to actuation of a universal bar switch to initiate the start of transmitting operation. This slight delay is built in to afford the control system an opportunity to assimilate the five signals set up by code bars 106–110 before starting a transmitting operation cycle. All code bars are maintained in a locked combination position according to the depressed key until completion of the transmitting operation at which time a signal is transmitted by the control system to the unlocking solenoid unit E–701 which shifts the locking wedge assembly 141 out of locking position and permits the next key to be depressed to set up a new group of signal manifestations on the code bar contacts. To permit repeat spacing operations, a switch S–707 is provided under the space bar mechanism and is actuated after the code bar contacts have been made thereby enabling the slight required delay for transmitting operation. As switch S–707 controls a circuit in the control system by-passing switch S–701, the repeat blocking control, through the locking wedge assembly 141 and switch S–701, is rendered ineffective and the space signal will be repeated as long as the space bar is depressed. Visual indications are provided for the keyboard operator to determine the amount of storage space left in the magnetic tape recorder and to also signal the approach of the end of a line on the page printer. Normally the end of line light should come on when there is room on the page for about six more characters, i.e., approximately the sixty-sixth character space position on the page.

*Printer*

With reference to FIGURES 20 and 21 the printer unit 52 has a support frame comprised of a base plate 201 upon which, in vertical parallel relation, are rigidly secured a left hand bearing support plate 203, a right hand bearing support plate 204 and a cable drum bearing support plate 205. Intermediate the left hand support plate 203 and the cable drum support plate 205 and adjacent the rear of base plate 201 are a motor support plate 206, a motor mounting bracket 207, a left hand function shaft support plate 208 and a right hand function shaft support plate 209, all of which are vertically disposed in parallel relationship with support plates 203, 204 and 205. All of the support plates are secured to base plate 201 by screws 202 and tight fit locating pins (not shown).

As seen from the front of the printer 52 (FIGURE 21), a type wheel positioning and support shaft 212 passes through and is journalled on bearings inset in the left and right hand support plates 203 and 204. Two collars 213 and associated washers 214 are secured on the right hand end portion of type wheel shaft 212, one collar and washer on either side of the right hand support plate 204, by set screws to maintain the axial position of type wheel shaft 212. Although a single set screw may be used, two angularly offset screws are preferred for all units described herein as being secured by set screws. The intermediate portion of shaft 212 has a uniform square shaped cross section whereas the end portions are cylindrical. In lieu of a square cross section, splines or keyways may be used. Disposed on the right hand cylindrical portion of shaft 212 between the right hand support plate and the intermediate square portion of the shaft is a blocking cam assembly 215 which consists of a hub unit 216 secured to rotate with the type wheel shaft 212 by set screws and carrying four cams 218, 219, 220 and 221. As seen in FIGURE 24 the hub portion 216 of the cam assembly 215 has reduced diameter end portions and two external axial slots 223 extending the axial length of the hub. Three of the cam plates 218, 219 and 221 are centrally apertured and have radially inwardly projecting lugs 224, enabling the cam plates to be positioned on the end portions of hub 216 with lugs 224 disposed in the axial slots 223. One cam plate 218 is placed on the right hand side of the hub 216 and two cam plates 219 and 221 separated by a spacer member 225 made of bearing material are placed on the other side portion of the hub 216. Cam plate 220 is rotatably disposed on the spacer bearing member 225 between cam plates 219 and 221. After assembly of the cam plates on hub 216, the end portions of the hub are spun tight against the cam plates 218 and 221 to rigidly maintain all plates, spacer and hub as a unit assembly. The shapes, specific relation of blocking portions and specific functioning of the various cam plates will be later described, the cam plates being a print hammer blocking cam 218, a line return cam 219, a line feed-line return cam 220 and a line feed cam 221. Cam plate 221 may or may not be used depending on the type of line feed system.

Immediately adjacent the sensing cam assembly 215 and also rigidly affixed to the right hand portion of the type wheel shaft 212 is the type wheel shaft spur gear 226, consisting of a hub member 227 with a noiseless (laminated plastic) gear wheel 228 rigidly secured thereto by rivets. The gear wheel 228, in addition to the rivets, is accurately aligned with its hub 227 by a pinned connection.

An axially slidable type wheel assembly 230 is mounted on the intermediate square portion of and rotatable with type wheel shaft 212. The type wheel assembly consists of a flanged hub 231 having one side formed with an annular reduced diameter shoulder 232. The opposite side of the flanged hub 231 includes a shallow annular abutment 234 and carries a bearing unit 235 disposed with its inner race abutting the abutment 234. The edge of the hub member 231 is spun over against the inner race of bearing unit 235 to secure the unit on the hub. A type wheel 237 with twenty-six alphabetical characters, plus six blank spaces, formed on its periphery at equiangularly spaced intervals, has an inner radial flange 238 with a relatively large diameter central aperture 239 to fit over the hub 231 with radial flange 238 against the hub flange and the aperture 239 disposed on the annular hub shoulder 232. Type wheel 237 is retained and clamped on the hub 231 by a retaining ring 240, apertured to fit closely over the central portion to the hub and overlap the inner flange 238 of type wheel 237, which is secured to the hub flange by screws 241. A split clamp 243 consisting of two identical parts 244 is clamped around the periphery of bearing 235 by upper and lower bolts and nuts. The lower legs 245 of each clamp part 244, extended and provided with facing lateral grooves 246, cooperate to securely clamp a translating cable 250 (to be later described) in grooves 246. By loosening the lower bolts on the clamp, typewheel assembly 230 may be adjusted relative to the cable 250 and along the shaft 212.

Positioned on the left hand cylindrical portion of the type wheel shaft 212, between the intermediate square portion and the left hand support plate 203, is a stop wheel assembly 252 consisting of two sixteen tooth ratchet wheels with oppositely disposed teeth, coaxially secured in side by side relation to rotate as a unit. The stop wheel assembly 252 may be an integral unitary wheel or, as is preferable for ease of machining it can be made of two parts. One part includes a hub 253 with an integral sixteen tooth stop wheel 254, the right hand portion of the hub being formed as a collar with set screws for securing the stop wheel assembly 252 to the type wheel shaft 212. A second toothed wheel 255 with the teeth faced in the opposite direction to those of stop wheel 254, is disposed over the left hand portion of hub 253 and rigidly secured to ratchet wheel 254 by rivets 256.

With respect to FIGURES 21, 23 and 33, two double edge pawls 258 and 258 are arranged on the inside of left hand support plate 203 and angularly spaced with respect to the stop wheel assembly 252. The uppermost pawl 258 is designated the spacing pawl while the lowermost pawl 259 is designated the marking pawl. Pawl pivot posts 260, provided for pawls 258 and 259, pass through the support plate 203 and are rigidly secured thereto by nuts 261. Each pawl 258 and 259 has a stopping edge, 262 and 263, respectively, for engaging the teeth of stop wheel 254 in a manner to prevent wheel rotation. The second edge, 264 and 265 of respective pawls 258 and 259, are disposed in camming relation with the teeth of camming wheel 255. Both pawls 258 and 259 are biased in a clockwise direction (FIGURES 23 and 33) about their pivot pins 260 by springs 266 anchored to spring posts 267 fastened to support plate 203. Spring biased in the clockwise direction, the pawl camming edges 264 and 265 ride against the teeth of the camming wheel 255. Inasmuch as rotation of the stop wheel shaft, as seen in FIGURE 23, is counterclockwise, the teeth of camming wheel 255 will pivot the two pawls 258 and 259, against spring bias. When the camming edges ride up on the camming wheel teeth, the pawl stop edges 262 and 263 are positioned immediately in front of a tooth on the stop wheel 254. Pawl 259 is in such a position in FIGURE 33. When the camming edge drops from a tooth on the camming wheel 255, the pawl spring pivots the pawl to remove its stop edge from in front of a tooth on the stop wheel 254. The two pawls 258 and 259 are so angularly positioned relative to the stop wheel assembly that stopping engagement of edge 262 of pawl 258 against the front side of a ratchet tooth on wheel 254 will stop rotation of the type wheel shaft 212 at a position where the edge 263 of pawl 259 is half way between two adjacent teeth on the ratchet wheel 254. This relationship may be seen in FIGURE 33. Thus, using two pawls, and a sixteen tooth stop wheel 254, thirty-two distinct stop positions of the type wheel shaft 212 can be obtained. The importance of the camming position of the stop pawls will become apparent hereinafter.

As clearly shown in FIGURE 21 both of pawls 258 and 259 are similarly shaped in the form of a U with the open end of the U adjacent the pawl lever which contains edge 264 or 265. Rigidly secured, as by brazing or spot welding, across this end of each pawl 258 and 259 is a solenoid armature plate 269 and 270 respectively.

Solenoid brackets 272 and 273 are fastened by screws to the left hand support plate 203 in close proximity to respective armature plates 269 and 270. A space solenoid E–801 is secured in bracket 272 with its core aligned with, in the path of movement of and slightly spaced from the armature plate 269 and, when energized, will hold pawl 258 in its counterclockwise position with its stop edge 262 in position against ratchet wheel 254 to engage the next approaching tooth and stop rotation of the type wheel shaft 212. A mark solenoid E–802 is secured in bracket 273 in the same relationship to armature plate 270 and, when energized, will hold pawl 259 in its counterclockwise position with edge 263 against the periphery of stop wheel 254, to engage the next approaching tooth and stop the type wheel shaft 212 at a position intermediate the positions that pawl 258 would stop the rotation of the type wheel shaft. The pawls 258 and 259 are pivoted to a stop position for every one of the sixteen teeth on the stop wheel 254 by the camming wheel 255. This action places the respective armature plates 269 and 270 closely adjacent the respective solenoids E–801 and E–802. If at any time either solenoid is energized the armature and pawl is positively placed close to the solenoid and the full solenoid strength is used to hold the pawl against its spring bias. In other words the solenoids do not have to exert a high magnetic flux over a large air gap to pivot the pawls, they merely hold the pawls after they are positively pivoted to a stop position.

As will be explained in the section of this specification devoted to operation, whenever a character is selected to be printed, either the mark or the space solenoid will be actuated, and the angular increment of type wheel rotation where solenoid actuation occurs will be determined by a preselected signal controlled by commutators mounted at either end of the printer unit, as now described.

A space commutator S–801 is fastened to the left hand side of the printer unit and a mark commutator S–802 fastened to the right hand side of the printer unit. Each commutator consists of a dielectric flat plate 282 centrally apertured at 283 and with corner mounting holes 284, as seen in FIGURES 25 and 26. The dielectric plates 282 are smiliar for both the mark and space commutator. As shown in FIGURES 20, 21 and 24 left hand commutator plate 282 is disposed with its central aperture 283 over the left end of type wheel shaft 212 and is fastened at each corner to the left hand support plate 203 by screws 285 passing through spacers 286.

At the right hand side of the printer unit 52, a commutator plate mounting bracket 287 is fastened by screws to the top edge of the right hand support plate 204. The right hand commutator plate 282 is fastened through holes 284 at its upper corners to the bracket 287 by bolts and nuts 288, being spaced from the bracket by spacers 289. The lower corners are fastened to the right hand support plate 204 in a manner similar to that described for the left hand commutator plate 282.

With reference again to FIGURES 25 and 26, each commutator plate 282 is preferably made of laminated melamine fiber glass with a melamine paper surface. The commutator side of plate 282 (FIGURE 25) is provided with a flush plated circuit. A suitable plated circuit can have a base consisting of 0.0015 inch nickel surfaced with 0.000020 to 0.000040 inch rhodium with the surface of plate and circuit smoothly finished by buffing. The rear surface of plates 282 are provided with plated segment connecting circuits which may be either flush or raised as desired. The circuits on the rear side include leads to terminals A, B, C, D, E, F, G and H for the space commutator plate and to terminals A′, B′, C′, D′, E′, F′, G′ and H′ for the mark commutator plate. The circuits on front and rear of each plate are interconnected through the plate by rivets 290. The plated commutator circuits are arranged in two concentric discontinuous annular rings, the inner ring being separated into four 90° segments 292, 293, 294 and 295 which, through the rear face printed circuits, are respectively connected to terminals C, D, F and G. The outer ring of commutator segments shown in FIGURE 25 consists of twelve segments, so disposed on the face of the plate, and interconnected by rivets and the connecting circuits on front and back, as to comprise four circuits 296, 297, 298 and 299 which, through their interconnections, correspond respectively to terminals H, A, B and E. Each of printed circuits 296 and 299 consists of two large surfaces diametrally disposed one on either side of the commutator plate aperture whereby at least a portion of each circuit 296 and 299 angularly overlaps, and is radially disposed relative to a portion of each of the four inner segment circuits 292, 293, 294 and 295. In a similar manner it will be noted that each of circuits 297 and 298 have four segments, one segment of each circuit being in radial alignment and spaced adjacent each of a respective one of the inner segment circuits 292, 293, 294 and 295. The arrangement of the two annular series of circuit segments as seen in FIGURE 25 is such that a dual interconnected commutator wiper brush, rotated 360° so as to contact both the inner and outer annular rows of segments, will successively engage the inner segments 192 through 195 and during each 90° of movement when one arm of the brush is contacting one of the inner segments, the second arm of the brush will contact each of the four outer segment circuits. Alternate 90° of travel of the commutator brush repeat the same process in reverse order, thereby providing sixteen separate combinations of bridged circuits for a set of eight commutator terminals.

Each end of the type wheel shaft 212 projects a short distance beyond the commutator plates 282. Fastened to the left hand end of type wheel shaft 212 is left hand rotor assembly 302 and fastened to the right hand end of shaft 212 is the right hand rotor assembly 303. Rotor assemblies 302 and 303 are complementarily identical hence the component elements of both rotor assemblies will be designated by similar reference characters. Each rotor consists of a hub 304 fitted on the type wheel shaft and keyed thereto by set screws, a rotor insulator 305 fixed to rotate with hub 304 by a strong, temperature and moisture resistant adhesive, and a rotor brush arm 306 preferably made of spring tempered Phosphor bronze. Rotor am 306 has two integral radially spaced trailing brush arms 307 and 308. The brush arms 307 and 308 are slightly bent away from the insulator 305 and their tip ends 309 and 310, respectively, have a further bend in the same direction and are serrated to form a multiplicity of small spring fingers.

With respect to FIGURES 20 and 24 it will be seen that a rotor assembly 302 in operation will rotate with the type wheel shaft and the brush fingers 309 will be spring pressed against the inner ring of the circuit segments on the commutator plate whereas the outer brush fingers 310 will be spring pressed to follow a path around the outer ring of circuit segments on its commutator plate. Thus, as seen in FIGURE 25, there will be sixteen angular positions of the rotor assembly relative to the commutator plate 282 wherein the integral rotor arm with the two brush fingers 309 and 310 will provide a bridging connection between sixteen different combinations of inner and outer commutator segments taken two at a time. Through the control circuit, as will be described, the left hand space commutator S–801 will control the angular position at which the space solenoid E–801 holds the spacing pawl 258 to engage the toothed stop wheel 254 and stop rotation of the type wheel shaft 212. The right hand mark commutator S–802, interrelated through the control circuit with the mark solenoid E–802 holds the marking pawl 259 to engage the stop wheel 254 and stop the type wheel shaft 212 at postions intermediate the stop positions associated with the spacing pawl 258. The connection of collars, sensing cam assembly, spur gear, and stop wheel assembly to the square shaft 212 is preferably made with two angularly off-set clamping screws against flat surfaces formed in the cylindrical portions of the type wheel shaft 212 to assure positive and accurate radial positioning of such units relative to the square portion of the shaft.

*The print hammer assembly* includes a shaft 314 parallel with the typewheel shaft 212 and journalled at its ends in bearings positioned in the left hand support plate 203 and the right hand support plate 204 near their lower forward corners. The intermediate portion of print hammer shaft 314 is of square shaped cross section with the corners of the square section being chamferred. A spring retaining ring is fixed to one end of shaft 314 on the outer side of support plate 204 and, together with a collar 315 disposed on the inner side of the support plate 204 and fixed to shaft 314 by set screws, maintains an accurate axial position of the print hammer shaft.

A print hammer lever 316, including an upwardly extending lever arm 317 and a lower arm 318, has its mid portion bent in a U-shape to provide two arms apertured with square holes for slidable disposition on the square portion of print hammer shaft 314. The lower arm 318 is integral with the bight or mid portion of the U-shaped part of lever 316 and has an aligned semi-perforation, that provides a protruding boss 319, and a hole 320. A small plate member 321 with a tapped opening aligned with the hole 320 in lower arm 318 and with a grooved upper edge cooperating with the boss 319, is bolted and aligned relative to the lower lever arm 318. The hammer lever 316 will be positioned on the hammer shaft 314 so the upper arm is directly aligned with the characters on the type wheel periphery and in this position the lower arm 318 and plate 321 clamp on a portion of the cable 250 remote from that portion of the cable 250 clamped by the type wheel assembly clamp 243. The upper end of the print hammer upper lever arm 317 is apertured and fits in a slot 323 formed in the body of a print hammer head 324 made of softer material than the type characters. The hammer head 324 is bolted to the end of the upper lever arm 317 with its striking face substantially parallel to a radial plane through the axis of shaft 314 and the hammer head face. Actually the hammer face 225 is so disposed as to strike squarely against the face of a raised character on the type wheel periphery when the hammer shaft 314 is pivoted to move the hammer head 324 toward the type wheel 237.

On the right hand cylindrical end portion of the print hammer shaft 314, between the squared intermediate portion and the right hand support plate 204, a print hammer blocking sensing lever 327 is tightly clamped by its split, U-shaped mid section 328 with a clamping screw 329. One side of the U-shaped central section 328 includes an upwardly extended arm 330 and a rearward, downwardly curved arm 331, the upper arm being bent laterally at its tip and including a rearwardly extended finger 332 whose path of movement lies directly in the path of rotation of the print hammer blocking cam 218 in the blocking cam assembly 215. The lower end of the rear curved finger 331 includes a laterally projecting stud 333 disposed in the forked end 334 of a printing lever 335. The forked end 334 is integral with the forwardly directed lever arm 336 of the printing lever 335 which is bent into a U-shape with arms disposed on either side of the cable drum bearing support plate 205 and journalled on a pivot pin 337 passing through the drum support plate 205. The forward arm 336 of lever 335 is disposed on one side of the U-shaped center portion while a rearwardly directed arm 338 is on the opposite side of the U-shaped mid portion and extends rearwardly adjacent the right hand side of the cable support plate 205 terminating in a rounded upwardly directed print cam follower 339. Cam follower 339 abuts the periphery of the print cam in the rotating function system to be later described. The forward lever arm 336 is biased by a spring 340 anchored to a spring post 341 fastened in the base plate 201 so cam follower 339 is always biased to ride against its print cam permitting the printing cam lever 335 to be spring biased counterclockwise, the cooperation of forked end 334 with stud 333 will, through blocking sensing lever 327 cause rotation of the print hammer shaft 314 and subsequent impact of the hammer face 325 against the page material in front of the type wheel, unless blocked by cooperation of blocking sensing lever 327 with the print blocking cam 218.

With respect to FIGURE 37 it will be seen that the print hammer blocking cam 218 includes six radially projected fingers 344, which are prearranged angularly to coincide with the blank spaces on the type wheel 237. When the type wheel is stopped so a blank space is aligned with hammer face 325, one of the lugs 344 on the print hammer blocking cam 218 will lie in the path of the blocking sensing lever rear finger 332 (FIGURE 28) and the cam lug 344 will limit the pivotal movement of the print hammer shaft 314 under the bias of spring 340 so the hammer head cannot move a sufficient distance for the hammer face 325 to strike the page material in front of the type wheel.

*Function shaft system.*—With respect particularly to FIGURE 28 and generally to FIGURES 20–23, the power for operating the functions of printing, type wheel positioning and spacing, line feed and type wheel return (hereinafter termed line return) is derived from a small three phase induction motor B–801 operating on a 400 cycle 115 volt alternating current source. Motor B–801 has integral gear reduction with a shaft 350 projecting from one end, which end is fastened by means of screws 352 to the motor mounting bracket 207 with shaft 350 projecting through a central aperture in the bracket. A spur gear 353 is fixed by set screws to the end of motor shaft 350. The right hand end of motor B–801 (FIGURES 20 and 23) is disposed in a semi-circular cut-out in the motor support plate 206 and held therein by means of a clamp 354 which partially encircles the motor housing and is fastened to plate 206 by screws 355.

Positioned vertically above the axis of the motor shaft 350, and journalled by a bearing 356 in the left hand function shaft support plate 208, is a spur gear shaft 357 having fastened at one end a noiseless laminated plastic spur gear 358 meshed with the motor drive spur gear 353. The collar of spur gear 358 is fastened to shaft 357 by set screws. On the other end of spur gear shaft 357 is a hardened steel spur gear 360 secured by set screws and providing the drive end of a positive action clutch assembly 361. The driven element 362 of clutch 361 is secured by set screws to one end of a function shaft 363 which is journalled by bearings, aligned with the spur gear shaft 357, in the right hand function shaft support plate 209 and in the rear portion of the cable drum bearing support plate 205. Function shaft 363 is maintained in axial position by abutment of an integral collar 365 with the inner race of the bearing at the outer side of the cable drum support plate 205 and by a collar 366 secured on the function shaft 363 adjacent the inner side of the cable drum bearing support plate 205 by set screws.

The collar 366 includes a radial flanged plate 368 which serves a two fold purpose. The periphery of plate 368 has a single cam rise 369 (FIGURE 28) which coacts with a line feed cam follower 370, as will be later described, and also serves as the fixed plate for a friction clutch 371 consisting of a floating gear wheel 372 freely journalled on the function shaft 363 and pressed by two friction discs 373 between the fixed plate 368 and an axially shiftable plate 374 which is in splined engagement with a collar 375 secured to the function shaft 363 by set screws. A compression coil spring 376 is disposed between collar 375 and plate 374, biasing plate 374 toward the fixed plate 368 thereby compressing the friction discs 373 against the floating gear wheel 372. Plate 374 also serves as a function shaft stop sensing cam which controls the contacts of a switch assembly 377 fastened on the back edge of the right hand function shaft bearing support plate 209 by screws. Switch assembly 377 is a dual switch composed of a normally closed switch S–803 and a normally opened switch S–805, when the function shaft is in its stop position. Upon initiation of rotation of the function shaft 363 by engagement of the positive clutch assembly 361 the rise of cam plate 374 will pass from control of switch assembly 377 permitting sensing switch S–803 to close and sensing switch S–805 to open. Just prior to one complete revolution of the function shaft 363 the cam rise of plate 374 again controls the switch assembly 377 causing the sensing switch S–803 to open and the sensing switch S–805 to close and shortly thereafter the positive action clutch assembly 361 will automatically be disengaged at the end of one complete revolution. The purpose and function of these switches will be fully described in conjunction with the control circuit description.

When the function shaft 363 is in its stop position, a detent notch 380 at the then forward portion of cam plate 374 comes into coaction with a spring plate 381 fixed in a bracket 382 mounted on the base plate 201. This detent spring plate and detent notch provide assurance that positive action clutch assembly 361 will remain disengaged. This may be seen in FIGURE 21.

A group of three cams 385, 386 and 387 separated by spacer plates 388 are splined and secured to the function shaft 363 adjacent the conical collar 365 by a nut 389 and lock washer 390. These cams are best seen in the exploded perspective view of FIGURE 28 but are also shown in FIGURE 22. The funtcion shaft 363 extends beyond nut 389 and freely journals a cable drum assembly 392. The cable drum assembly 392 consists of a drum 393 with an integral hub, containing a bearing, disposed on the end of function shaft 363 against a spring clip 394 fastened in a groove in the function shaft. The opposite side of the drum 393 is open and receives a clock type coil spring 395 having its outer tail disposed in a radial slot 396 through the drum periphery. The central portion of the coil spring side of drum 393 includes an enlarged aperture which rotatably receives the hub of a spring winding bracket 398 having three radially extending arms 399. Intermediate each of the arms 399 is a laterally directed lug 400, one of which cooperates with the inner end of coil spring 396 to constitute an anchor and providing means for prewinding the spring. Contained within the winding bracket hub is a bearing 404 journalled on the end of function shaft 363. The function shaft projects a slight distance beyond the spring winding bracket 398 and is journalled in a bronze bushing 402 inset in an auxiliary function shaft support bracket 403.

The open side periphery of drum 393 is recessed at 405 to receive a hardened steel cam segment 406. Fastened to the support bracket 403 by screws is a single switch assembly 407 having its contacts arranged as a switch S–804 to be actuated by the cam segment 406 to a closed position to energize a circuit indicating the approach of the end of line position of the printer type wheel, which lights an indicating lamp I–702 on the keyboard 100 (FIGURE 14).

Fastened to the left hand side of the cable drum 393 is a stepping ratchet wheel 410 having a plurality of ratchet teeth around its periphery adapted to be engaged to rotate the drum clockwise as viewed from the right hand side (FIGURE 22). Ratchet wheel 410 is fastened to the drum by rivets, and fastened to the side face of the ratchet wheel 410 is a camming stud 411, whose purpose will be later described.

With respect to FIGURE 22, a ratchet stop pawl 412, provided with a U-shaped mid-portion, is journalled on a stud 413 fixed to the cable drum bearing support plate 205. The pawl arm includes a knife edge lug 414 aligned with and adapted to engage the teeth of ratchet wheel 410 to prevent reverse rotation of the ratchet wheel and drum under the force of coil spring 396. Stop pawl 412 is biased into engagement with the ratchet wheel teeth by a spring 416, anchored to spring post 417, so clockwise rotation of the cable drum 393 will cause the ratchet wheel 410 to ratchet past the stop pawl edge 414, but will prevent counterclockwise rotation of the cable drum. The upper end of the stop pawl 412 has an upwardly directed finger 418 which is adapted to be engaged by a stop pawl release lever (to be described) that will forceably pivot the stop pawl 412, against its spring bias, out of detent engagement with the ratchet wheel 410 thereby permitting rotation of the cable drum under the force of coil spring 396 to a limit position determined by abutment of the camming stud 411 against a stop plate 419 that is fastened to the rear edge of right hand support plate 204 by screws. This stop position, by reason of the coordinated engagement of the type wheel assembly 230 and the print hammer lever 316 with the cable 250, determines the start of line position at the left hand side of the type wheel shaft 112 and the print hammer shaft 214.

Cable 250 is preferably double twisted multiple strand steel aircraft cable and is coiled several times around the cable drum 393, the cable passing off the lower portion of the drum toward the forward part of the printer assembly (FIGURES 21 and 24) and around a horizontally disposed pulley wheel 422 mounted on a pulley post 423 fixed in the base plate 201. Cable 250 then passes horizontally to a second pulley 424 arranged for rotation on a horizontal axis with its pulley shaft 425 fixed in a bracket 426 secured to the inner side of the left hand support plate 203. Passing over pulley 424 cable 250 reverses its direction and passes horizontally behind the print hammer shaft 314 to the right hand side of the printer and around a third pulley 428 arranged on a vertical axis pulley post 429 mounted on a bracket 430 secured to the inside of the right hand support plate 204. The print hammer wire clamp plate 321 is clamped to the horizontal stretch of cable immediately behind the print hammer shaft 314. Cable 250 passes around pulley 428 to reverse itself and again pass horizontally to the left hand side of the printer where it passes around a fourth pulley wheel 432, having its axis arranged horizontally, journalled on pulley post 433 fixed in a bracket 434 secured to the inside of the left hand support plate 203. Cable 250 passes around pulley 432, reversing itself and extending again to the right hand side of the printer where it passes around a quarter turn of a pulley 436 having its axis slightly inclined so cable 250 will pass from a horizontal path to a path tangent to and over the upper surface periphery of cable drum 393. Pulley 436 is mounted on a pulley post 437 fixed in the pulley bracket 438 which is secured to the outer side of the right hand support plate 204. The type wheel bearing clamp 243 is secured to the horizontal stretch of cable which passes between pulleys 432 and 436. Note that a fixed increment of the cable 250 between pulleys 424 and 428 will translate in synchronism with a fixed increment of the cable between pulleys 432 and 436. Therefore, if the print hammer lever 316 and the type wheel bearing 235 are clamped at aligned vertical positions on their respective stretches of cable 250, their longitudinal movement will be directly synchronized.

In the "start of line" position, as determined by abutment of the cable drum camming stud 411 against the stop plate 419, the type wheel and print hammer will be in the position shown in FIGURE 21. In this position the lowermost stretch of cable 150 includes the cable ends seen at the right hand side of the printer. Eye members 440 are swaged and soldered to each end of the cable 250 and are connected by a spring 441 to provide proper tensioning in the cable rigging. Looking now at FIGURE 22, clockwise rotation of the cable drum 393 will pull the upper stretch of cable back over the drum. This moves the uppermost stretch of cable 250 (FIGURE 21) to the right and will simultaneously move the type wheel assembly 230 to the right. The stretch of cable 250 immediately below moves to the left which pulls the stretch of cable 250 immediately behind the print hammer shaft 314 to the right, causing the print hammer lever 316 to move immediately in front of the type wheel assembly 230. By structure which will be described, the cable drum 293 is moved one tooth at a time which, as described, indexes the type wheel and print hammer toward the right one character space.

*Function shaft positive clutch.*—The structure and functioning of the positive clutch 361 will be described with reference to FIGURES 21, 22, 28 and 29–32. When the printer is conditioned for operation, through the control circuit, the motor B–801 is continuously operating to constantly rotate the driving element of clutch 361, the spur gear 360, through the shaft 357, noiseless gear 358 and the motor spur gear 353. With the clutch 361 engaged (FIGURE 30) spur gear 360 is drivingly engaged with the driven element 362 through pawls 446. The clutch driven element 362 is secured to positively drive the function shaft 363 whenever the clutch is engaged. Driven element 362 consists of a flanged hub 447 with a collar 448 at one side secured by set screws to function shaft 363. There are two axially directed pawl pivot posts 449 fixed at diametral positions on the opposite side of flange 450. Posts 449 are force fitted in mating holes provided in flange 450 and brazed or otherwise rigidly fixed in position. Each post 449 has a first annular shoulder 451 that abuts the face of flange 450 and immediately adjacent thereto a smaller diameter shoulder portion 452. A circular clutch kick out plate 453 has two circumferentially slotted, diametrally disposed apertures 454 so the circular plate 453 can be mounted with apertures 454 fitting over pivot post shoulders 452 to rest on shoulders 451. The slotted apertures 454 permit the kick out plate 453 to have a slight increment of relative coaxial rotation with respect to hub 447. The thickness of kick-out plate 453 is less than the depth of shouldered portion 452 so a pawl member 446, disposed on post 449 for pivotal movement, will rest against the shoulder 452 but will not bind kick out plate 453. Clips 456 fit in grooves on each of the posts 449 to axially retain the pawl members 446 thereon. Pawl members 446 are arcuately shaped and in assembly are positioned to pivot about posts 449 toward and away from engagement with the teeth of spur gear 360. The non-pivoted end 457 of each pawl is apertured and receives a camming pin 458 force fitted through the aperture and fixed to the pawl by brazing or other suitable means.

Shown in FIGURE 32, the left end 459 of cam pin 458 projects a short distance from the side of the pawl and when the clutch is assembled the camming ends 459 are disposed in diametrically opposite, similarly inclined slots 460 disposed in kick out plate 453. The ends of pawl pivot posts 449 and pawl camming pins 458 are grooved to provide spring retaining anchors and (FIGURE 29) a coil spring 462 is connected between each set of a pawl pivot pin 449 on one pawl and the pawl camming pin 458 on the other pawl. Coil tension spring 462 thus tends to pull the free end of each pawl toward the pivoted end of the other pawl thereby moving each pawl toward engagement with the driving gear 360. A driving tooth 463 is integrally formed on each pawl 446 at the center of the inner arcuate edge and, when the pawls are permitted to be spring biased into engagement with spur gear 360, the opposed pawl teeth 463 mesh with the teeth of clutch spur gear 360. Rotation of gear 360 is counterclockwise and, in the clutch engaged position (FIGURE 30), will exert a pulling force on the pawl pivot posts 449.

Whenever the kick out plate 453 is unrestrained, the force of springs 462 and the camming end 459 of cam pins 458 on the kick out plate slots 460 will cam the kick out plate 453 counterclockwise to the limit position determined by coaction of the ends of the arcuate slots 454 with the shoulder portion 452 of pivot posts pins 449. In this position the camming pins 458 are at the inner most end of the kick out plate cam slots 460 and the pawl teeth 463 are diametrically meshed with the driving gear 360.

When clutch mechanism 361 is rotating and the kick out plate 453 is suddenly blocked, the inertia of the driven hub member 447 and function mechanisms connected to the function shaft 363 cause the function shaft to tend to continue rotation and the fixed pawl pivot posts 449 will move from their position in the kick out plate arcuate slots 454 as shown in FIGURE 30 to the other end of the arcuate slots 454 as in FIGURE 29. Because of the fixed distance relationship between the pawl pivot posts 449 and the mated pawl camming pin 458 for each pawl, each camming pin end 459 must move toward the outer end of its camming slot 460 in the kick out plate, which movement causes the two pawls 446 to separate against the force of springs 462 causing disengagement of the pawl teeth 463 from spur gear 360, thereby disengaging positive drive between the clutch spur gear 360 and the clutch hub 447. Frictional inertia of the mechanism attached to function shaft 363 will prevent a reversal of rotation of the function shaft which would permit re-engagement of the clutch pawl lugs 463 with the spur gear. To assure against any tendency for the function shaft to reverse slightly the previously referred to detent notch 380 on the friction clutch camming plate 374 coacts with the spring plate 381 and positively prevents function shaft reversal.

To enable rotation of the kick out plate 453 to be blocked, a stop lug 465 is formed at one point on the periphery of plate 463, the leading edge of lug 465 lying in a plane passing through the axis of rotation of the clutch assembly. Blocking of the kick out plate 453 is controlled through a solenoid actuated stop bracket 466 pivoted on a pivot post 467 secured to the inside of the left hand function shaft support plate 208. Also fastened to the same side of plate 208 is a bracket 468 that carries an adjusting screw 469 and provides an anchor for a stop bracket biasing spring 470. The stop bracket 466 includes a substantially horizontally projected finger 472 and a downwardly disposed plate portion 473 with two bent up side ears journalled on the pivot post 467 and retained there by a spring clip. The horizontal finger 472 has a leading edge 475 which, when the stop bracket 466 is biased by spring 470 to cause the finger 472 to rest against the periphery of the kick out plate 453, will lie in blocking relation to the face of the kick out plate lug 465. The downwardly projected portion of the stop bracket 466 includes an anchor for one end of spring 470 and also carries an armature plate 476 which is rigidly secured thereto.

Shown in FIGURE 29, the stop bracket 466 is biased into blocking position against the kick out plate under force of spring 470, in which position the armature holding portion 473 of bracket 466 abuts the adjusting screw 469. Screw 469 is adjusted so the lateral finger 472 does not actually ride against the periphery of the kick out plate but, in the biased position, will be disposed closely adjacent the plate periphery and in the path of the kick out lug 465. Disposed immediately in front of the stop bracket 466 is a clutch actuating solenoid E–803, secured to a U-shaped solenoid bracket 478 fixed as by spot welding to angle bracket 479 which is fastened to base plate 201. Solenoid E–803 is positioned with its core pole face closely adjacent the armature plate 476 so a proper air gap is provided between the core and armature plate permitting maximum magnetic flux concentration between the core and armature plate yet, as seen by comparison of FIGURES 29 and 30, permitting sufficient pivotal operating movement of the stop bracket 466 to remove its blocking edge 475 from the path of kick out plate lug 465.

Actuation of solenoid E-803 is momentary and is accomplished by a start signal from a control system, as has been described, after receipt of a signal combination by the printer matrix. The momentary energization of solenoid E–803 releases the clutch kick out plate 453 permitting positive clutch 361 to engage and rotate the function shaft 363 in the printer 52. Upon solenoid deenergization, the stop bracket 466 is again biased by spring 470 against the adjusting screw 469 to place its blocking edge 475 in the path of kick out plate lug 465 thereby causing the clutch to disengage after one complete revolution. Note the actual stop position of the function shaft occurs within a small angular increment after the kick out plate lug 465 abuts the stop bracket edge 475. This angular increment will be equal to the distance of travel of the pawl pivot post 449 permitted by the arcuate slots 454 in the kick out plate 453.

Solenoid E–803 is termed a transfer solenoid because its relationship between the control circuit and the printer initiates the procedure of transferring a code signal manifestation from the printer matrices to a mechanical operation in the printer.

Positive rotation of function shaft 363 occurs each time the transfer solenoid E–803 is energized and the clutch remains engaged for a 360° rotation. The function shaft 363, friction clutch pressure plate 374 (stop sensing cam), friction clutch fixed plate 368 (line feed cam), spacing cam 385, printing cam 386, and line return cam 387 are positively rotated for 360° and the friction clutch floating gear 372 frictionally urged to rotate during such positive function shaft rotation, although its exact increment of rotation will be varied depending on the character selection of the type wheel shaft.

The floating gear 372 of friction clutch 371 furnishes the power to rotate the type wheel shaft 212 and is meshed with an idler pinion 481 (FIGURE 20) journalled on a stud 482 that passes through and is fixed to the cable drum bearing support plate 205 by a nut 483. Idler pinion 481 is in turn meshed with the type wheel shaft spur gear 226. Thus, rotation of function shaft 363 by engagement of positive clutch 361 will drive the type wheel shaft 212, through the friction clutch 371, until one of the stop pawls 258 or 259 is controlled by a received signal permutation to engage the stop wheel 254, at which point the friction clutch 371 will slip and the function shaft 363 will continue to rotate until the positive clutch is disengaged by abutment of the kickout plate lug 465 against the stop bracket edge 475. The friction clutch floating gear 372 has 53 teeth and the type wheel shaft gear 226 has 37 teeth which ratio enables the type wheel shaft to be rotated at least one full revolution for approximately 252° of rotation of the function shaft. As will be apparent with reference to the timing chart shown in FIGURE 38, this permits a possible scanning of all of the mark or space commutators before the printer cam operated functions occur, to enable a signal selection to be accomplished for type wheel shaft positioning, before the printing and spacing operation occur or before the functions, such as line feed and/or line return, occur.

*Type wheel spacing* is accomplished through coaction of spacing cam 385 with a line spacing lever 484, illustrated in FIGURES 20, 22, 28 and 35. Note, in the perspective view FIGURE 28, the relative positions of the various cams on the function shaft 363 and type wheel shaft 212 have been changed to afford greater clarity in viewing. Line spacing lever 484 includes a bearing hub journalled on a stud 485 fixed in the cable drum bearing support plate 205, above the function shaft 363. Viewed in FIGURES 22 and 35 the left arm of lever 484 is formed as a cam follower 486 that rides on the periphery of cam 385. The right hand arm 487 of lever 484 is formed in a dog leg with a stud 488 fixed to project laterally from the dog leg bend and a spring post 489 secured to the end of the dog leg arm. A spring 490 is connected between dog leg arm 487 and a spring post 491 fixed in support plate 205 above the lever 484 to bias the lever 484 counterclockwise with its cam follower 486 abutting the spacing cam 385.

Journalled on stud 488 is a double arm feed pawl 493. Depending arm 494 includes a laterally bent tip with a beveled pawl edge 495 provided thereon and projected across the toothed peripheral edge of the cable drum ratchet wheel 410. A spring 496, connected between a short ear 497 on feed pawl 493 and the spring post 489 on the spacing lever 484, biases the feed pawl 493 clockwise with pawl edge 495 engaging the teeth of ratchet wheel 410.

Cam 385 has one rise on its periphery and every time the function shaft makes one revolution the cam rise coacts with the follower arm 486 of the spacing lever 484 to pivot it clockwise from a normal position and permit its return to normal under bias of spring 490. Such pivotal reciprocation of lever 484 moves the feed pawl 493 downward to engage and rotate the drum ratchet wheel 410 one tooth space. Ratchet wheel 410 is held in its new position by the ratchet stop pawl 412 while the feed pawl 493 returns to its normal position, ratcheting over the ratchet wheel teeth, when the spacing lever 484 is returned to its normal position. As previously described, such rotation of the ratchet wheel will rotate the cable drum, moving cable 250 with the type wheel assembly 230 and hammer lever 316 one space to the right and winding the cable drum coil spring 395. This function occurs immediately after the print operation as is shown in FIGURE 38.

The feed pawl has a forwardly extended arm 498 that, in conjunction with the position of the bent pawl arm that includes pawl edge 495 in front of the upstanding finger 418 on the ratchet stop pawl 412, constitutes part of the line return mechanism, the function of which is described under a later sub-section describing the line return mechanism.

*Printing* is accomplished by cam 386. As previously described, the print hammer lever 316 is fixed to a pivotable print hammer shaft 314 whose normal position maintains the print hammer 324 spaced in front of the recording medium and the type wheel assembly 230. A print blocking sensing lever 327, fixed to print lever shaft 314, is pivotally connected to a printing lever 335, biased by a spring 340 so its cam follower 339 bears against the periphery of the print cam 386.

Spring bias normally tends to pivot the hammer 324 toward the type wheel but the cam 386 maintains the print lever shaft 314 pivoted against the spring bias. After rotation of the function shaft approximately 275° (FIGURE 38), which enables the type wheel shaft 212 to be positioned as selected by the permutated signal from the control matrices, the print cam 386 has a sharp drop 499 which permits the cam follower 339 to move upward under bias of spring 340, rapidly pivoting lever 335 counterclockwise with a resulting clockwise rotation of lever 327 and shaft 314 causing the hammer 324 to strike a sharp blow on the recording medium against the selected type wheel character. This action occurs for all positions of the type wheel excepting the six blank spaces. As described previously, if the type wheel shaft 212 is positioned to present a blank type wheel space to the print hammer, a lug 344 on the print blocking cam 218 (FIGURES 37 and 28) will be positioned in the path of the print blocking lever 327 and prevent the print hammer shaft 314 from completing a pivotal printing movement.

Continued function shaft rotation immediately shifts the print lever cam follower 339 to pivot the print hammer shaft 314 back to its normal position against bias of spring 340.

*Line feed.*—As previously explained, the recording medium upon which visual character representations are made is a pressure sensitive paper having a dark surface, preferably black, covered with a microscopic film of a light colored material. With reference to FIGURES 20–23 and 36 the recording paper 501, its path of movement and the mechanism for feeding the paper, line by line will be described. A roll 502 of paper is carried in the printer and the paper may have its edges perforated for sprocket feed if desired.

In FIGURES 20 and 21, phantom lines 501 indicate the projected strip of recording paper, the paper and its guide structure being deleted for clarity of other structure. FIGURES 23 and 36 illustrate the paper roll brackets 503 secured to the inside rear portion of the upper edges of support plates 203 and 205 by bolts. Brackets 503 are U-shaped channels having inclined notches 504 in their inside edges. A spring clip 505 is retained on a post 506 in each channel bracket 503 and has its movement limited by abutment against a stop lug 507 punched inwardly from the inside channel flange. A paper roll bushing 508 with a projected stud 509 (FIGURE 36) is inserted in each end of a roll 502 of recording paper, and the studs 509 placed in the inclined notches 504 of brackets 503 under the spring clips 505, to journal the roll.

Illustrated in FIGURE 23, the paper 501 feeds off the roll 502 down into a guide chute 511 that wholly encloses the paper strip and guides it down behind the type wheel assembly 230, forward under the type wheel shaft 212 and under the upper-most stretch of cable 250, then vertically upward in front of a guide rod 512. The paper strip then passes upward between the type wheel periphery and the print hammer 324, to and over a feed roll 513 and out through an appropriate slot provided in the top of a cover 514 illustrated by phantom lines. Guide chute 511 is made from polished metal and is suitably fastened by brackets (not shown) to the inside of support plates 203 and 205.

Feed roll 513 (FIGURES 21 and 36) is tubular, is coated with a material having a high coefficient of friction, and has end plugs 516 that can be provided with sprocket pins for sprocket feeding of the paper if desired. Set screws, through plugs 516, secure the feed roll 513 to a feed roll shaft 517 journalled in bearings in the support plates 203 and 205. A toothed feed and detent wheel 518 has its hub 519 fixed to shaft 517, by set screws, immediately adjacent the inside of support plate 205. A manual feed wheel 520 with a serrated periphery and fixed hub 521 is secured by set screws to right hand end of the feed roll shaft 517 and, together with the hub 519 of wheel 518, axially maintain the feed roll position. The edge of manual wheel 520 projects above the top of cover 514 to permit rotation of the feed roll by hand. Feed roll line position is maintained by coaction between a detent roller 522 and the toothed feed and detent wheel 518. Roller 522 is carried by a detent lever 523 journalled on stud 524 in support plate 205 and biased by a spring 525 to press the roller against the teeth of wheel 518.

Pivotally carried on a shaft 527, fixed between the support plates 203 and 205, is a paper pressure roller assembly 528 consisting of a support 529 carrying a shaft 530 with a central roller 531 resting on the top of the feed roll 513. A spring 532 biases the roller assembly in a direction to press the roller 531 and a strip of recording paper 501, passing over the feed roll 513, against the feed roll.

Line feed, as a function of the printer mechanism, is accomplished through a line feed lever assembly that cooperates with line feed cam 369 and line feed sensing cam 221 to ascertain when a line feed function is desired and to then power feed the paper feed roll 513. Rotation of feed roll 513 is a direct result of pivotal movement of a feed lever assembly 534 (FIGURES 20, 21, 22 and 34) consisting of a triple arm lever 535 journalled on the feed roll shaft 530. The upper lever arm 536 has a feed pawl stud 537 rigidly fixed thereto and pivotally carrying a feed pawl 538 biased by a coil spring 539 into engagement with the feed and detent wheel 518. The central lever arm is pierced to serve as an anchor for a spring 541 having its other end anchored to a spring post 542 fixed in the support plate 205. Spring 541 biases the feed lever assembly 534 counterclockwise to a normal limit position against a pin 543 fixed in support plate 205. In such normal limit position pawl 538 abuts a pin 544 and is pivoted out of engagement with the feed and detent wheel 518. The third and lower lever arm 546 carries an actuating post 547.

Pivotally mounted on a stud 548 projecting from the inside of support plate 205 is a cam operated line feed lever 549 having a rearwardly directed arm, whose end is a cam follower 370 biased into engagement with the line feed cam 368 by a spring 551, and an upwardly directed arm 552. The upper arm has a lateral stud 554 and immediately above the stud a post 555. Journalled on stud 554 is a line feed sensing lever 556 with an upper arm 557 disposed in front of post 555 and behind the feed pawl lever actuating post 547. The lower arm 558 has a sensing pin 559 laterally fixed in its end. As illustrated in FIGURE 20, the sensing pin 559 overlies the line feed sensing cam 221 and the line feed-line return sensing cam 220 on the type wheel shaft 212. A spring 560, connected between the feed sensing lever 556 and the lever 549, biases the feed sensing lever 556 clockwise so its upper arm 557 normally rests against the post 555 in the upper arm of line feed lever 549.

Every rotation of the function shaft 363 will, through cam 369 and the line feed cam follower 370, reciprocally pivot the line feed lever 549 and its associated sensing lever 556 without affecting a pivotal movement of the roll feed lever assembly 534. Turning to FIGURE 37, it will be seen that the line feed sensing cam 221 has two blocking fingers 345, one corresponding to each of the line return and line feed positions on the type wheel 237. In this manner a line return signal will automatically result in a simultaneous line feed operation, and a line feed function can be obtained separate from a line return function. If a blocking finger 345 is positioned in the path of sensing lever 556 when line feed lever 549 is pivotally reciprocated, lever 556 is forced to pivot counterclockwise on stud 554, bringing its upper arm 557 into engagement with the post 547 on the feed roll lever assembly 534, forcing lever assembly 534 to pivot clockwise to place pawl 538 into engagement with feed and detent wheel 518 and move the feed roll 513 one notch past the detent roller 522. The surface of feed roll 513, being treated with a high friction material, will advance the recording paper strip 501 a distance equivalent to one line each time the feed and detent wheel 518 advances one tooth past its detent roller 522. The sensing lever 556 reciprocates each time a printer operating cycle occurs and, if the sensing pin 559 is blocked by a sensing cam finger 345 a feed operation will result whereas if the sensing pin 559 is not blocked no feed action results.

*Line return.*—As previously noted, return of the type wheel assembly 230 and hammer lever 316 from a position to the right of a start of line position back to the start of line position is termed a line return function. The lever arrangement for accomplishing line return is illustrated in assembly in FIGURES 20 and 22 and in detail in FIGURES 28 and 35.

Power for initiating line return is furnished by line return cam 387 on the function shaft 363. A line return lever 564 is provided and includes a hub journalled on the same stud 485 as is the spacing lever 487. A depending arm 565 has a cam follower 566 resting against the periphery of cam 387. The upper arm of lever 564 includes a lateral stud 567, a bent lug abutment 568 and a spring anchor 569 and a spring 570 is connected between anchor 569 and the aforementioned spring post 491 to bias the line return lever 564 clockwise so its follower 566 bears against the periphery of cam 387.

Pivotally carried on the stud 567 is a line return sensing lever 571 having a mid portion serving as an abutment to engage the line return lever abutment lug 568 and limit counterclockwise pivotal movement of the sensing lever 571, under bias of spring 572, relative to lever 564. Viewed in FIGURE 35, the forward arm 573 of sensing lever 571 extends to a position adjacent the sensing cam assembly 215 and carries a sensing pin 574 (FIGURE 20) that overlies the line return sensing cam 219 and line feed-line return sensing cam 220. The rearward arm 575 of sensing lever 571 extends to a position adjacent the forward arm 498 of feed pawl 493 and carries a lateral post 576 that overlies feed pawl arm 498.

Line return lever 564 is pivotally reciprocated each time the function shaft rotates 360° and moves the sensing lever 571 toward the sensing cam assembly 215 and back away from it. Normally the sensing lever 571 will remain abutted against lug 568 of the line return lever 564 and will have no effect upon the feed pawl forward arm 498. However if the line return sensing cam 219 is positioned with its blocking finger 346 in the path of the sensing pin 574, as will occur when the type wheel shaft 212 is positioned according to a line return signal as is illustrated by dotted lines in FIGURE 35, counterclockwise movement of the sensing lever 571 will be blocked. Since its pivot post 567 is forced to move counterclockwise with the line return lever 564, the sensing lever 571 must pivot clockwise causing its rear arm to move down and, through post 576, pivot the feed pawl 493 counterclockwise out of engagement with ratchet wheel 410. At this position in the timing cycle the spacing cam 385 moves past its follower 486 and the feed pawl 493 starts to move up to a normal position. But since the line return sensing lever post 576 is holding the feed pawl 493 in a counterclockwise pivoted position the bent lug on feed pawl 493 that contains the pawl edge 495 engages the ratchet wheel stop pawl upper finger 418 and moves it clockwise to release the ratchet wheel 410 which allows the cable drum 393 to rotate under the energy of coil spring 395, returning the type wheel assembly 230 and hammer lever 316 to the start-of-line position. Cable drum rotation under spring force has a limit position determined when the ratchet wheel stud 411 abuts the stop plate 419 (FIGURE 22). Note that the line feed sensing cam 219 has one long finger 346 and five short fingers. The long finger 346 is the only finger on cam 219 that is used for a line return function, the short fingers being used for other purposes in modified printers.

*Line return latch.*—To assure that the ratchet stop pawl 412 is held out of engagement with the ratchet wheel 410 until the type wheel assembly and hammer lever are fully returned to a start-of-line position, a line return latch assembly 578, (FIGURES 22 and 36), is used to hold the sensing lever post 576 against the forward pawl arm 498 until the start-of-line position is reached. Latch assembly 578 consists of a bracket 579, secured by screws to the top edge of support plate 205, with two upstanding ears 580 and 581 and a depending skirt 582 disposed on the outside of support plate 205. A laterally projected stud 583 is fixed in skirt 582 and pivotally carries a slotted latch lever 584. Adjustably carried in the slotted part of lever 584 is a hook plate 585, normally disposed, as in FIGURE 22, in front of the line return sensing lever post 576. During normal unblocked operation of the line return lever assembly, the latch lever 584, which is biased counterclockwise by a spring 586, will remain in front of the sensing lever post 576 and rock slightly as the sensing lever moves. But when the sensing lever 571 is blocked by the sensing cam assembly 215, post 576 is moved down below the lower edge of latch hook plate 585 which permits the latch lever 584 to swing counterclockwise so the hook plate 585 is above the sensing lever post 576. Pivotal movement of latch lever 584 is limited by adjusting screws 587 and 588 in the upstanding bracket ears 580 in cooperation with a bent lug 589 on the upper end of the latch lever 584.

The lower end of latch lever 584 has a depending cam follower 590 that is engaged by the ratchet wheel stud 411, just prior to engagement of the stop plate 419 by stud 411. Rotation of the cable drum causes stud 411 to positively pivot the latch lever 584 clockwise against its spring bias. Such action removes the latch hook plate 585 from above the sensing lever post 576 permitting the sensing lever 571 to resume its normal position in preparation for the next cycle of printer operation. This release of the sensing lever 571 also releases the ratchet wheel stop pawl 412 permitting it to engage ratchet wheel 410 and normal spacing operation can resume.

Provision is made to manually line return by depressing a button 592. Depression of button 592, through a wire link rod 593, moves the sensing lever post 576 down past the latch hook plate 585. This movement pivots the feed pawl 493 counterclockwise into engagement with and releasing the ratchet stop pawl 412 to permit the cable drum 393 to rotate under force of its coil spring 495 back to start-of-line position. The ratchet stop pawl 412 and sensing lever 571 are reset in the manner described above when the start-of-line position is reached.

*Automatic line feed-line return* will occur whenever the printer is spaced to the end-of-line position. At such position the cable drum ratchet wheel stud 411 comes up under a lug 595 (FIGURES 22 and 28) on one arm of an automatic line feed-line return lever 596 journalled on a stud 597 fixed on the outside of support plate 205.

Lever 596 is biased clockwise by a spring 598 to a limit position determined by abutment of a depending lever finger 599 with a post 600 fixed in support plate 205. The forward end of lever 596 has a rounded nub 601 which is disposed in a notched recess 602 in the line feed-line return sensing cam 220 in sensing cam assembly 215. This cam 220 is the only cam in the sensing cam assembly 215 that is freely journalled relative to the type wheel shaft 212. The normal spring biased position of lever 596 will maintain the sensing cam 220 as illustrated in FIGURE 37, however if the cable drum assembly 492 is at the end of line position and its stud 411 has engaged the lug 595 on lever 596, lever 596 is pivoted counterclockwise, placing the two fingers 603 and 604 of the line feed-line return sensing cam 220 into blocking position under respective sensing fingers 559 and 574 of the line feed and line return sensing lever assemblies. In such a position the next printer cycle will operate a line feed function and a line return function in the manner previously described in the subsections devoted to line feed and line return.

Note, the cam segment 406 in the cable drum 493 actuates an end of line switch S–804 approximately six spaces before the end of line is reached. This action energizes a circuit to the "END-LINE" lamp I–702 on the keyboard unit 50.

*Printer selection matrices.*—Along the rear edge of base plate 201 (FIGURE 20) two matrix boxes 606 and 607 are fastened by screws. The lefthand box 606 contains the "space" matrix CR801 and CR802, while the right hand box 607 contains the "mark" matrix CR803 and CR804, see FIGURE 5 for the specific matrix circuits. All diodes and resistors of the "space" matrix and those of the "mark" matrix are molded in a solid compound, e.g. phenolic resin, inside the respective boxes 606 and 607 with external terminals 608 projecting from the tops of the boxes. FIGURE 20 illustrates the matrix boxes 606 and 607 with exterior connections removed.

In FIGURE 23 a plug-in connector 610 is illustrated on top of the "space" matrix box 606, a similar plug-in connector cooperating with the "mark" matrix box 607. Eight lines from each matrix box 606 and 607 are separately bundled as indicated by 611 and 612 and lead to tip jacks 613 that plug in the eight terminals A, B, C, D, E, F, G and H and A′, B′, C′, D′, E′, F′, G′ and H′ of the "space" commutator S–801 and the "mark" commutator S–802 respectively. Leads from the "space" and "mark" matrices, the motor B–801, the "space" and "mark" solenoids E–801 and E–802, the transfer solenoid E–803, switches S–803, S–804 and S–805, the illumination lights I–801 and the "Receive" and "Transmit" signal lamps I–802 and I–803 pass into a cable 615 having a plug socket J–801 on its end for connection to the control circuit.

The printer page illumination may be accomplished by any appropriate means, a simple arrangement of two lamps I–801 being shown in FIGURE 20 wherein lamp sockets 616 are secured to the inside front edge of support plates 203 and 205.

Illustrated by solid lines in FIGURE 20 and phantom lines in FIGURE 21, the transmit signal lamp I–803 and the receive signal lamp I–802 are identical except for their legends, hence only one will be described. Both signal assemblies are mounted on the printer base plate 201 along the front edge. Each assembly consists of a plastic face plate 618 covered with opaque material and shock mounted by bolts 619, spacers 620 and rubber washers 621 to an angle bracket 622 secured to base plate 201. Centrally located on the upper flange of bracket 622 is a midget lamp base 623 consisting of a flanged socket 624, a rubber lamp shield 625, two insulators 626, a terminal 627, lock-washer 628 and nut 629. A second terminal 630 projects from socket 624. A midget lamp 631 is threaded into the socket 624 compressing a rubber shield 632 against the face plate 618. Leads from the signal assemblies pass into cable 615 and socket 616 for connection in the control circuit.

*General printer operation*

The printer power source is controlled by the main control circuit and when it is on the printer motor B–801 is operating.

A five unit Baudot code signal combination is fed simultaneously into the control circuit as previously described. Any five unit signal, having a spacing impulse as the first unit, results in the next four signal impulses being fed to the "space" matrix CR–801 and CR–802. Dependent on the permutative arrangement of the four "mark" and/or "space" impulses the "space" matrix will cause a control circuit to be selected, including two of eight leads which connect to the eight terminals A, B, C, D, E, F, G and H on the "space" commutator S–801. The two selected leads are connected to inner and outer commutator segments and will be connected by the commutator rotor brushes 307 and 308 bridging the inner and outer two selected segments of the commutator at one of sixteen angular positions of the rotor 302. As soon as the commutator rotor reaches the selected segments and makes the selected contact between the two leads, the circuit controlled by those matrix leads will energize the "space" solenoid E–801 and hold the preset space pawl 258 in engagement with a specific tooth of a sixteen tooth stop wheel 254 fixed on the type wheel shaft 212. At the speed of operation of this printer the rotor brushes 307 and 308 contact each possible pair of commutator segments for 5 milli-seconds, which is more than the two milli-seconds required for the control circuit to actuate the appropriate pawl solenoid after the rotor brushes first contact the selected commutator segments. Similarly the "mark" matrix is set up and operated if the first impulse of a five unit code signal is a "mark" impulse. The "mark" pawl 259 engages a tooth and stops the stop wheel 254 at positions intermediate those of the space pawl 258 thereby enabling 32 distinct stop positions for the type wheel shaft.

Immediately after the proper matrix is selected by receipt of the five unit code, a signal is sent, through the control circuit, to the printer transfer solenoid E–803, actuating the clutch stop bracket 466 to engage the positive clutch assembly. Constantly rotating motor B–801 then drives the function shaft 360° before the clutch kickout plate 453 disengages the positive clutch. During the first 252° of function shaft rotation the type wheel shaft 212 will, if permitted, be rotated 360° through a friction clutch 371. At one point during the type wheel shaft rotation either the "space" or "mark" commutator rotor 302 or 303 will bridge a set of selected segments to immediately energize a respective solenoid and hold a stop pawl in engagement with the type wheel shaft stop wheel 254. That selected stop position holds the type wheel 237 with the selected character, corresponding to the received signal, in position to be printed on the recording paper.

After the type wheel is positioned by a stop pawl, the friction clutch slips while the function shaft 363 continues rotation through its final angle of rotation. At approximately 275° of rotation the print hammer shaft 314 is actuated to cause the hammer head 324 to strike the recording paper against the selected type wheel character and break the light surface revealing the dark surface of the paper as a visual character manifestation. Shortly thereafter the spacing mechanism actuates feed pawl 412 to rotate the cable drum 393 and shift the type wheel assembly and print hammer lever one character space. The line feed and line return lever assemblies are also actuated but no associated function will result unless their sensing pins 559 and 574 are blocked by a sensing cam assembly 215 rotatably with and positioned in accord with type wheel selection. Thus, if the type wheel is positioned to represent a line feed or line return signal appropriate fingers on the blocking cam assembly block sensing pins on the line feed or line return lever assemblies to cause operation of the specific functions. Line feed always occurs whenever a line return signal is received. The sensing cam assembly includes a print hammer blocking cam that coacts with a print hammer blocking lever 327 to prevent hammer impact if a blank space is presented by the type wheel selection. Automatic line feed-line return occurs when the cable drum rotates to the end-of-line position and is actuated through the sensing cam assembly 215 in which one cam shifts to block both the line feed and line return sensing pins causing both functions to operate. Manual line return can be accomplished and operates through a portion of the line return lever system.

Through a cam 374 on the function shaft 360 two stop sensing switches S–803 and S–805 are actuated when the printer reaches the stop position, where the positive clutch is automatically disengaged. These switches prevent the next signal from being fed to the control circuit until the preceding signal is printed and the printer is cleared. Their precise control function is described hereinbefore in the section devoted to the control circuit.

*Recorder-introduction*

The recorder unit for the teletypewriter provides means by which the operator can, if desired, record and store a message and at some future time automatically transmit the recorded message. It accordingly includes a data storage device and in view of the space limitations and environmental conditions under which the recorder unit is to operate, the storage medium found to be most suitable was a magnetic record. The magnetic record provides satisfactory storage for an indefinite period of the teletypewriter signals and allows reuse of the recording medium.

Steel tape was chosen as a magnetic recording medium because of its durability under heavy record and playback head pressures, and by subjecting the steel tape to a set, it has been found that an auxiliary drive on the tape feed and take-up reels may be eliminated, thereby reducing the overall weight and complexity of the recorder unit.

A further feature of the recorder unit resides in the novel recording system wherein the tape makes step movements of approximately .075 inch while the recording head rests on one edge of the tape, and at selected intervals after the tape has come to rest the recording head moves across the tape and returns in a period of a few milliseconds. The information for each letter or character to be stored is recorded serially across the tape in separate channels.

Because only a single head is used to read or record signals in all the channels on the tape, it is possible to record ten separate channels across a tape of only seven-eighths inch width even with space deducted for tape feed sprocket holes and with ample allowance provided for marginal spacing away from the edge of the tape. While the recording equipment as described below is capable of recording in ten separate channels across the tape, only five channels corresponding to the separate pulse time periods in the Baudot code are used in the described teletypewriter system and the commutator on the recorder unit is arranged accordingly.

The novel recorder unit of the present invention is adapted for operation in a remote position with rewind, playback and record functions all being controlled without local supervision. The unit is designed to provide trouble free operation with only periodic maintenance checks required. Mechanical as well as electrical interlocks are provided for assuring that the recording tape is not removed completely from either tape spool during operation or rewind of the recorder.

The recorder unit has two electric motors which run continuously when the recorder unit is operating and only one of the motors needs to be reversible for rewinding the tape. During the playback operation the electrical circuitry for the recorder requires only one voltage amplifier for the output of the recording head. The amplifier output is commutated to the five thyratron controlled relays in the teletypewriter system which store the information for use by the printer and electronic transmitter as discussed above in connection with FIGURE 8.

During a recording operation the erase head on the recorder units is energized by a 400 c.p.s. current available from the main power source in the aircraft. The signal to be recorded is supplied to a commutator in the recorder whose contact arm moves concomitantly with the recording head to assure proper correlation between the various signals in the Baudot code and the corresponding signal channels in the recording tape.

With a tape having a 270 inch active recording length, the magnetic recorder will store approximately 3600 characters which is equivalent to an average 600 words. The information to be recorded can be supplied to the recorder at any convenient speed and may be entered on the keyboard a letter at a time over an indefinite period. After the message is recorded the tape is rewound and is played back at a uniform rate for transmission to receiving stations. Since the playback is entirely automatic and without manual intervention, the message can be transmitted at any desired speed and the rate of transmission is limited only by the speed limitations of the transmitting and receiving equipment. The present equipment is intended to operate in a system with existing teletypewriter equipment and is adjusted to transmit at the rate of 60 words or 360 characters per minute thereby requiring approximately ten minutes to transmit a message recorded on the entire active length of the tape. The rewind time for the entire tape takes less than ten seconds.

*Recorder-general discussion*

The storage sub-unit is a magnetic tape recorder and reproducer designed to accommodate the Baudot code. The code is magnetically recorded across the tape so that the five intelligence signals of the Baudot code are laterally adjacent to one another. The tape is advanced with intermittent motion under the head between the recording or playback operation for each successive letter or character.

The recording or reading operation of the coded signals in the five channels across the tape is effected by means of a single recording head. The same mechanical movements are used for both reading and recording. The tape is stationary during the transducing operation and the head is moved laterally across the tape at a sufficiently rapid rate in one direction so that a signal of sufficient amplitude is obtained for use as an input signal to an amplifier during the reading operation.

Referring now to FIGURE 39 the basic drive mechanism for advancing the magnetic tape comprises a tape feed sprocket wheel 702 mounted in the path of the tape between feed reel 704 and take-up reel 706. The magnetic tape 708 advances from feed spool 704, under roller 710, between recording head 712 and guide roller 714, under guide roller 715 and around approximately 120° of tape feed sprocket wheel 702 to take-up spool 706. The tape motion is controlled entirely by movement of the sprocket wheel 702 and tape spools 704 and 706 are both mounted for free rotational movement with no auxiliary driving means being provided.

Recording tape 708, also separately shown in FIGURES 40 and 41 is made of polished spring steel. The tape contains a series of sprocket tooth holes 716 along one edge for receiving the teeth on sprocket wheel 702 and there are three notched areas where the edge of the tape has been removed. Notch 718 is near the end of the tape and is utilized as a control means for preventing the tape from becoming completely removed from feed reel 704 during the recording or playback operation. Notch 719 is on the opposite side of the tape and is used to control the position of switch S–504 (see FIGURES 44 and 50) for indicating to the operator that only five additional lines of printed material can be recorded on the printer before reaching the end of the tape.

Referring now to FIGURE 41, notch 720 is provided near the beginning of the tape with edge 721 for use as a mechanical stop for preventing the tape from being unwound from take-up reel 706 during the rewinding operation and edge 722 to control the position where recording is started on the tape, as more fully discussed below in connection with operation of the recorder unit. Additional switch contacts S–503 and S–505 (see FIGURES 44 and 50) are controlled by notches or recesses 720 and 718 for indicating when the tape is rewound and to block the keyboard when the end of the tape has been reached respectively.

The main body of the recording tape 708 which fits between broken ends of FIGURE 40 and FIGURE 41 comprises the useful area for recording information and may be any desired length. Since spools 704 and 706 are not provided with auxiliary driving means, the steel tape is preformed by a special operation before being punched to assure satisfactory winding on the reels.

The special preforming operation involves pulling tape 708 when under tension around a cylindrical roller 723 as illustrated in FIGURE 42. The diameter of roller 723 is smaller than the drum diameter of spools 704 and 706 so that once the spring steel tape has been given this set, each elemental length of tape 708 has a tendency to coil about a diameter approximately the size of the diameter of roller 723.

With the drum diameter of tape spools 704 and 706 approximately twenty-five percent larger than the outside diameter of cylinder 723 in FIGURE 42, the tape is given a set which causes it to automatically wind itself on the take-up spool as tape drive sprocket wheel 702 advances in either direction. The auxiliary rollers 714 and 724 of FIGURE 39 are provided to hold the tape in position on tape drive sprocket wheel 702 as it is important that the sprocket wheel does not slip with respect to the tape. The unit is arranged so that the tape does not become removed from either spool. The set in the tape supplies a continuous force tending to cause each reel to attempt to wind the tape on itself and therefore provides a tension force on the tape at all times.

Guide roller 714 which is immediately beneath recording head 712 forces tape 708 in rubbing contact with the lower surfaces of recording head 712. The pressure required is to cause adequate inductance of magnetism into the tape and read-out voltage from the tape. Since the cross section of tape 708 becomes arched as shown in FIGURE 43 after being given the set discussed in connection with FIGURE 42, the pressure applied causes an incidental flattening of the tape. Roller 714 is accordingly mounted on lever 725 which is supported for pivotal movement about fixed pin 726 and biased by means of spring 727 to supply sufficient force against recording head 712 to flatten the tape under the recording head. The force of roller 714 against recording head 712 is made adjustable by screw 728 which is attached to one end of spring 727 and the other end of spring 727 is attached to the frame. Satisfactory operation has been obtained when the recorder is subjected to the forces caused by vibration and acceleration of an aircraft with a tape having a thickness of .00045 inch and a width of ⅞ of an inch with a force of approximately ten ounces exerted by roller 714 against head 712.

The top surface of tape 708 is polished and extremely smooth, and because tape 708 moves only intermittently and is thereby stationary during the time recording head 712 advances across the tape for a recording or reading operation, there is very little wear on the recording area on the tape and the wear on recorder head 712 is not excessive. During the rewind operation when high tape speed is used, the recording head is at the edge of the tape and away from the area used for recording information.

The tape passes through a conventional erase head 730 which is pivotally supported to allow for the change in tape path between spool 704 and roller 710 with different amounts of tape remaining on the spool. Erase head 730 is mounted on the free end of arm 732 which is preferably pivotally mounted near the lower edge of roller 710. However, from a practical standpoint, it is more convenient to mount arm 732 to pivot along the axis of roller 710 and this compromise has been found to provide satisfactory operation.

Rollers 710 and 715 are approximately evenly spaced on opposite sides of recording head 712, and in cooperation with spring biased roller 714 and the pole face of recording head 712, cause the tape to pass along a uniform path under the recording head regardless of the amount of tape remaining on feed spool 704. Roller 715 is close to the periphery of tape feed sprocket wheel 702 to assure that the tape rides along the sprocket wheel without slippage. Roller 724 is similarly located for the same purpose at the opposite side of the sprocket wheel. Additional guides for holding the tape against the periphery of sprocket wheel 702 may be used if necessary to prevent slippage of the tape on the sprocket wheel.

Steel tape, given the set described in connection with FIGURE 42, provides a torque tending to wind itself on each spool and this system accordingly operates with no tape slack at any point.

Since the erase head is energized during the recording operation, erase head 730 is spaced from recording head 712 by a distance sufficient to prevent any signal interference.

A physical embodiment of the recorder unit described in connection with FIGURES 44 through 52 will be considered in two sections, the first describing the mechanisms for causing recording head 712 to move from its starting position at one edge of the tape across the tape and back to its starting position for each character transmitted and the second portion of the following description being directed to those mechanisms responsible for advancing the tape at a time when the recording head is not energized. FIGURES 44 and 45 are top and front views respectively of the recorder unit. FIGURE 45 shows the tape spools 704 and 706 and tape driving sprocket wheel 702 (in dotted lines) as well as the associated tape rollers in positions corresponding those shown in FIGURE 39, and the same reference numerals have been used throughout for identifying corresponding parts.

*Recorder-recording head movement mechanism*

All of the parts in the recorder unit are mounted on a frame which may be of a metal such as aluminum and which has a right end member 734, a left end member 736 and a central member 737 having an off-set rear portion 738 best shown in FIGURE 44. Members 736 and 737 are integrally joined by longitudinally extending sections 739 and 740 forming a first rectangle. Member 737 is joined near the front end by member 741 which curves to become integral with right end member 734. At off-set rear portion 738 a similar member 742 is provided which also curves to become integral with member 734. About one-fourth of the distance from front member 741 to toward rear member 742 as shown in FIGURE 44 is a third longitudinally extending bar 743 which connects central member 737 and right end member 734 at a lower elevation as is shown in FIGURE 45. Three frame mounting supports 744, 745 and 746, best seen in FIGURES 45–47, are provided for supporting the recorder frame in a suitable housing (not shown).

Tape feed spool 704 and take-up spool 706 are both suitably mounted on shafts which are supported by the frame as best shown in FIGURES 44, 45 and 47 and, as mentioned above, no additional auxiliary driving means is provided. Tape roller 710 is mounted on bracket 711 which is rigidly secured to the frame in a suitable manner. Roller 714 which is under the recording head is supported on lever 725 which is pivotally mounted on bracket 711 by pin 726. Stud screw 728 is threadingly received in a lower portion of an extension on bracket 725 and is connected to one end of spring 727. The other end of spring 727 is connected to pin 729 which in turn is secured to fixed bracket 711. Adjustment of screw 728 varies the force applied by spring 727 through bracket 725 to roller 714 under recording head 712 to adjust the pressure between recording head 712 and the tape. Erase head 730 is mounted on arm 732 which is pivotally supported on pin 733. Pin 733 and roller 710 are mounted along the same axis and are supported on the frame by bracket 711.

As most clearly shown in FIGURE 44, cam shaft 747 extends longitudinally of the frame and is journalled at one end in a suitable bearing 748 in right end frame member 734 and at its other end in a similar bearing 749 in left end member 736, and is secured in position as by means of collar 751. Mounted on cam shaft 747 near right end frame member 734 are two cams 750 and 752. Cam 750 is a tape feed cam and cam 752 is a sensing lever trip cam.

Cams 750 and 752 are also shown in FIGURES 50 and 51. In FIGURE 50 the positions of cams 750 and 752 have been interchanged from their actual position as shown in the other figures solely for the purpose of simplifying the sketch which is provided to illustrate the functional operation of the various mechanisms associated with the cams. These cams are part of the tape feed mechanism and are discussed in detail below.

Referring now to FIGURES 44 and 48, there is provided near the end of cam shaft 747 adjacent left frame member 736 a stop wheel 754 rigidly secured to the cam shaft. Stop wheel 754 has a projection 756 which abuts against stop bar 757 on stop arm 758. Stop arm 758 is pivotally mounted on fixed pin 760 and biased to its illustrated position by spring 762. Rigidly secured to stop arm 758 is armature 764 for solenoid 766. Solenoid 766 is suitably mounted on frame member 736 as by bracket 768 also shown in FIGURES 45 and 47. Energization of solenoid 766 causes stop bar 757 to be retracted from stop wheel projection 756 to allow stop wheel 754 and cam shaft 747 to rotate.

Gear 770 is mounted for free turning movement on cam shaft 747 and is adapted to drive cam shaft 747 through a friction clutch comprising a pair of felt discs 772 and 774, metal friction disc 776 mounted to slide along and to turn with shaft 747, spring 778 and dog 780 which is adjustably secured to shaft 747. Shuttle cam 782 is rigidly secured to cam shaft 747 and a portion of surface 784 which contacts felt disc 774 acts as the fixed friction disc of the friction clutch. In operation, spring 778 urges friction disc 776 toward surface 784 on the shuttle cam thereby pressing felt discs 772 and 774 against the faces of rotating gear 770 to provide a turning torque for cam shaft 747.

Motor 786, shown also in FIGURE 45, is secured to the frame and operates continuously when the equipment is turned on. Gear 770 is continuously driven by means of pinion 788 on motor 786 through a fixed gear train including gear 790 and pinion 792.

Referring now to FIGURES 44 through 48, and more specifically to FIGURE 48, an E-shaped support plate 794 is secured to the frame at opposite sides as with fasteners 796 to extend above the frame and magnetic tape. Four stud rollers 797, 798, 799 and 800 are secured to plate 794. The rollers have V-shaped grooves and are mounted in alignment to receive a rectangular plate 802 having complementary V-shaped edges. Plate 802 rests on rollers 797 and 798 and is movable laterally to the direction of tape movement. The magnetic recording and reading head assembly 712 is removably secured to plate 802 by screws 804.

As best shown in FIGURES 45, 48 and 52, a shuttle lever assembly 806 is pivotally mounted about fixed pin 808 on the center leg of E-shaped support plate 794. Shuttle lever assembly 806 has a main arm 810 which contains near its upper end elongated slot 812 for receiving pin 814 which is rigidly secured to movable plate 802. Arm 816 is secured as by screws 818 and spacer 817 to main shuttle arm 810 and carries at its upper end a contact 819 which acts as a commutator wiper.

Referring now to FIGURES 44, 45, 48 and 52, the lower end of shuttle lever assembly 806 contains a roller follower 819 which cooperates with the cam surface in shuttle cam 782. As shuttle cam 782 rotates shuttle lever arm 806 pivots about pin 808 driving plate 802 along rollers 797 through 800 and causing recording head assembly 712 to move laterally of the recording tape. Switch contacts S–502 shown in FIGURE 44 are suitably mounted on plate 794 to be closed when plate 802 has returned to its rest position.

Referring now to FIGURES 44, 45 48 and 52, the upper part of support plate 794 is mounted a commutator bracket 820, the top view of which is shown in FIGURE 49. A group of commutator contact strips 822 made of a conducting material such as Phosphor bronze are spaced apart with nylon spacers 824 sandwiched therebetween. The contact strip and spacer assembly is provided with two spaced through holes into which an insulating sleeve 826 of a material such as Bakelite is inserted. Bolts 828 are then inserted through sleeves 826 and the assembly secured to bracket 820. Additional end spacers 827, preferably of insulating material, are used to rigidly locate contact strips 822 between the arms of bracket 820.

The spacing between contact strips 822 determines the spacing between adjacent channels of recorded data on the tape and with contact strips 822 positioned as illustrated in FIGURE 49, a total of ten channels of information could be recorded on the usable space on a tape having a width of seven-eighths of an inch. However only the five contacts actually used are shown. Because of the close spacing between commutator strips 822, alternate lugs 830 and 832 are located at different elevations to facilitate connecting the electrical conductors used to supply the coded electrical signals to the commutator strips.

A tension spring 834 shown in FIGURES 45 and 48 is connected between fixed plate 794 and movable plate 802. Spring 834 is connected at one end to pin 814 on plate 802 and at the other end to pin 836 so that when the recording head is in its rest position as illustrated, the spring is under tension and its force is available to aid in driving recording head 712 across the tape at a substantially uniform velocity during the interval of the actual recording or reading operation.

The velocity of head 712 during the reading operation affects the strength of the signal induced by the magnetized area on the tape. For this reason a uniform velocity during the actual reading interval for each cycle of operation is desirable. The force supplied by spring 834 reduces the load on shuttle cam follower arm 810 at the time shuttle cam 782 and cam shaft 747 are being accelerated from zero velocity thus reducing the power required from motor 786 thereby permitting a smaller motor to be used.

As most clearly shown in FIGURES 45 and 47, a support bracket 837 is supported on right end frame member 736 and carries electrical terminal connectors 838 for electrically connecting the recorder unit with the other pieces of equipment in the overall teletypewriter system. Various electrical components such as capacitors and resistances may be mounted on the frame of the recorder unit as desired with one such capacitor being indicated at reference numeral 840.

*Recorder-tape feed mechanism*

Referring now to FIGURES 44, 46, 50 and 51, tape feed sprocket wheel 702 is mounted to turn with line shaft 850 which is mounted for rotational movement with one end journalled in bearing 851 in longitudinal frame member 741 and the other end journalled in bearing 853 in longitudinal frame member 742. Also rigidly mounted on shaft 850 is ratchet wheel 852 which is uniformally toothed around its entire periphery. Function disc 858 is loosely mounted on line shaft 850 and driven by a friction clutch including a pair of felt discs 854 and 856 on opposite sides of function disc 858. Function friction disc 860 is movable along but mounted on turn with shaft 850 and is biased against felt disc 856 by function disc spring 862 and driver dog 864, the later being secured to shaft 850 as with set screw 866. One face of ratchet wheel 852 is used as the friction disc fixed to turn with shaft 850. Function disc 858 changes position when the direction of rotation of shaft 850 is changed and is in the position illustrated in FIGURE 50 during recording or playback operation and shifts counterclockwise through an angle of approximately 20° or 30° to its alternate position when shaft 850 turns counterclockwise.

Referring now to FIGURES 44, 45, 46 and 51, shaft gear 870 is mounted for free rotational movement on line shaft 850 and drives shaft 850 through a friction clutch comprising the usual felt discs 872 and 874, shaft friction disc 876 which is secured to shaft 850 and friction disc 878 which turns with but is slidable along shaft 850. Friction disc 878 is urged toward friction disc 876 by spring 880 and dog 882.

A reversible electric motor 868 is secured to the frame and is provided with a pinion 884. Drive shaft gear 870 is driven continuously in the direction shown by the arrow in FIGURE 45 during recording or playback operation of the equipment by pinion 884 through a fixed gear train best shown in FIGURE 46 comprising gear 886 and pinion 888 on a fixed shaft 890.

With continued reference to FIGURE 50, the rotation of shaft 850 is controlled by ratchet wheel 852 and escapement pawl 892 during the normal recording or reading operation. An upper finger 894 on pawl 892 is normally engaged with a tooth on ratchet wheel 852 and lower finger 896 is in a non-tooth engaging position. Escapement pawl 892 is mounted for pivotal movement about pin 898 which is supported on rotation function lever 900. Escapement pawl 892 is biased in its normal position by spring 902 which is connected at one end near lower finger 896 and on the other end to a spring holding pin on rotation function lever 900. Stud 904 is threadedly received by ear 905 on rotation function lever 900 to adjust operation of the escapement pawl.

The upper arm 894 on escapement pawl 892 is released from ratchet wheel 852 by escapement pawl function lever 906 which is pivotally mounted on fixed pin 908. As cam shaft 747 rotates, nose portion 910 of escapement pawl function lever 906 is caused to rise thereby forcing the other end of the function lever down against arm 912 of ratchet pawl 892 to force upper finger or arm 894 out of engagement with the teeth on ratchet wheel 852 and to force lower finger 896 into engagement with a ratchet wheel tooth. As function lever 906 returns to its illustrated position, spring 902 pulls ratchet pawl 892 back to its illustrated position. Because of the continuous rotational torque applied to shaft 850 through the friction clutch associated with shaft gear 870, the ratchet wheel advances one tooth for each revolution of cam shaft 747.

Rotation function lever 900 is pivotally mounted about fixed pin 914 and has an arm 916 which fits a considerable distance into a slot in function disc 858 to prevent the function disc from rotating. During the normal recording or reading operation, arm 916 on rotation function lever holds function disc 858 in the illustrated position. Reversal of rotation of line shaft 850 causes function disc 858 to rotate a small distance counterclockwise thereby causing rotation function lever 900 to pivot about pin 914 and pull the entire escapement pawl 892 away from the ratchet wheel. The angular displacement of function disc 858 is controlled by arm 916, and as soon as line shaft 850 begins rotating again in a clockwise direction, function disc 858 will return to its illustrated position if arm 916 is free to move. Arm 918 on rotation function lever 200 abuts against adjustment screw 919 which is provided to adjust the operating position of rotation function lever 900 which in turn controls the position of escapement pawl 892 with respect to ratchet wheel 852.

Below arm 918 on rotation function lever 900, a trip lever 920 mounted for pivotal movement about fixed pin 922 is provided. Trip lever 920 has arm 924 which is adapted to cooperate with the notched end of arm 918 on rotation function lever 900 when line shaft 850 rotates in a counterclockwise direction. Spring 926 tends to bias arm 924 toward arm 918 to cause rotation function lever 900 to be locked in its alternate position during counterclockwise rotation of shaft 850. Trip lever 920 has a second arm 928 spaced below extension 930 on tape sensing lever 932 which is pressed downwardly to unlatch notched arm 918 on rotation function lever from arm 924 when locked.

Tape sensing lever 932 has a centrally located elongated slot 934 which allows tape sensing lever 932 to have a pivotal movement about fixed pin 936 and axial movement in the direction of the major axis of slot 934. Tape sensing lever 932 has a nose portion 938 which is biased by spring 942 against the edge of tape 708 and/or rim 940 of tape feed sprocket wheel 702. A switch contact operating pin 944 is located adjacent nose 938 and a trip lever pin 946 is provided on an arm extending outwardly from slot 934.

Tape feed sprocket wheel 702 has a width slightly less than the width of tape 708. The teeth on sprocket wheel 702 and the holes in tape 708 are located so that the edge of the tape and rim 940 are flush. Rim 940 does not extend completely around wheel 702 and when either notch 718 or 720 (see FIGURES 40 and 41) advances to sprocket wheel 702, tape sensing lever 932 moves inwardly thereby opening contacts of switch S–503 and closing the contacts of S–505. The tape notches 718 and 720 are located to always have the same position on tape feed sprocket wheel 702 and the distance between surfaces 721 and 722 of notch 720 is equal to the peripheral distance between surfaces 947 and 948.

At the end of the tape during a recording operation, the recorder unit stops when tape sensing lever 932 moves into notch 718 due to an electrical interlock caused by opening of contacts S–503. However, when the tape is being rewound, the electrical interlock is not operative. When tape sensing lever moves into notch 720 (see FIGURE 41) of the tape, tape feed sprocket wheel 702 is mechanically stopped by nose 938 abutting simultaneously against edge 721 of tape 708 and surface 947 of rim 940 on sprocket wheel 702.

The width of tape feed sprocket wheel 702 is such that edge 723 of tape 708 normally overhangs the rim of wheel 702 and edge 719 is flush with the edge of the rim of wheel 702. Switch contact S–504 has an actuator 945 which engages edge 723 of tape 708 so that switch S–504 is normally held open by the overhanging edge of the tape and is closed when the tape notch 719 advances on sprocket wheel 702 to a position in which switch actuator 945 engages notch 719. Closing of switch S–504 is effective to energize the end of tape warning light I–702 on the keyboard unit.

Lower extension 930 on tape sensing lever 932 is not moved out of engagement with arm 928 on trip lever 920 by pivotal movement of tape sensing lever 932 except at one interval near the beginning of the recording operation. Clockwise movement of tape sensing lever 932 as seen in FIGURE 50 is caused by spring 942 when nose 938 comes in contact with a notch or recess in the side of tape 708 along a portion of tape feed sprocket wheel 702 which does not have rim 940. Counterclockwise movement of tape sensing lever 932 can be caused by moving pin 946 upwardly.

Tape sensing lever 932 is subjected to one additional movement which occurs when surface 948 of rim 940 on the tape feed sprocket wheel abuts the upper edge of nose 938 thereby forcing tape sensing lever 932 downwardly and blocking further rotation of line shaft 850 irrespective of the operation of the remaining mechanisms.

Tape sensing trip lever 950 is mounted for pivotal movement about fixed pin 952 and biased by spring 954 so that in normal operation end 956 will not contact pin 946 on tape sensing lever 932. The opposite end 958 of trip lever 950 is biased against the surface of cam 752 on cam shaft 747. When referring to the figures in the drawings other than FIGURE 50, should be kept in mind that the positions of cams 750 and 752 on shaft 747 have been reversed in FIGURE 50 for clarity of representation.

As cam shaft 747 and cam 752 rotate, end 958 of tape sensing trip lever 950 is gradually pressed downwardly thereby causing end 956 to move upwardly and to almost contact pin 946. Only when tape sensing lever 932 is moved downwardly by surface 948 on tape sprocket wheel 702 does the upward movement of arm 950 cause tape sensing lever 932 to rock about pin 936. The rocking movement causes nose 938 to back away from the edge of sprocket wheel 702 and permits advancement of the tape.

*Recorder-operation*

When the recorder unit is turned on and ready for operation, motor 786 is continuously energized thereby causing gear 770 to continuously rotate and provide a constant driving torque through its associated friction clutch tending to cause cam shaft 747 to rotate. Stop wheel 754 normally holds cam shaft 747 stationary. When an electrical impulse is applied to solenoid 766, stop bar 757 is momentarily retracted from its contacting position with stop wheel 754 and cam shaft 747 is allowed to make one revolution.

Shuttle cam 782 is normally stopped at the top of the rise in its cam surface so that immediately upon release of stop bar 757 from stop wheel 754, shuttle cam follower 819 causes shuttle lever assembly 806 to start its reciprocating movement and drive plate 802 which is mounted in the grooved rollers 797 through 800 laterally with respect to recording tape 708. Recording head 712 is supported on plate 802 and is thus rapidly driven across the tape because of the contour of the cam track (see FIGURE 52) in shuttle cam 782 and spring 834.

As recording head 712 is moved across the tape, commutator contact 818 is simultaneously moved across commutator contact strips 822 to sequentially apply the coded signals representing each letter or character to be transmitted to recording head 712.

The recording operation takes place during the very first part of the revolution of cam shaft 747 and the motion of recording head 712 with respect to tape 708, which is stationary during this time, is very rapid so that during the reading operation an induced signal picked up by recordng head 712 will be large enough to drive an amplifier.

During the remaining period of the rotation of cam shaft 747 shuttle lever assembly is moved back to its normal position against the bias of spring 834.

Operation of the tape feed mechanism will be best understood with reference to FIGURE 50. Shaft gear 870 is continuously driven by motor 868 to apply a continuous driving torque through a friction clutch to shaft 850 tending to advance the tape feed sprocket wheel 702. As cam shaft 747 rotates one revolution ratchet pawl function lever 906 causes upper tooth 894 of escapement pawl 892 to come out of engagement with the teeth on ratchet wheel 852 just as lower tooth 896 comes into engagement with a tooth on ratchet wheel 852. This permits tape feed wheel 702 to advance part of its distance with the final advancement occurring when nose 910 of ratchet pawl function lever 906 drops to the position illustrated in FIGURE 50 just prior to the instant cam shaft 747 is stopped by stop wheel 754 and stop bar 757. This action causes upper tooth 894 of escapement pawl 892 to be forced into the path of the next tooth on ratchet wheel 852 by spring 902. In the illustrated embodiment, the number of teeth on ratchet wheel 852 is chosen so that the tape moves a distance of .075 inch between each recording operation.

As long as tape sensing lever 934 is held in its illustrated position due to the presence of un-notched tape on tape feed sprocket wheel 702 tape sensing trip lever 950 on cam 752 does not affect normal operation.

Referring now to FIGURE 44 switch contact S–502 mounted to be closed when plate 102 is in its starting position and to be open during a time interval required for rotation of cam shaft 747. These switch contacts form part of an electrical interlock which prevents the next starting impulse from being applied to solenoid 766 until cam shaft 747 has made its complete revolution.

Referring now to FIGURES 40 and 44, the above described cycle of operation continues until notch 719 in tape 708 passes onto tape feed sprocket wheel 702. At that time normally open switch contacts S–504, also shown in FIGURE 50, close to complete a circuit to energize an indicating light I–701 on the keyboard thereby providing a warning signal to the operator that the end of the tape is approaching.

Operation of the keyboard can continue however until notch 718 is reached. At this point tape sensing lever 932 moves inwardly to open switch contacts S–503. Switch contacts S–503 are in series with switch contacts S–502 and so long as either set of contacts is open, electrical impulses cannot be applied to start solenoid 766 thereby preventing further advancement of the tape and blocking entry of additional letters in the keyboard.

The operator is provided with a rewind switch which reverses the direction of motor 868, thereby reversing direction of rotation of shaft gear 870 and shaft 850. During the rewind operation it is immaterial whether motor 786 is energized as the rewinding operation is controlled completely by mechanisms associated with shaft 850, and stop wheel 754 is never released.

As shaft 850 begins turning counterclockwise as seen in FIGURE 50, function disc 858 is immediately turned counterclockwise through its associated friction clutch thereby causing the rotation function lever 900 to pivot about pin 914 thus backing escapement pawl 892 away from ratchet wheel 852 to permit a rapid continuous rewind operation. Near the end of the rewind operation notch 720 in the recording tape (see FIGURE 41) becomes aligned between surfaces 947 and 948 of rim 940 on tape feed ratchet wheel 702. Tape sensing lever 932 is urged into notch 720 of the tape by spring 942 and the lower edge of nose 938 of the tape sensing lever soon abuts against surface 947 of rim 940 thus causing rotation of tape feed sprocket wheel 702 to stop. Motor 868 continues to urge rotation of shaft 850 through gear 870 and its associated friction clutch until the rewind switch in the control box is de-energized.

When tape sensing lever 932 moves into notch 720 on the tape, switch contacts S—505 are then closed and energize light I–602 in the control box where the reset sensing switch is located to indicate that the rewinding operation has been completed. Opening of contacts S–503 does not affect operation of the equipment at this point.

When it is desired to either record on the magnetic tape or playback a previously recorded message, power is again applied to motors 786 and 868 to cause continuous rotation in the directions indicated in the drawings. Arm 924 on trip lever 920 has by this time locked in the notch in arm 918 on rotation function lever 900 thereby holding rotation function lever 900 in its alternate position with escapement pawl 892 out of operative engagement with ratchet wheel 852. The tape is thus allowed upon application of power to motor 868 to advance to the point where nose 938 on tape sensing lever 932 contacts surface 948 on rim 940 of tape feed sprocket wheel 702. This allows the tape to advance a distance slightly greater than the distance between erase head 730 and recording head 712.

If the subsequent operation is a read or playback operation, erase head 730 is not energized. If the subsequent operation is a record operation, erase head 730 is energized at the time the direction of motor 868 is reversed to start the erasing function during the movement of tape feed sprocket wheel 702 to the position determined by abutment of surface 948 against nose 938. This deletes any previous signals recorded on the tape in the first few inches in preparation for the subsequent recording operation during which time, of course, the erase head 730 remains continuously energized.

Recapitulating, prior to the start of the recording operation, it is necessary to rewind the tape so that the first tape recording position has passed erase head 730 toward feed spool 704. As soon as the equipment is turned on for either a read or record operation, the tape rapidly advances to a position where the first line adapted to receive recorded data is immediately beneath recording head 712. If a recording operation is indicated, erase head 730 clears the first section of tape as the tape is advanced to the position where the data is to be recorded.

Referring again to FIGURE 50, when surface 948 comes into contact with the upper portion of nose 938 on tape sensing lever 932, the tape sensing lever is forced down so that the upper surface of slot 934 bears against pin 936. Lower extension 930 on tape sensing lever 932 then forces arm 928 on trip lever 920 downwardly thus pulling arm 924 out of the notch on the end of arm 918 on rotation function lever 900. Rotation function lever 900 still remains in its alternate position however, as it will not be returned to its illustrated position until function disc 858 forces arm 916 downwardly. Function disc 858 cannot be driven in forward direction until shaft 850 is allowed to turn. Thus escapement pawl 892 remains out of operative position with ratchet wheel 852 at the time the first character or letter is recorded.

At this point the first letter to be recorded is entered in the keyboard and the start pulse is applied to solenoid 766 as described above. Recording head 712 advances across tape 708 during the first fraction of rotation of cam shaft 747 and ratchet pawl function lever 906 contacts arm 912 on escapement pawl 892 as cam 750 rotates. As cam 752 rotates tape sensing lever 950 is pivoted about pin 952 with end 956 contacting pin 946 on tape sensing lever 932. Since surface 948 on rim 940 of tape feed sprocket wheel 702 is in contact with the upper surface on nose 938, tape sensing lever 932 is in a lower than normal position with pin 946 contacting the upper surface of 956 so that with the rise given end 956 of tape sensing trip lever 950 as cam 752 rotates tape sensing lever 932 is moved out of engagement with surface 948 of rim 940 on tape drive wheel 702.

Shaft 850 begins to rotate thus causing function disc 858 to promptly return to its illustrated position thereby moving rotation function lever 900 against stop 919 and positioning escapement pawl 892 in operating position with respect to ratchet wheel 852. As cam 750 returns to its illustrated position the upper tooth 894 on escapement pawl 892 locks in position on ratchet wheel 852 and the recorder unit is then ready for the next letter from the keyboard.

At the time surface 948 of rim 940 on tape sprocket wheel 702 contacts nose 938 on tape sensing lever 932 and forces the top of slot 934 against fixed pin 936, pin 944 dropped below the contacts of switches S–503 and S–505 thereby causing those contacts to assume the normal position just as if a full width of tape is present under tape sensing lever 932. This allows contacts S–503 to close and permit the next electrical impulse to be applied to solenoid 766 when the second letter to be recorded is entered in the keyboard.

Because of the force between surface 948 and nose 938 caused by the torque supplied to shaft 850 through the friction clutch associated with shaft gear 870, tape sensing lever 932 pivots about pin 936 before returning upwardly to its illustrated position. This permits pin 944 to be rocked counterclockwise as seen in FIGURE 50 considerably beyond its normal position so that pin 944 clears the ends of the contacts on switches S–503 and S–505 to return the equipment to the position illustrated in the drawings.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Communications equipment for use in aircraft in conjunction with radio transmitting and receiving equipment comprising a keyboard unit; a legible record producing unit; and a control unit including a data storage device; means providing electrical connections between said control unit and said keyboard and record producing units and providing for electrical connections from said control unit to a radio receiver and to a radio transmitter; means for selectively actuating said control unit to simultaneously produce, under control of said keyboard, a time sequential signal for radio transmission and actuation of said record producing unit to produce a legible record of the significance of such time sequential signal; means for selectively actuating said control unit to simultaneously produce, under control of said keyboard, actuation of said data storage device to record signals indicative of the significance of the successive actuations of said keyboard for future transmission, and actuation of said record producing unit to produce a legible record of the significance of the data recorded in said data storage device; means for selectively actuating said control unit to simultaneously produce under control of said data storage device a time sequential signal for radio transmission and actuation of said record producing unit to provide a legible record of the significance of the time sequential signal; and means for selectively actuating said control unit to produce a legible record of the significance of a time sequential signal received from a radio receiver.

2. Communication equipment for use in aircraft in conjunction with radio transmitting and receiving equipment comprising a keyboard unit, a legible record producing unit, and means forming a unit distinct from said keyboard and legible record producing units embodying a data storage device, said communication equipment including selective means interconnecting said units in conjunction with radio transmitting and receiving equipment enabling the selective receipt, transmission or storage for future transmission of messages and for controlling said legible record producing unit to produce a legible record of all such messages.

3. Communication equipment comprising a record producing unit, means operative to analyze all signals received on a selected broadcast channel and means controlled by said signal analyzing means and operative only upon receipt of a predetermined sequence of identification signals to connect said record producing unit to said analyzing means to produce a printed record of the message embodied in the signals analyzed subsequent to the receipt of such a predetermined sequence of identification signals.

4. Communication equipment comprising a record producing unit, means for analyzing all signals received on a selected broadcast channel and means connected to said analyzing means and selectively operative to control said record producing unit to produce a record of all messages received through said analyzing means on such channel or to produce a record only of those messages received through said analyzing means on such channel which are preceded by a predetermined sequence of identification signals.

5. A device operative when actuated to produce a printed record of a message received in the form of successive time sequential unit data indicative signal groups, means responsive to all received signal groups for producing a simultaneous output signal group corresponding to the successive signals of each signal group, and means controlled by said output signals and operative only in response to a selectable predetermined sequence of output signal groups for actuating said device to print a record in accord with the output signals at least subsequent to said predetermined sequence of output signal groups.

6. For use as electronic communication control equipment: the combination including an electronic circuit having means cyclically operative throughout a plurality of distinct stages of stable operation in response to driving impulses; a timing device connected to said electronic circuit and having means for supplying a succession of driving impulses; a frequency divider circuit operatively interposed between said timing device and said electronic circuit; and means, connected to said frequency divider circuit, controlled by said electronic circuit when in one of its said stages for rendering said frequency divider circuit inoperative and to cause the electronic circuit to be responsive to the next succeeding driving impulse from the timing device.

7. Communication equipment for use in conjunction with radio transmitting and receiving equipment comprising: a keyboard unit; legible record producing means; means, forming a unit distinct and separate from said keyboard unit and legible record producing means, embodying a data storage device incorporating an erasable and reusable data storage medium; and said communication equipment including means interconnecting said keyboard unit, said legible record producing means and said data storage device in conjunction with radio transmitting and receiving equipment enabling the selective receipt, transmission or storage for future transmission of messages and for controlling said legible record producing means to produce a legible record of all such messages.

8. A device operative when actuated to produce a printed record of a message received in the form of successive time sequential unit data indicative signal groups; means responsive to all received signal groups for producing simultaneous output signal groups corresponding to the successive signal groups and operative only in response to a selectable predetermined sequence of output signal groups for actuating said device, comprising an electronic distributor having a predetermined sequence of stable operating conditions, a separate input circuit for each successive stage of said distributor, a gate circuit for each said input circuit, each gate circuit being connected to said means for producing simultaneous output signals and being responsive only to a predetermined permutation of said simultaneous output signals and operative in response to such predetermined permutation of said output signals to transmit a signal to its associated stage of said distributor, and means controlled by said electronic distributor and operative upon advance of said electronic distributor to a predetermined stable condition in response to signals transmitted through said gate circuits to the input circuits of said electronic distributor for connecting said means for producing simultaneous output signals to said record producing device whereby said device is operative to produce a printed record at least of subsequently produced signals.

9. In combination, selectively controlled means for producing a plurality of simultaneous signals indicative in combination of a unit of data, a cyclically operative device, and means controlled by said plurality of signals from said selectively controlled means and by said cyclically operative device to produce a discrete signal in a specific timed relation to the cyclical operation of said device for each unit data indicative combination of said plurality of signals.

10. In combination, selectively controlled means for producing a plurality of signals indicative in combination of a unit of data, a cyclically operative device, means controlled by said plurality of signals from said selectively controlled means and by said cyclically operative device to produce a discrete signal in timed relation to the cyclical operation of said device for each unit data indicative combination of said plurality of signals, a cyclically operative recording device operative in timed relation with said cyclically operative device, and means controlled by the signal from said discrete signal producing means for causing said recording device to record.

11. In combination, a plurality of groups of alternatively energized pairs of signal channels, a first group of signal channels, means controlled by one of said groups of alternatively energized pairs of signal channels for rendering a distinct channel of said first group of signal channels operative for each combination of energization of the channels of said one group, a second group of signal channels, means controlled by another of said groups of alternatively energized pairs of signal channels for rendering a distinct channel of said second group of signal channels operative for each combination of energization of the channels of said other group, a cyclically operative switching device for sequentially interconnecting each channel of said first group with each channel of said second group, and means connected to said first and second groups of channels for producing a signal upon the interconnection by said cyclically operative device of the operative channel of said first group with the operative channel of said second group.

12. In combination, a plurality of groups of alternatively energized pairs of signal channels, a first group of signal channels, means controlled by one of said groups of alternatively energized pairs of signal channels for rendering a distinct channel of said first group of signal channels operative for each combination of energization of the channels of said one group, a second group of signal channels, means controlled by another of said groups of alternatively energized pairs of signal channels for rendering a distinct channel of said second group of signal channels operative for each combination of energization of the channels of said other group, a cyclically operative switching device for sequentially interconnecting each channel of said first group with each channel of said second group, means connected to said first and second groups of channels for producing a signal upon the interconnection by said cyclically operative device of the operative channel of said first group with the operative channel of said second group, a cyclically operative recording device operative in timed relation with said cyclically operative switching device, and means controlled by said signal producing means for effecting recording by said recording device.

13. In combination, a plurality of groups of alternatively energized pairs of signal channels, a first group of signal channels, means controlled by one of said groups of alternatively energized pairs of signal channels for rendering a distinct channel of said first group of signal channels operative for each combination of energization of the channels of said one group, a second group of signal channels, means controlled by another of said groups of alternatively energized pairs of signal channels for rendering a distinct channel of said second group of signal channels operative for each combination of energization of the channels of said other group, a cyclically operative switching device for sequentially interconnecting each channel of said first group with each channel of said second group, means connected to said first and second groups of channels for producing a signal upon the interconnection by said cyclically operative device of the operative channel of said first group with the operative channel of said second group, means controlled by said signal producing means for terminating the cyclical operation of said cyclically operative switching device.

14. A plurality of groups of alternatively energized pairs of signal channels, selectively controlled means for producing a plurality of signals equal in number to the number of pairs of signal channels in said plurality of groups of pairs of signal channels and indicative in combination of a unit of data, means associated with each of said pairs of signal channels and controlled by one of said plurality of signals produced by said selectively controlled means for selectively energizing one of said pair of channels in accordance with said signal, a first group of signal channels, means controlling by one of said groups of alternatively energized pairs of signal channels for rendering a distinct channel of said first group of signal channels operative for each combination of energization of the channels of said one group, a second group of signal channels, means controlled by another of said groups of alternatively energized pairs of signal channels for rendering a distinct channel of said second group of signal channels operative for each combination of energization of the channels of said other group, a cyclically operative switching device for sequentially interconnecting each channel of said first group with each channel of said second group and means connected to said first and second groups of channels for producing a signal upon the interconnection by said cyclically operative device of the operative channel of said first group with the operative channel of said second group.

15. In combination, a plurality of unitary signal storage devices, a coincidence circuit connected to the input of each such storage device, means for applying a time sequential signal group to all of said coincident circuits, means for applying signals to said coincident circuits seriatim in synchronism with the signals of said signal group whereby successive ones of said unitary storage devices are caused to assume conditions corresponding to the successive signals of the applied signal group, a page printer, permutatively settable means operative under signal control for causing said page printer to record a message, and a read-out device for permutatively setting said last named means in accordance with the signals stored in said unitary storage devices.

16. In combination: a plurality of unitary signal storage devices, each of which is an individual magnetic core storage unit; a coincidence circuit connected to the input of each such storage device; means for applying a time sequential signal group to all of said coincident circuits seriatim in synchronism with the signals of said signal group whereby successive ones of said unitary storage devices are caused to assume conditions corresponding to the successive signals of the applied signal group; a page printer; permutatively settable means operative under signal control for causing said page printer to record a message; and a read-out device for permutatively setting said last named means in accordance with the signals stored in said unitary storage devices.

17. In combination: a plurality of unitary signal storage devices; a coincidence circuit connected to the input of each such storage device; means for applying a time sequential signal group to all of said coincidence circuits; means for applying signals to said coincidence circuits seriatim in synchronism with the signals of said signal group whereby successive ones of said unitary storage devices are caused to assume conditions corresponding to the successive signals of the applied signal group; a plurality of relays; means connecting each of said unitary storage devices to one of said plurality of relays; means for simultaneously energizing each relay of said plurality of relays which is connected to a storage device having a signal stored therein; a plurality of pairs of signal transmission channels each of which pairs is alternatively energized under control of one of said relays; a printing unit including a rotatable type wheel mounted for rotation for character selection and for axial movement for line space and line return operations; and means operative under control of the selective energization of said plurality of channels for controlling said printing unit to print a message in accordance with the significance of successive time sequential signal groups applied to said coincidence circuits, comprising commutator means synchronized in operation with the movement of said type wheel and providing a plurality of separate signal transmission channels therethrough equal in number to the number of positions of said type wheel, means operative under control of the signals applied to said plurality of channels for rendering inoperative all but one of said commutator transmission channels and means operative through the one operative commutator channel in synchronism with the movement of said type wheel to arrest further movement thereof and initiate recording thereby.

18. Communication equipment comprising a keyboard, a magnetic storage device including a magnetic record tape, means operative in response to successive actuation of said keyboard to produce on said magnetic record tape a longitudinal succession of transversely arranged unit data indicative signal groups constituting a record of the successive key actuations of said keyboard, and means selectively operative to produce under control of said magnetic record tape a succession of time sequential signal groups indicative of the successive units of recorded data.

19. In combination, an elongated magnetic record medium, an electro-magnetic transducer head, means mounting said head for reciprocation transversely of said record medium, an electrical lead from said head, a plural channel signal transmission circuit, a switching device operative in synchronism with the movement of said head to successively connect said lead to each of the channels of said transmission circuit, a printing member movable through a series of positions in which a series of characters are moved through a printing position, means controlled by the output of said plural channel signal transmission circuit for producing a series of simultaneously occurring signals indicative in a permutative group of the unit of data sensed by said transducer head from said magnetic record medium, means for sensing the permutations of simultaneous signals produced by said signal producing means and for producing a signal in distinct timed relation to the movement of said printing member for each permutation of simultaneous signals produced by the first of said signal producing means, and means responsive to a signal from the second of said signal producing means for arresting the movement of said printing member.

20. In combination, an elongated magnetic record medium, an electromagnetic transducer head, means mounting said head for reciprocation transversely of said record medium, an electrical lead from said head, a plural channel signal transmission circuit, a switching device operative in synchronism with the movement of said head to successively connect said lead to each of the channels of said transmission circuit, means connected to the output of said plural channel signal transmissions circuit and controlled by signals induced therein by said transducer head for producing a series of simultaneously occurring signals indicative in a permutative group of a character indicated by the signals sensed by said transducer head, means controlled by said series of simultaneously occurring signals for producing a time sequential signal group the signals of which correspond to the signals produced by said simultaneous signal producing means, a printing member movable through a series of positions in which a series of characters are moved through a printing position, means for sensing the permutations of simultaneous signals produced by said signal producing means and for producing a signal in distinct timed relation to the movement of said printing member for each permutation of simultaneous signals produced by the first said signal producing means, and means responsive to a signal from the second of said signal producing means while arresting the movement of said printing member.

21. In combination, an elongated magnetic record medium, an electro-magnetic transducer head, means mounting said head for reciprocation transversely of said record medium, an electrical lead from said head, a plural channel signal transmission circuit and a switching device operative in synchronism with the movement of said head for successively connecting said lead to each of the channels of said transmission circuit, a keyboard, a plurality of keyboard actuated switches permutatively set upon depression of a key in open and closed positions indicative in coded combination of the significance of the key depressed, means controlled by said switches for applying a signal to a distinct channel of said signal transmission circuit indicative of the position of each of said switches, and means operative upon depression of each key of said keyboard for reciprocating said head and synchronously actuating said switching device to record across said record medium a group of signals indicative in coded combination of the significance of the key depressed.

22. In combination, an elongated magnetic record medium, an electro-magnetic transducer head, means mounting said head for reciprocation trasversely of said record medium, an electrical lead from said head, a plural channel signal transmission circuit, a switching device operative in synchronism with the movement of said head to successively connect said lead to each of the channels of said transmission circuit, a keyboard, a plurality of keyboard actuated switches permutatively set upon depression of a key in open and closed positions indicative in coded combination of the significance of the key depressed, means controlled by said switches for applying a signal to a distinct channel of said signal transmission circuit indicative of the position of each of said switches, means operative upon the depression of each key of said keyboard for reciprocating said head and synchronously actuating said switching device to record across said record medium a group of signals indicative in coded combination of the significance of the key depressed, a printing member movable through a series of positions in which a series of characters are moved through a printing position, means responsive to the actuation of said keyboard actuated switches for producing a series of simultaneously occurring signals indicative in permutative group of the significance of the key depressed, means for sensing the permutations of simultaneous signals produced by said signal producing means and for producing a signal in distinct timed relation to the movement of said printing member for each permutation of simultaneous signals produced by the first said signal producing means, and means responsive to a signal from the second of said signal producing means for arresting the movement of said printing member.

23. Communication equipment for use in conjunction with radio transmitting and receiving equipment comprising: a keyboard unit; a legible record producing unit; and means forming a unit distinct from said keyboard and legible record producing units embodying a data storage device and signal producing means adapted for selective actuation under alternative control of said keyboard and said storage device to produce for radio transmission data indicative time sequential signal groups, said communication equipment including selective means interconnecting said units and said signal producing means in conjunction with radio transmitting and receiving equipment enabling the selective receipt, transmission or storage for future transmission of messages and for controlling said legible record producing unit to produce a legible record of all such messages.

24. Communication equipment for use in conjunction with radio transmitting and receiving equipment comprising: a keyboard unit; a legible record producing unit; and means forming a unit distinct from said keyboard and legible record producing units embodying a data storage device and signal producing means adapted for selective actuation under alternative control of said keyboard and said storage device to produce for radio transmission data indicative time sequential signal groups; said signal producing means including a timing device for supplying a succession of impulses, an electronic circuit cyclically operative in response to driving impulses throughout a plurality of distinct stages of stable operation, a frequency divider circuit operatively interposed between said timing device and said electronic circuit, and means controlled by said electronic circuit when in one of its said stages for rendering said frequency divider circuit inoperative; said communication equipment including selective means interconnecting said units and said signal producing means in conjunction with radio transmitting and receiving equipment enabling the selective receipt, transmission or storage for future transmission of messages and for controlling said legible record producing unit to produce a legible record of all such messages.

25. Communication equipment for use in conjunction with radio transmitting and receiving equipment comprising: a keyboard unit; a legible record producing unit; and means forming a unit distinct from said keyboard and legible record producing units embodying a data storage device and signal producing means adapted for selective actuation under alternative control of said keyboard and said storage device to produce for radio transmission data indicative time sequential signal group; said signal producing means including means for supplying a succession of impulses at a predetermined frequency, an electronic commutator cyclically operative in response to driving impulses throughout a plurality of distinct stages of stable operation, a frequency divider circuit having its input connected to said impulse supplying means and its output connected to said electronic commutator, a gate circuit normally operative to maintain said commutator in one of its stable stages of operation irrespective of the impulses thereto and ineffective to control said commutator while in any other stage of operation, and means for rendering said gate circuit operative to permit said commutator to respond to impulses while in said one stable stage; said communication equipment including selective means interconnecting said units and said signal producing means in conjunction with radio transmitting and receiving equipment enabling the selective receipt, transmission or storage for future transmission of messages and for controlling said legible record producing unit to produce a legible record of all such messages.

26. In combination, a plurality of signal storage devices, a coincidence circuit connected to the input of each such storage device, means for applying a time sequential signal group to all of said coincident circuits and for applying additional signals to said coincident circuits seriatim in synchronism with the signals of said signal group whereby successive ones of said storage devices are caused to assume conditions corresponding to the successive signals of the applied signal group, a page printer, permutatively settable means operative under signal control for causing said page printer to record a message, and a read-out device for permutatively setting said last named means in accordance with the signals stored in said storage devices.

27. The combination claimed in claim 26 wherein each said unitary storage device is an individual magnetic storage unit.

28. In combination, a plurality of unitary signal storage devices, a coincidence circuit connected to the input of each such storage device, means for applying a time sequential signal group to all of said coincidence circuits, means for applying signals to said coincidence circuit seriatim in synchronism with the signals of said signal group whereby successive ones of said unitary storage devices are caused to assume conditions corresponding to the successive signals of the applied signal group, a plurality of relays, means connecting each of said unitary storage devices to one of said plurality of relays, means for simultaneously energizing each relay of said plurality of relays which is connected to a storage device having a signal stored therein, a plurality of pairs of signal transmission channels each of which pairs is alternatively energized under control of one of said relays, a printing unit, and means operative under control of the selective energization of said plurality of channels for controlling said printing unit to print a message in accordance with the significance of successive time sequential signal groups applied to said coincidence circuits.

References Cited in the file of this patent

UNITED STATES PATENTS

| | | |
|---|---|---|
| 1,557,633 | Vernam | Oct. 20, 1925 |
| 2,067,990 | Taylor | Jan. 19, 1937 |
| 2,220,498 | Schneider | Nov. 5, 1940 |
| 2,232,166 | Colman | Feb. 14, 1941 |
| 2,252,060 | Caspar | Aug. 12, 1941 |
| 2,331,952 | Zenner | Oct. 19, 1943 |
| 2,375,541 | Dirkes | May 8, 1945 |
| 2,375,587 | Rose | May 8, 1945 |
| 2,435,035 | De Vaux | Jan. 27, 1948 |
| 2,445,780 | Harvill | July 27, 1948 |
| 2,540,654 | Cohen | Feb. 6, 1951 |
| 2,620,394 | Valensi | Dec. 2, 1952 |
| 2,623,948 | Hansen | Dec. 30, 1952 |
| 2,660,895 | Waters | Dec. 1, 1953 |
| 2,667,533 | Zenner | Jan. 26, 1954 |
| 2,677,725 | Schuler | May 4, 1954 |
| 2,688,656 | Wright | Sept. 7, 1954 |
| 2,690,548 | Joel | Sept. 28, 1954 |
| 2,715,719 | Bellamy | Aug. 16, 1955 |
| 2,716,158 | Shenk | Aug. 23, 1955 |
| 2,750,579 | Lekas | June 12, 1956 |
| 2,766,318 | Bacon | Oct. 9, 1956 |
| 2,766,377 | Frizzell | Oct. 9, 1956 |
| 2,771,595 | Hendrickson | Nov. 20, 1956 |
| 2,782,305 | Havens | Feb. 19, 1957 |
| 2,805,283 | Stiles | Sept. 3, 1957 |
| 2,897,267 | Prince | July 28, 1959 |

UNITED STATES PATENT OFFICE

CERTIFICATION OF CORRECTION

Patent No. 3,009,988 November 21, 1961

Edward F. Kleinschmidt et al.

It is hereby certified that error appears in the above numbered patent requiring correction and that the said Letters Patent should read as corrected below.

In the drawings, the following sheets should be arranged so that Sheets 24 and 25 should follow Sheet 16; Sheet 26 should follow Sheet 19; and Sheets 27, 28, 29, 30 and 31 should follow Sheet 21, and in the heading to the drawings, line 3, the drawings should be renumbered to read Sheets 1 to 37, consecutively; column 12, line 63, strike out -- of --; column 13, lines 40 and 64, for "transit", each occurrence, read -- transmit --; column 17, line 55, for "blowing" read -- glowing --; column 18, lines 7 and 8, strike out "S-601 either is in its "receive" position or during receipt of a message when"; same column line 31, for "at swtich" read -- a switch --; column 25, line 68, after "cut-off" insert -- by --; column 26, line 64, for "150201" read -- 15P201 --; column 31, line 56, for "C-129" read -- C-219 --; column 33, line 32, for "Of" read -- On --; line 74, for "(FIGURE 1)" read -- (FIGURE 19) --; column 35, line 3, for "blolcking" read -- blocking --; column 36, line 56, for "which" read -- while --; column 39, line 14, for "258", second occurrence, read -- 259 --; column 50, line 13, after "from" insert -- smoothly --; column 58, line 3, for ".00045" read -- .0045 --; line 60, before "those" insert -- to --; column 59, line 3, strike out -- to --; column 60, line 35, for "44, 45 48 and 52," read -- 45, 47 and 49, on --; column 63, line 30, before "should" insert -- it --; column 64, line 31, for "contact S-502" read -- contacts S-502 are --; column 71, line 53, for "trasversely" read -- transversely --.

Signed and sealed this 29th day of May 1962.

(SEAL)
ttest:

RNEST W. SWIDER
ttesting Officer

DAVID L. LADD
Commissioner of Patents